(12) United States Patent
De Boor et al.

(10) Patent No.: US 6,173,316 B1
(45) Date of Patent: Jan. 9, 2001

(54) WIRELESS COMMUNICATION DEVICE WITH MARKUP LANGUAGE BASED MAN-MACHINE INTERFACE

(75) Inventors: Adam De Boor, Alameda; Michael D. Eggers, Oakland, both of CA (US)

(73) Assignee: Geoworks Corporation, Alameda, CA (US)

(*) Notice: Under 35 U.S.C. 154(b), the term of this patent shall be extended for 0 days.

(21) Appl. No.: 09/057,394

(22) Filed: Apr. 8, 1998

(51) Int. Cl.[7] .................................................. G06F 15/16

(52) U.S. Cl. .................... 709/218; 709/202; 709/203; 709/219; 709/227; 709/228; 709/250; 707/9; 707/10; 707/500; 707/513; 345/326; 345/339; 345/341; 345/357

(58) Field of Search ................................... 709/200–203, 709/217–219, 227–229, 250; 370/310, 313, 352–355, 400–404; 707/9–10, 100–104, 500–501, 513; 345/156–158, 169–172, 326, 339–341, 355–357

(56) References Cited

U.S. PATENT DOCUMENTS

| | | | |
|---|---|---|---|
| 5,305,195 | 4/1994 | Murphy | 705/1 |
| 5,513,254 | 4/1996 | Markowitz | 379/100.17 |
| 5,572,643 | 11/1996 | Judson | 709/218 |

(List continued on next page.)

FOREIGN PATENT DOCUMENTS

| | | | |
|---|---|---|---|
| 0 797 368 A2 | 9/1997 | (EP) | H04Q/7/22 |
| 03204259 | 9/1991 | (JP) | G06F/15/40 |
| WO 97/26729 | 7/1997 | (WO) . | |
| WO 98/47090 | 10/1998 | (WO) | G06F/17/60 |

OTHER PUBLICATIONS

Kamada, T., Compact HTML for Small Information Appliances, W3 Consortium Note Feb. 9, 1998, pp. 1–12, USA.
UP.SDK Documentation: HDML 2.0 Language Reference Version 2.0, Unwired Planet, Jul. 1997, pp. 1–56, Redwood Shores, CA.

(List continued on next page.)

Primary Examiner—Zarni Maung
Assistant Examiner—Bharat Barot
(74) Attorney, Agent, or Firm—Fenwick & West LLP

(57) ABSTRACT

A system, method, and software product provide a wireless communications device with a markup language based man-machine interface. The man-machine interface provides a user interface for the various telecommunications functionality of the wireless communication device, including dialing telephone numbers, answering telephone calls, creating messages, sending messages, receiving messages, establishing configuration settings, which is defined in markup language, such as HTML, and accessed through a browser program executed by the wireless communication device. This feature enables direct access to Internet and World Wide Web content, such as Web pages, to be directly integrated with telecommunication functions of the device, and allows Web content to be seamlessly integrated with other types of data, since all data presented to the user via the user interface is presented via markup language-based pages. The browser processes an extended form of HTML that provides new tags and attributes that enhance the navigational, logical, and display capabilities of conventional HTML, and particularly adapt HTML to be displayed and used on wireless communication devices with small screen displays. The wireless communication device includes the browser, a set of portable components, and portability layer. The browser includes protocol handlers, which implement different protocols for accessing various functions of the wireless communication device, and content handlers, which implement various content display mechanisms for fetching and outputting content on a screen display.

24 Claims, 32 Drawing Sheets

U.S. PATENT DOCUMENTS

| | | | |
|---|---|---|---|
| 5,673,322 | * 9/1997 | Pepe et al. | 709/219 |
| 5,704,029 | * 12/1997 | Wright, Jr. | 707/500 |
| 5,708,478 | 1/1998 | Tognazzini | 348/552 |
| 5,732,074 | * 3/1998 | Spaur et al. | 370/313 |
| 5,809,317 | * 9/1998 | Kogan et al. | 707/501 |
| 5,818,446 | * 10/1998 | Bertram et al. | 345/334 |
| 5,835,861 | 11/1998 | Whiteside | 455/466 |
| 5,838,314 | 11/1998 | Neel et al. | 345/327 |
| 5,848,397 | 12/1998 | Marsh et al. | 705/14 |
| 5,852,775 | 12/1998 | Hidary | 455/404 |
| 5,854,624 | * 12/1998 | Grant | 345/169 |
| 5,854,897 | 12/1998 | Radziewicz et al. | 709/224 |
| 5,870,683 | 2/1999 | Wells et al. | 455/566 |
| 5,877,757 | * 3/1999 | Baldwin et al. | 345/336 |
| 5,889,852 | 3/1999 | Rosencrans et al. | 379/355 |
| 5,913,040 | 6/1999 | Rakavy et al. | 709/232 |
| 5,918,236 | * 6/1999 | Wical | 707/500 |
| 5,948,061 | * 9/1999 | Merriman et al. | 709/219 |
| 5,960,074 | * 9/1999 | Clark | 370/310 |
| 5,977,972 | * 11/1999 | Bates et al. | 345/341 |

OTHER PUBLICATIONS

Hara, Y., W3C Putting Compact HTML, HDML to test for Net Access—Mobile Markup Languages Face Off, Electronic Engineering Times, No. 1001, Apr. 6, 1998, pp. 1–2, Tokyo, Japan.

Hyland, T., Handheld Device Markup Language FAQ, Unwired Planet, W3 Consortium Note, Apr. 11, 1997, pp. 1–3, Redwood Shore, CA.

Intelligent User Interface Prompt Level, IBM Technical Disclosure Bulletin, vol. 35, No. 1A, Jun. 1, 1992, pp. 25–26, Armonk, New York.

International Search Report in PCT/US00/07637.

PCT International Search Report in PCT/US99/10016 dated May 24, 2000.

* cited by examiner

| HTMLp | Result |
|---|---|
| ```
<HTML>
<HEAD>
<KEY KEY=2 LABEL="PhoneBook" ACTION="file://phonbook.html">
<KEY KEY=1 LABEL="Menu" ACTION=MENU>
<KEYMENU KEY=1 LABEL="Messages" ACTION=file://msgs.html>
<KEYMENU KEY=1 LABEL="Recent Calls" ACTION=file://recent.html>
<KEYMENU KEY=1 LABEL="Phone Settings"
ACTION="file://phonsett.html">
<KEY KEY=up action="file://recent.html">
<KEY KEY=down action="file://phonbook.html">
</HEAD>
<BODY>
<img src=file://space.gif><br>
<img src=file://space.gif><br>
<CENTER>
<IMG SRC="file://la-air.gif"><br>
c e l l u l a r<br>
s e r v i c e s
</CENTER>
</BODY>
</HTML>
``` | 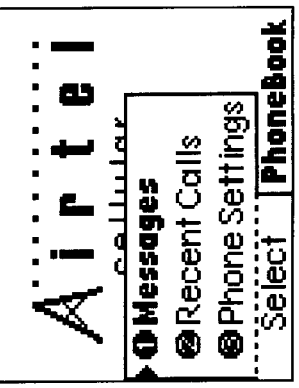 |

FIG. 7

| HTMLp | Result |
|---|---|
| `<HTML>`<br>`<HEAD>`<br>`<TOP>`<br>`<TITLE>Phone Book</TITLE>`<br>`<KEY KEY=1 Label=New Action="new">`<br>`<KEY KEY=clear action=delete>`<br>`<HELP>Press any number key to search for an entry</HELP>`<br>`<HELP>Press Send to call someone</HELP>`<br>`</HEAD>`<br>`<BODY>`<br>`<OBJECT CODE="phone:list?editkey=2&showstatus">`<br>`</BODY>`<br>`</HTML>` | <br><br><br><br> |

FIG. 8

| HTMLp | Result |
|---|---|
| ```
<HTML>
<HEAD>
<TITLE>Set Backlight</TITLE>
</HEAD>
<BODY>
<TEMPLATE>
<FORM METHOD=POST ACTION="config:set">
Backlight should be:<br>
<input type=radio name="backlight" CHECKED="config:backlight=0"
value=0>On when in use<br>
<input type=radio name="backlight" CHECKED="config:backlight=1"
value=1>On when in use or charging<br>
<input type=radio name"backlight" CHECKED="config:backlight=2"
value=2>Off<br>
<br>
Delay: <input type=text name="backlight delay"
value="%(config:backlight delay)">
<input type=submit name=ok value=OK>
</FORM>
</TEMPLATE>
</BODY>
</HTML>
``` | 123<br><br>Set Backlight<br>Backlight should be:<br>⦿ On when in use<br>○ On when in use or charging<br>○ Off<br><br>Delay: 15 ........ OK |

*FIG. 12*

| HTMLp | Result |
|---|---|
| file info.html<br>`<HTML>`<br>`<INC SRC=bbody.html>`<br>`<center><font size=1>Information Services</font><br></center>`<br>`<FORM ACTION=phone:indir>`<br>`<SELECT SIZE=3 NAME=url SIMPLE>`<br>`<OPTION VALUE=http://svcs/traffic.html>Traffic Watch</OPTION>`<br>`<OPTION VALUE=http://svcs/billing.html>Billing Inquiries</OPTION>`<br>`<OPTION VALUE=http://svcs/portfolio.html>Stock Portfolio</OPTION>`<br>`<OPTION VALUE=http://svcs/weather.html>Local Weather</OPTION>`<br>`</SELECT>`<br>`<INPUT TYPE=submit KEY=send>`<br>`</FORM>`<br>`<INC SRC=endbbody.html>`<br>`</HTML>` | 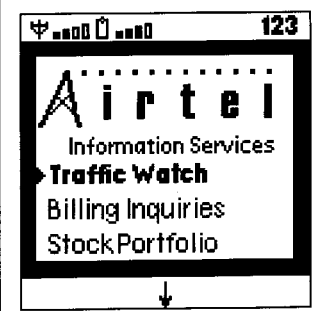<br><br>*FIG. 13* |
| file bbody.html:<br>`<! Specifies a body surrounded by a border with the operator logo at the top. The including file can add a subcaption immediately below, but left and right margin are set so text will not impinge on the border >`<br>`<BODY BACKGROUND=sq-back.gif BGPROPERTIES=fixed>`<br>`<BLOCKQUOTE>`<br>`<BR>`<br>`<INC SRC= stdlogo.html>` | |
| file endbbody.html:<br>`<! Closes the tags that were opened by bbody.html>`<br>`</BLOCKQUOTE>`<br>`</BODY>` | |
| file stdlogo.html:<br>`<! Provides the operator logo with the text flow set to receive a subcaption for the logo >`<br>`<IMG SRC=1-airtel.gif>`<br>`<BR>` | |

| HTMLp | Result |
|---|---|
| ```
<HTML>
<HEAD><TITLE>Dialing</TITLE>
<TEMP>
<KEY KEY=1 Label="Recent"
Action="file://recent.html">
</HEAD>
<BODY>
<FORM ACTION="phone:dial">
<INPUT NAME=num TYPE=phonenum>
<INPUT TYPE=submit KEY=send>
</FORM>
</BODY>
</HTML>
``` | 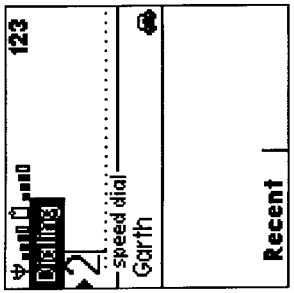<br><br>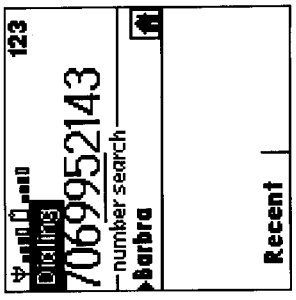 |
FIG. 14

| HTML | Result |
|---|---|
| ```
<HTML>
<BODY>
<FORM METHOD=POST ACTION="http://cgi-
bin/purchase">
Name: <INPUT TYPE=TEXT NAME=name><br>
Address: <INPUT TYPE=TEXT
NAME=street><br>
City: <INPUT TYPE=TEXT NAME=city>
State: <INPUT TYPE=TEXT NAME=state
MAXLENGTH=2 SIZE=2> Zip: <INPUT
TYPE=TEXT NAME=zip SIZE=5><br>
Credit Card: <INPUT TYPE=RADIO
NAME=cardtype VALUE=visa>VISA <INPUT
TYPE=RADIO NAME=cardtype
VALUE=mc>MasterCard <INPUT TYPE=RADIO
NAME=cardtype VALUE=amex>American
Express<br>
Number: <INPUT TYPE=TEXT
NAME=cnumber><br>
<INPUT TYPE=submit name=buy
value=Buy></FORM>
</BODY>
</HTML>
``` | Name: ☐<br>Address: ☐<br>City: ☐ State: ☐ Zip: ☐<br>Credit Card: ○ VISA ○ MasterCard ○ American Express<br>Number: ☐<br>[Buy] |

*FIG. 16*
*PRIOR ART*

| CLIENT | SERVER |
|---|---|
| `<HTML>`<br>`<HEAD>`<br>`<TITLE>Purchase Skis</TITLE>`<br>`<TOP>`<br>`</HEAD>`<br>`<BODY>`<br>`Please enter your name:`<br>`<FORM METHOD=GET`<br>`ACTION="http://skishop/cgi-bin/addr ">`<br>`<INPUT TYPE=TEXT NAME=name SIZE=25><br>`<br>`<INPUT KEY=send TYPE=submit>`<br>`</FORM>`<br>`</BODY>`<br>`</HTML>` | |
| `GET http://skishop/cgi-bin/addr?name=George+Will` | Insert "name" into the HTML template maintained on the server, upload to client. |

*FIG. 17a.1*
*PRIOR ART*

| CLIENT | SERVER |
|---|---|
| ```
<HTML>
<HEAD>
<TITLE>Purchase Skis</TITLE>
</HEAD>
<BODY>
Now we need your address:
<FORM METHOD=GET ACTION="http://skishop/cgi-bin/credit">
<INPUT TYPE=hidden NAME=name VALUE="George Will">
Street: <INPUT TYPE=TEXT NAME=street size=9><br>
City: <INPUT TYPE=TEXT NAME=city size=10><br>
State: <INPUT TYPE=TEXT NAME=state MAXLENGTH=2 SIZE=2><br>
Zip: <INPUT TYPE=TEXT NAME=zip SIZE=5>
<INPUT KEY=send TYPE=submit>
</FORM>
</BODY>
</HTML>
``` | |
| ```
GET http://skishop/cgi-bin/credit?name=George+Will&street=2+Anywhere&city=Madison&state=WI&zip=53705
``` | Insert address parameters into the template maintained on the server, and upload to client. |

*FIG. 17a.2*
*PRIOR ART*

| CLIENT | SERVER |
|---|---|
| `<HTML>`<br>`<HEAD>`<br>`<TITLE>Purchase Skis</TITLE>`<br>`</HEAD>`<br>`<BODY>`<br>Finally, your credit card info:<br>`<FORM METHOD=GET`<br>`ACTION="http://skishop/cgi-bin/confirm">`<br>`<INPUT TYPE=hidden NAME=name`<br>`VALUE="George Will">`<br>`<INPUT TYPE=hidden NAME=street VALUE="2 Anywhere">`<br>`<INPUT TYPE=hidden NAME=city`<br>`VALUE="Madison">`<br>`<INPUT TYPE=hidden NAME=state VALUE="WI">`<br>`<INPUT TYPE=hidden NAME=zip`<br>`VALUE="53705">`<br>Credit Card:`<br>`<br>`<INPUT TYPE=RADIO NAME=cardtype`<br>`VALUE=visa>VISA`<br>`<INPUT TYPE=RADIO NAME=cardtype`<br>`VALUE=mc>MasterCard`<br>`<INPUT TYPE=RADIO NAME=cardtype`<br>`VALUE=amex>American Express<br>`<br>Number: `<INPUT TYPE=TEXT NAME=cnumber >`<br>`<INPUT KEY=send TYPE=submit name=buy`<br>`value="Review">`<br>`</FORM>`<br>`</BODY>`<br>`</HTML>` | |
| `GET http://skishop/cgi-bin/credit?name=George+Will&street=2+Anywhere&city=Madison&state=WI&zip=53705&cardtype=visa&cnumber=7732222156661000` | |
| | Insert credit card parameters into template maintained on the server, and upload to client. |

FIG. 17b.1

PRIOR ART

| CLIENT | SERVER |
|---|---|
| `<HTML>`<br>`<HEAD>`<br>`<TITLE>Confirm Order</TITLE>`<br>`</HEAD>`<br>`<BODY>`<br>`<DL>`<br>`<DT>Name:</DT><DD><b>George Will</b></DD>`<br>`<DT>Address:</DT><DD><b>2 Anywhere, Madison, WI, 53705</b></DD>`<br>`<DT>Credit Card:</DT><DD><b>VISA<br>`<br>`7732222156661000</b></DD>`<br>`</DL>`<br>`<FORM METHOD=POST`<br>`ACTION="http://skishop/cgi-bin/purchase">`<br>`<INPUT TYPE=hidden NAME=name VALUE="George Will">`<br>`<INPUT TYPE=hidden NAME=street VALUE="2 Anywhere">`<br>`<INPUT TYPE=hidden NAME=city VALUE="Madison">`<br>`<INPUT TYPE=hidden NAME=state VALUE="WI">`<br>`<INPUT TYPE=hidden NAME=zip VALUE="53705">`<br>`<INPUT TYPE=hidden NAME=cardtype VALUE="visa">`<br>`<INPUT TYPE=hidden NAME=cnumber VALUE="7732222156661000">`<br>`<INPUT KEY=1 TYPE=submit name=buy value="Buy!">`<br>`</FORM>`<br>`</BODY>`<br>`</HTML>` | |
| `POST http://skishop/cgi-bin/purchase?name=George+Will&street=2+Anywhere&city=Madison&state=WI&zip=53705&cardtype=visa&cnumber=7732222156661000` | |
| | Process transaction with all parameters. |

*FIG. 17b.2*

PRIOR ART

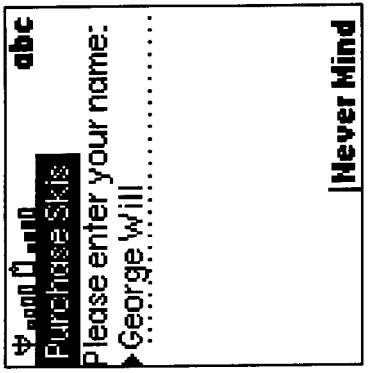
FIG. 18a.1

FIG. 18a.2

| HTMLp | Result |
|---|---|
| file: credit.html<br><HTML><br><HEAD><br><TITLE>Purchase Skis</TITLE><br><KEY KEY=2 LABEL="Never Mind" ACTION=done><br></HEAD><br><BODY><br>Finally, your credit card info:<br><FORM METHOD=NEXT ACTION="file://confirm.html"><br>Credit Card:<br><br><INPUT TYPE=RADIO NAME=cardtype VALUE=visa>VISA<br><INPUT TYPE=RADIO NAME=cardtype VALUE=mc>MasterCard<br><INPUT TYPE=RADIO NAME=cardtype VALUE=amex>American Express<br><br>Number: <INPUT TYPE=TEXT NAME=cnumber abcmodes=num><br><INPUT KEY=send TYPE=submit name=buy value="Review"><br></FORM><br></BODY><br></HTML> | ☰▯▯ 123<br>Purchase Skis<br>Finally, your credit card info:<br>Credit Card:<br>⦿ VISA<br>○ MasterCard<br>○ American Express<br>Number: 215661000<br>Select \| Never Mind |

FIG. 18a.3

| HTMLp | Result |
|---|---|
| ```
<HTML>
<HEAD>
<TITLE>Confirm Order</TITLE>
<KEY KEY=2 LABEL="Never Mind" ACTION=done>
</HEAD>
<BODY>
<template>
<DL>
<DT>Name:</DT><DD><b>%(extra:name)</b></DD>
<DT>Address:</DT><DD><b>%(extra:street),
%(extra:city), %(extra:state),
%(extra:zip)</b></DD>
<DT>Credit Card:</DT><DD><b><if
test=extra:cardtype=visa>VISA</if><if
test=extra:cardtype=mc>MasterCard</if><if
test=extra:cardtype=amex>American
Express</if><br>
%(extra:cnumber)</b></DD>
</DL>
</template>
<FORM METHOD=POST ACTION="http://cgi-
bin/purchase">
<INPUT KEY=1 TYPE=submit name=buy
value="Buy!"" >
</FORM>
</BODY>
</HTML>
``` | ```
$·ıllΠ.ıll        123
Confirm Order
Name:
 George Will
Address:
 2 Anywhere, Madison,
 WI, 53705
Credit Card:
 VISA
 Buy!    Never Mind
``` |

FIG. 18b.1

| HTMLp | Result |
|---|---|
| Final HTTP transaction sent to server:<br><br>POST //cgi-bin/purchase<br><br>name/George Will<br>street/2 Anywhere<br>city/Madison<br>state/WI<br>zip/53705<br>cardtype/visa<br>cnumber/7732221566661000<br>buy/Buy! | |

FIG. 18b.2

| HTMLp | Result |
|---|---|
| `<HEAD>`<br>`<TITLE>Green-Tongued Iguana</TITLE>`<br>`</HEAD>`<br>`<BODY>`<br>`The <a href=iguana.gif label=Picture>green-tongued iguana</a> is a native of <a href=map?city=adelaide label=map>Adelaide, Australia</a>. It likes to live under spare tires, unlike the <a href=lizards/blue-tongued-iguana.html>Blue-Tongued Iguana</a>, its cousin to the north.`<br>`</BODY>` | |

FIG. 19

| HTMLp | Result |
|---|---|
| `<HEAD>`<br>`<TITLE>OAK to SEA 3/24</TITLE>`<br>`<LINKMENU>`<br>`</HEAD>`<br>`<BODY>`<br>`<TABLE>`<br>`<TR>`<br>`<TH><U>Flight</U></TH>`<br>`<TH ALIGN=CENTER><U>Dep</U></TH>`<br>`<TH ALIGN=CENTER><U>Arr</U></TH>`<br>`</TR>`<br>`<TR>`<br>`<TD><A HREF=flights/ua909.html>UA 909</A></TD>`<br>`<TD ALIGN=RIGHT>09:33</TD>`<br>`<TD ALIGN=RIGHT>11:22</TD>`<br>`</TR>`<br>`<TR>`<br>`<TD><A HREF=flights/as63.html>AS 63</A></TD>`<br>`<TD ALIGN=RIGHT>10:02</TD>`<br>`<TD ALIGN=RIGHT>11:57</TD>`<br>`</TR>`<br>`<TR>`<br>`<TD><A HREF=flights/as102.html>AS 102</A></TD>`<br>`<TD ALIGN=RIGHT>12:36</TD>`<br>`<TD ALIGN=RIGHT>14:08</TD>`<br>`</TR>`<br>`<TR>`<br>`<TD><A HREF=flights/ua887.html>UA 887</A></TD>`<br>`<TD ALIGN=RIGHT>15:10</TD>`<br>`<TD ALIGN=RIGHT>17:21</TD>`<br>`</TR>`<br>`</TABLE>`<br>`</BODY>` | 123<br><br>OAK to SEA 3/24<br>Flight Dep Arr<br>UA 909 09:33 11:22<br>AS 63 10:02 11:57<br>AS 102 12:36 14:08<br>UA 887 15:10 17:21<br><br>Select<br><br>*FIG. 20* |

| HTMLp | Result |
|---|---|
| ```
<HTML>
<HEAD>
<TITLE>Error!</TITLE>
<KEY KEY=1 LABEL="Sorry!" ACTION=pop>
</HEAD>
<BODY>
<CENTER>
<IMG SRC=file://booboo.gif>
<BR>
<B><FONT SIZE=7><INC SRC=extra:message></FONT></B>
</CENTER>
</BODY>
</HTML>
``` | Error! ▲❗<br>Please enter a<br>valid phone<br>number<br>Sorry! |

*FIG. 23*

| KEYCAPS | | MISCELLANEOUS | |
|---|---|---|---|
| builtin:key1 | | builtin:smiley | |
| builtin:key2 | | builtin:signal | |
| builtin:key3 | | | |
| builtin:key4 | | | |
| builtin:key5 | | | |
| builtin:key6 | | | |
| builtin:key7 | | | |
| builtin:key8 | | | |
| builtin:key9 | | | |
| builtin:key0 | | | |
| PHONE NUMBER TYPES | | | |
| builtin:type0 | | builtin:bigtype0 | |
| builtin:type1 | | builtin:bigtype1 | |
| builtin:type2 | | builtin:bigtype2 | |
| builtin:type3 | | builtin:bigtype3 | |
| builtin:type4 | | builtin:bigtype4 | |
| builtin:type5 | | builtin:bigtype5 | |
| builtin:type6 | | builtin:bigtype6 | |
| builtin:type7 | | builtin:bigtype7 | |

| HTMLp | Result |
|---|---|
| ```
<HEAD>
<DIAL NAME="Voice Mail" NOSCREENCHANGE>8144299x#4416722</DIAL>
<TITLE>Voice Box</TITLE>
<KEY KEY=#5 ACTION=vmListen.htp>
<KEY KEY=#4 ACTION=vmGreeting.htp>
<KEY KEY=#6 ACTION=vmNew.htp>
<KEY KEY=#9 ACTION=vmSignoff.htp>
<KEY KEY=default ACTION=none>
<TOP>
</HEAD>
<BODY>
<IMG SRC=builtin://key4> Greeting Options<br>
<IMG SRC=builtin://key5> Listen to Messages<br>
<IMG SRC=builtin://key6> Record a Message<br>
<IMG SRC=builtin://key9> Sign Off<br>
</BODY>
``` |  |
| ```
<HEAD>
<DIAL>5</DIAL>
<TITLE>Listen</TITLE>
<KEY KEY=#2 ACTION=phone:dial?num=2>
<KEY KEY=#3 ACTION=phone:dial?num=3>
<KEY KEY=#5 ACTION=phone:dial?num=5>
<KEY KEY=#7 ACTION=phone:dial?num=7>
<KEY KEY=#9 ACTION=pop>
</HEAD>
<BODY>
<IMG SRC=builtin://key2 WIDTH=22> Back Up a Bit<br>
<IMG SRC=builtin://key2><IMG SRC=builtin://key2> Start Again<br>
<IMG SRC=builtin://key3 WIDTH=22> Erase<br>
<IMG SRC=builtin://key5 WIDTH=22> Next Message<br>
<IMG SRC=builtin://key7 WIDTH=22> Save Message<br>
<IMG SRC=builtin://key9 WIDTH=22> Stop Listening<br>
</BODY>
``` | 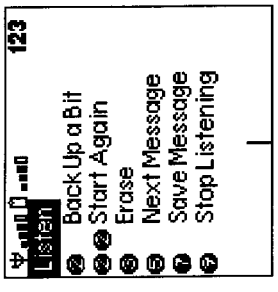 |

WIRELESS COMMUNICATION DEVICE WITH MARKUP LANGUAGE BASED MAN-MACHINE INTERFACE

BACKGROUND

1. Field of Invention

This invention relates to man-machine interfaces for wireless communication devices, and more particularly, to man-machine interfaces constructed from markup languages.

2. Background of the Invention

Wireless communication devices are becoming an increasingly prevalent for personal communication needs. These devices include, for example, cellular telephones, alphanumeric, pagers, "palmtop" computers and personal information managers (PIMS), and other small, primarily handheld communication and computing devices. Wireless communication devices have matured considerably in their features, and now support not only basic point-to-point communication functions like telephone calling, but more advanced communications functions, such as electronic mail, facsimile receipt and transmission, Internet access and browsing of the World Wide Web, and the like.

Generally, wireless communication devices have software that manage various handset functions and the telecommunications connection to the base station. The software that manages all the telephony functions is typically referred to as the telephone stack, and the software that manages the screen display and processes user inputs of key presses is referred to as the Man-Machine-Interface or "MMI." The MMI is the topmost, and most visible layer of the wireless communication device's software.

Because wireless communication devices have generally reached a very desirable and small form factor, the primary determinant of a successful device will likely be in its feature set and its ease of use. Thus, the ability to quickly design, test, and deliver wireless communication devices that are both easy to use, and have a rich set of features—attributes that are often opposed to one another—will be essential to successful product performance.

However, wireless communication devices present a variety of more challenging design and implementation issues that do not arise with larger processor-based systems, such as notebook and desktop computers, which may also have similar telecommunication features. These design challenges include the design of the user interface, the customization of the devices for particular service operators, the integration of Internet and World Wide Web access with other communication functionality, and the software development process.

User Interface Design Constraints

Unlike desktop and notebook computers, wireless communication devices have a form factor which requires a very small screen display size. Desktop computers typically have displays with at least 14" screen size, and resolution typically between 640×480 and 1024×768 pixels. In contrast, wireless communication devices typically have a screen size between 25×25 mm and 80×120 mm, and resolutions between 90×60 to 120×120 pixels, or about 3–8% of the size of the desktop or notebook screen. As a direct result, the user interface design of the wireless communication device must provide access to essentially the same features as desktop computers, such as electronic mail, facsimiles, and Web browsing, yet with only a fraction of the screen area for displaying text, images, icons, and the like. This problem of constructing the user interface to provide these features is particularly significant when handling Web based content, since conventional Web content, such as forms, assume the larger screen size of conventional desktop computers. Displaying such forms on the small screen of a wireless communication device results in jumbled and difficult to use content.

Another user interface limitation of wireless communication devices is the severely restricted set of inputs available to the user. Conventional desktop or notebook computers have cursor based pointing devices, such as computer mouse, trackballs, joysticks, and the like, and full keyboard. This enables navigation of Web content by clicking and dragging of scroll bars, clicking of hypertext links, and keyboard tabbing between fields of forms, such as HTML forms. Wireless communication devices have a very limited number of inputs, typically up and down keys, and one to three softkeys.

Accordingly, it is desirable to provide a software architecture for the MMI of a wireless communication device that enables the customization and use of user interface with Web content accounting for the limited screen resolution and input functionality of the wireless communication device.

Integration of Internet/Web Functional with Telephony

With the advent of the Internet and the World Wide Web, the highest performance wireless communication devices provide complete Internet access and the ability to directly browse the World Wide Web. Current devices provide Internet and World Wide Web access through a strictly modal interface, in which the user must select between using the wireless communication device in a browser mode in its native telecommunications mode for making telephone calls, accessing a stored telephone book, sending facsimiles, and the like. In the "browser mode" the user cannot dial a telephone number to make a telephone; likewise in the telephony mode, the user cannot access a Web site. Thus, the user is unable to operate the wireless communication device in a seamless fashion that allows Web content to be downloaded and manipulated in context of the telephone functions, such as embedding an item of Web content that is obtained while browsing into the user's telephone book, or into an email message.

Accordingly, it is desirable to provide an MMI in which Internet and World Wide Web access features are seamlessly integrated with the telephony and other controls of the wireless communication device so that user can access any feature of the wireless communication device at any time.

Software Engineering of the MMI

Typically, an MMI is implemented as a module in a larger piece of code that manages the telephone control functions. The MMI is coded in the same computer language as the rest of the telephone control software. This makes the MMI difficult to modify without using the same programming skills and tools used to create the entire telephone control software. In other words, changing anything in the MMI requires the services of a skilled programmer familiar with the underlying telephony programming details and computer language. In addition, since the MMI is an integral part of the code for the telephone control software, implementing new changes in the MMI means compiling a new image of all the telephone control software, and testing the result to ensure that the new MMI features are compatible with all other code modules. In short, problems introduced by modifying the MMI software can potentially cause the handset to malfunction, disrupting service on the network to other users. Depending on the extent of the modifications, the change of any portion of the telephone control software can result in bugs, and/or the need for new type approval of the entire wireless communication device. Thus, it is desirable to provide a software architecture which separates the design and implementation of the MMI functionality from the implementation of the telephone control software, allowing the manufacturer to quickly and safely customize the MMI design to suit the needs of a particular customer Customizing of the MMI for Service Operators: "Branding"

In the wireless communication device industry, the services operators, such as cellular service providers, are interested in attracting and retaining their customers by aggressively branding their wireless communication device products, and offering new telephony features and network services to the user. Important among these are services that add value to the user, such as voice mail, electronic messaging, Internet access, and the like as mentioned above. "Branding" is the embedding of insignia, logos, or other indicia into the MMI of the wireless communication device and its features that identifies it to the consumer as originating from the service operator.

The manufacturers of the wireless communication device, who typically provide only the basic hardware components, must therefore provide a way for the service operator to integrate these features and services into the wireless communication device by software programming, and provide a mechanism for branding the features. A key problem is that these services are necessarily different in their functionality and requirements, and the task of providing users with a current array of services and features a difficult one.

Wireless communication device manufacturers have traditionally attacked this problem by making a special version of the wireless communication device control software for each service operator selling that wireless communication device in conjunction with its own communication services. Each specific version of the wireless communication device contains the device manufacturer's branding, the operator's branding, and support for whatever features and services the service operator supports. Each of these versions becomes a different piece of software to be tested, maintained, and modified as new features or services are provided to the consumer. This significantly increases the software development expense and maintenance issues. Further, unless the wireless communication device manufacturer provides the service operator with the source code of the MMI and telephone control software, it requires the wireless communication device manufacturer to be directly involved in the branding and MMI design requirements of the service operator. Thus, it desirable to provide a software architecture for an MMI that allows the wireless communication device manufacturer to provide a single body of telephone control software to each service operator, and allows each service operator to independently, and without the assistance of the wireless communication device manufacturer, design, implement, and brand the MMI for the wireless communication device.

SUMMARY OF THE INVENTION

The present invention overcomes the various limitations of conventional wireless communication devices by providing a wireless communication device with an MMI that is based on a markup language. A markup language is a computer programming language that allows the content of a page or a screen display to be defined by the inclusion of predefined symbols in the content itself indicating the logical components of the content, instructions for the layout of the content on the page or screen, or other data which can be interpreted by some automatic system responsible for displaying, manipulating or modifying the content.

In one aspect the present invention provides a wireless communication device including a user interface defined in a markup language. To effect this, the present invention includes a markup language browser that it uses to provide both telephony control of the wireless communication device, in response to user selection of telephony functions in the user interface and Internet access via the HyperText Transport Protocol (HTTP), in response to user selection of data items associated with content located on the Internet.

In one embodiment, the telecommunication control and other functions of the wireless communication device are defined in various user interface pages written in a markup language. Each control function is associated with, or activated by a Uniform Resource Locator (URL). A URL is a data item specifying a protocol for obtaining a data item, and which data item should be fetched or manipulated. The user interface pages are stored in a local memory of the wireless communication device, and fetched by the browser, which decodes them and displays the appropriate user interface elements. The browser can also modelessly fetch markup language pages or other content that is stored remotely, by accessing such pages via a telecommunications network such as the World Wide Web, and likewise decode and display these remotely accessed pages. When a user interface page is displayed, user selection of a control function passes a URL or command data to the browser. The browser effects a telecommunication function in response the received URL or command.

The browser preferably includes a number of protocol handlers, including a telephony protocol handler, a local file protocol handler, and an remote file protocol handler, and a number of content handlers, including a markup language handler. The telephony protocol handler decodes URLs for telephony control features, such as telephone dialing and answering, activates underlying functions of telephony control software controlling the hardware of the wireless communication device. Any content of the URL which is needed to display the telephony controls is provided to the markup language content handler which parses the content and displays it on a screen display. The markup language content handler is generally responsible for displaying any fetched markup language pages, including all user interface pages, and for receiving user inputs to these pages via forms and other input means.

The markup language handler generally receives content from two sources, the local file protocol handler and the remote file protocol handler. The remote file protocol handler decodes URLs for accessing content on the World Wide Web, and provides the fetched content, such as a Web page, form, applet, or the like to the markup language content handler for outputting the content to the screen display of the wireless communication device. One suitable remote file protocol handler implements HTTP. The local file protocol handler decodes URLs for accessing local user interface files and provides such content to the markup language content handler. In a preferred embodiment of the MMI, the user interface is defined in HyperText Markup Language, or "HTML," and the browser includes a HTML content handler that displays both Web content and user interface featured defined in HTML.

The use of a markup language to define the MMI of a wireless communication device provides numerous advantages over conventional MMI software architectures. First, the use of a markup language allows for complete and seamless integration of Internet and World Wide Web access into the telephony and other features of the wireless communication device. Since the MMI uses a markup language such as HTML to display all the functional screens, the World Wide Web content (which is also written in HTML) has the same appearance as other features of the wireless communication device. More particularly, the pages of the MMI are accessed using URLs, just as Web content is similarly accessed. When displaying a functional page the wireless communication device accesses a local URL; when displaying Web content, the wireless communication device automatically initiates a connection with a Web server to obtain the Web content. The markup language based MMI thus allows for a modeless user interface that enables the user to access the Internet and the World Wide Web at any time, without having to switch the wireless communication device between telephony and "browser" modes, as in conventional devices.

As a further benefit of the markup language based MMI, Web content such as Web pages, forms, and the like, from the World Wide Web can be accessed and incorporated directly into telephony, messaging, and other non-Internet based features of the wireless communication device. For example, in a preferred embodiment, a wireless communication device has a telephone book of stored telephone numbers and names. Conventionally, the user would have to manually key these entries in using the keypad of the wireless communication device. In a wireless communication device using an MMI in accordance with the present invention the user could add an entry to the telephone book simply by accessing a telephone directory on the World Wide Web, which can contain HTML that allows the user to easily store the information directly into the telephone book.

The use of a markup language also reduces the complexity of the software engineering process for creating the MMI for a particular wireless communication device. First, since the MMI of the present invention is based on a markup language, only a very limited amount of programming skill is needed to design a fully featured user interface, unlike a conventional MMI which requires a programmer skilled in C or other low level language programming. Editing and modifying the user interface requires only simple markup language and image editing tools, not a complete application programming environment. Second, using the markup language based MMI of the present invention enables any of the features the MMI to be modified, without having to re-compile the entire telephone control software, and re-test and certify the entire package. Because the MMI is separate from the underlying telephone control and air interface stack, only user interface pages that are individually changed or added need to be tested. This reduces the time to market, and increases the ease of designing, maintaining, and modifying the MMI as new features and services become available. Reduction of the time to create and test changes in the user interfaces also means that more different versions can be prototyped in less time than with a conventional MMI, thereby facilitating design exploration for the best user interface design for a given set of user requirements and features.

The ease with which the user interface of a MMI can be created and modified, and the reduction of time to market further enables the service operator to quickly generate wireless communication devices targeted at specific customer segments, without requiring the device manufacturer to create specific product software images for each and every target customer segment. For example, the service operator may use the same wireless communication device hardware and telephony control software with different user interfaces designed for executives, teen-agers and seniors, each of which may have different needs, and abilities to use the features of the wireless communication device.

For example, using a markup language to define the pages of the user interface allows any of the following items to be changed on any page: title bar presence and text; all informational text; option list text; links to all subsequent screens; soft key assignments; permanent scrolling banner messages; banner advertising; and help text.

The use of markup language based MMI also provides advantages in the branding of the wireless communication device for different service operators. Since the user interface is defined in markup language pages, service operator-specific logos, artwork, and text can be easily added and changed by individual service operators. Thus, the wireless communication device can provide the same wireless communication device hardware and telephone control software to a number of service operators, each of whom can quickly and easily brand the wireless communication device with their own distinctive user interfaces, without requiring the wireless communication device manufacturer to implement, test, and ship different user interfaces to each operator, as is conventional.

In providing a wireless communication device with a markup language based MMI, the present invention enhances the standard HTML with a number of extensions that make it particularly useful for working with wireless communication devices. Standard HTML assumes the presence of a conventional computer with keyboard, pointing device, and full size display screen, features which are not present in most wireless communication devices. The most notable deficiencies of HTML include:

Form elements (e.g., checkboxes, radio buttons) are awkward to navigate without a mouse.

Forms as they exist in content today tend to be too large for the user to maintain some context as she is filling them in on a small screen. If the form is divided into n forms, then the user's input is sent between the client and the server and back to the client n−1 times, wasting bandwidth. In addition, with a series of smaller forms, terminating the transaction could be tortuous as the user hits the back key for each form in the series.

Hyperlinks are awkward to follow without a mouse to select them and a separate scrollbar for scrolling the content of a page. On a device with only an Up key and a Down key to both select which hyperlink to follow and to scroll the display, fixed assignment of either scrolling or selecting to the Up and Down keys is insufficient to provide the needed navigational abilities.

As a user interface definition language, HTML lacks a number of key features:

The ability to specify actions for the soft function keys, or indeed for any key on the device.

The ability to define a pop-up menu of choices.

The ability to display or alter the data you'd like to store on the device, such as names and phone numbers.

The ability to design a screen as a template without writing C code to fill in the blanks.

The ability to allow content arriving over the air to extend or customize the interface the device presents to the user.

The present invention provides extensions to the HTML language which facilitate the design of multi-part forms, the use of a limited number of keys to both navigate Web pages and select hypertext links, define actions for any key (keypad or softkey) of the wireless communication device using URLs, create menus of options for softkeys, and conditional inclusion of text, formatting, and user interface gadgets.

More particularly, the present invention provides a "key" tag that allows the assignment of specific functions or actions to any key of a key-pad, including binding a menu to a key. A "keymenu" tag allows specification of the menu items to be included in a menu bound to a key. A "template" tag and an "include" tag allow for the substitution or insertion of external HTML or other data directly into the HTML of a page. A "help" tag allows for the definition of help strings that are automatically scrolled across the title bar of page after a set time period. A conditional tag allows for the testing of expressions to conditionally display HTML data within a page, for example based on variables or configuration settings of the device. A "next" method for forms allows for maintaining state of a multi-part form without having to repeatedly transmit hidden data between a client and server to maintain the state. Improved navigational methods allow for the Up and Down keys of a wireless communication device to control both scrolling of a page, and selection of user interface gadgets and hyperlinks, in the absence of separate Tab and Enter keys and scroll bars.

BRIEF DESCRIPTION OF THE DRAWINGS

FIG. 7 is an example HTMLp file and page showing a key menu using the <KEY> and <KEYMENU> tags.

FIG. 8 is an example HTMLp file and page showing a help text scrolling banner with the <HELP> tag.

FIG. 12 is an example HTMLp file and page showing the use of expressions for evaluating the CHECKED and SELECTED attributes.

FIG. 13 is an example HTMLp file and page showing included HTML with the <INC> tag.

FIG. 14 is an example HTMLp file and page using the PHONENUM and PHONENAME attributes for the <INPUT> tag.

FIG. 16 is an example conventional HTML file and page for a complex form.

FIGS. 17a1–17b2 are example HTML files and pages showing an conventional multiple form approach using HIDDEN input data, FIGS. 18a1–18b2 are example HTMLp files and pages showing a multi-part form used with the NEXT method.

FIG. 19 is an example HTMLp file and page showing the default creation of a menu of hyperlinks without the use of the <LINKMENU> tag.

FIG. 20 is an example HTMLp file and page showing the use of the <LINKMENU> tag.

FIG. 23 is an example HTMLp file and page showing the use of the "extra" protocol.

FIG. 24 is a table of icons and images used with the builtin protocol.

FIG. 25 is an example HTMLp file and page showing the use of the <DIAL> tag.

DETAILED DESCRIPTION OF THE PREFERRED EMBODIMENTS

A. SYSTEM and SOFTWARE ARCHITECTURE

Figure 1:
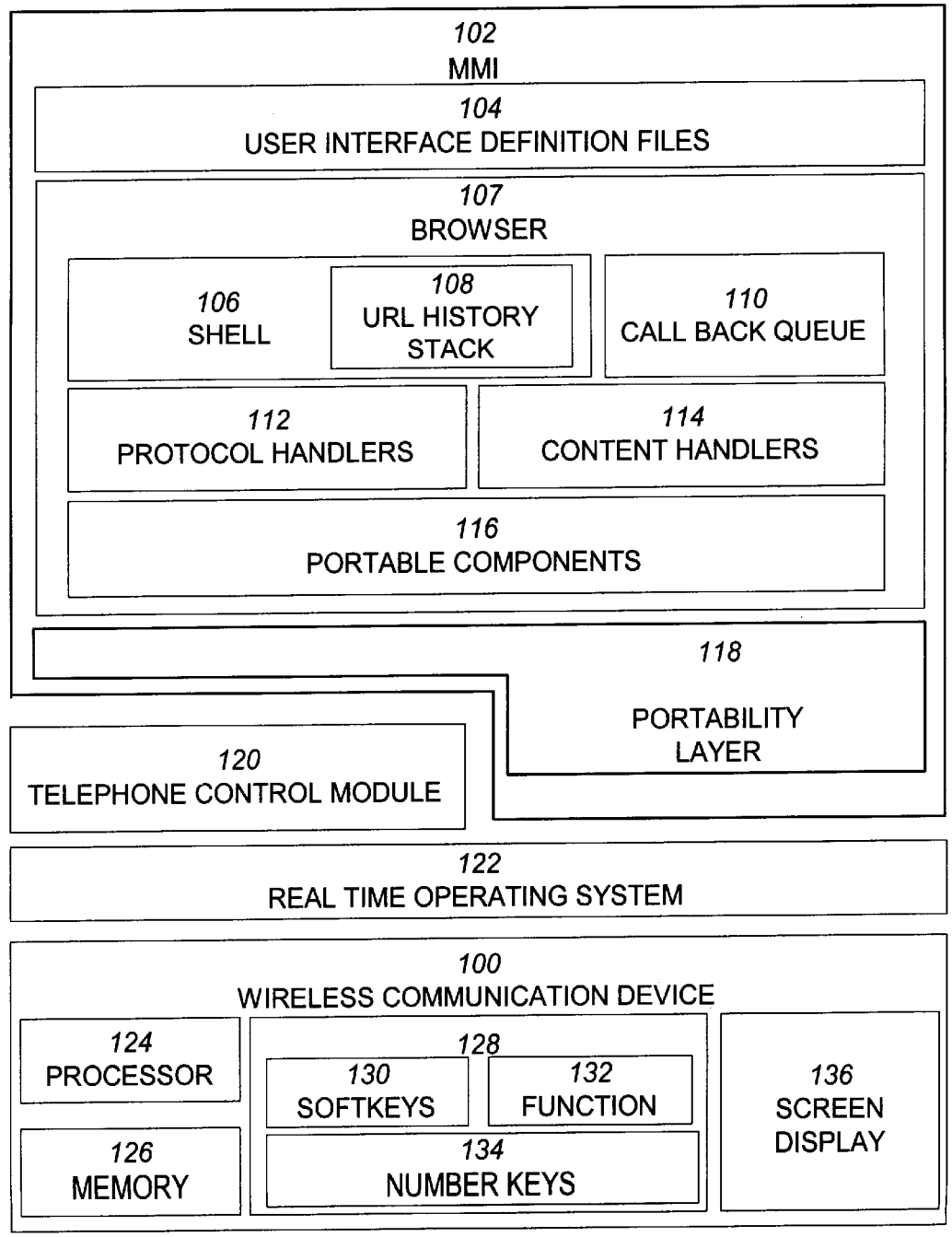
FIG. 1 is an illustration of the top level software and system architecture of a wireless communication device in accordance with the present invention.

Referring now to FIG. 1, there is shown an illustration of the system and software architecture of a wireless communication device 100 using the markup language based MMI 102 in accordance with the present invention. The hardware of the wireless communication device 100 includes a processor 124, memory 126, screen display 136, and keypad 128. Memory 126 includes ROM, RAM, and a flash memory for long term storage of data. A suitable wireless communication device 100 for providing the hardware features is a Nokia 6100™ manufactured by Nokia Telecommunications, Inc.

The wireless communication device 100 stores in the memory 126 and executes a conventional real time operating system 122, which includes modules for managing power, memory, threads (communication connections), keypad inputs, and timer activities. The real time operating system 122 provides a standard application programming interface to allow higher level components of the MMI 102 to request functionality of the wireless communication device 100, and to send and receive data.

Also stored in the memory 126 and in communication with the real time operating system 122 is telephony control module 120 that provides the primary telephone controls, including making and receiving telephone calls, managing multiple telephone lines (if appropriate), management of text messaging (if appropriate), monitoring of telephone signals, and other basic telephony functions. The telephony control module 120 includes a conventional telephone protocol stack that implements an air-interface protocol. The telephony control module 120 provides an application programming interface to the MMI 102 to access these features. The telephony control module 120 and the real time operating system 122 are typically provided by the manufacturer of the wireless communication device 100, and their particular implementation is not material to the invention.

The screen display 136 is a bitmapped LCD or similar display device. The screen display 136 is typically of very limited resolution, for example about 90×60 to 120×120 pixels (at about 0.28 mm dot pitch) as would be appropriate for a compact, portable, hand-held electronic device. It is anticipated that advances in display technology will result in screen displays 136 of significantly higher resolution, but even so, the ergonomic and form factor requirements of wireless communication devices will result in screen displays that are relatively small (e.g., between 25×25 mm and 8×120 mm) as compared to the screen displays of notebook and desktop computers, and as a result will not display content designed for such larger screen displays in the exactly the same manner. The present invention is adapted to increase the ease of use of such screen displays when displaying Web content.

The wireless communication device 100 has a keypad 128 that includes a number of fixed function keys 132 for accessing defined functions of the wireless communication device 100 (e.g., "Send," "End," and "Power"), number keys 134 for entering digits (and if suitably encoded, for entering other characters), and programmable softkeys 130 which have variable functionality that changes depending on the particular screen display of the user interface 104 being shown.

The wireless communication device 100 stores in its memory 126 and executes an instance of an MMI 102 made in accordance with the present invention. This MMI 102 includes a set of user interface definition files 104, a browser 107, a set of portable components 116, and a portability layer 118. The browser 107 provides the primary user interface mechanism to the user, allowing access to both telecommunication functions, and Internet/World Wide Web access. The portable components 116 provide a set of graphics primitives, file store functions, and localization features that allow the browser to be used on a variety of wireless communication devices 100. The portability layer 118 provides an interface for the browser 107 and portable components 116 to the real time operating system 122 and the telephone control module 120.

The MMI 102 executes as a single-threaded application, and is generally designed to run on any real time operating system 122, telephone control module 120, and wireless communication device 100 that provides sufficient ROM, RAM, and flash memory, a screen display 136, and basic services.

B. THE BROWSER

The browser 107 provides the basic user interface of the wireless communication device 100 and is responsible for displaying content on the screen display 136, as defined by the user interface definition files 104, and as may be retrieved from remote sites, such as Web content accessed via a communication link to a remote Web site. The user interface definition files 104 are a set of content and code files written in a markup language such as HTML, or the preferred variant described below, HTMLp, and may include executable embedded code objects. The present invention is not limited to HTML, but also operates with, and may extend any other markup language, such as SGML, or XML, or other extended non-standard versions of HTML, such as the Netscape Communications' set of HTML extensions.

Since each service operator providing a wireless communication device using the MMI 102 of the present invention will design their own specific user interface, typically modifying some portion of the user interface definition files 104 provided by the device manufacturer, the particular content of the user interface definition files 104 is variable, and expected to be different from any of the illustrative user interface screens described herein. In addition, it is expected that the MMI 102 may be provided to a service operator without any user interface definition files 104 at all, leaving the service operator to create these files as desired; thus the user interface definition files 104, while used by the MMI 102 of the present invention, themselves are not an essential part of the invention. As the user interface definition files 104 define the user interface presented to the user, they allow the service operator to easily and quickly 'brand' the wireless communication device 100, by simple editing of the user interface definition files 104. This branding requires no recompilation of the underlying browser 107, portability layer 118, or portable components 116, and thereby makes customization very easy and cost effective. It also means that the service operator can customize and brand the user interface using simple markup language editing tools, without necessitating the programming skill and environment of conventional code development.

Figure 2:
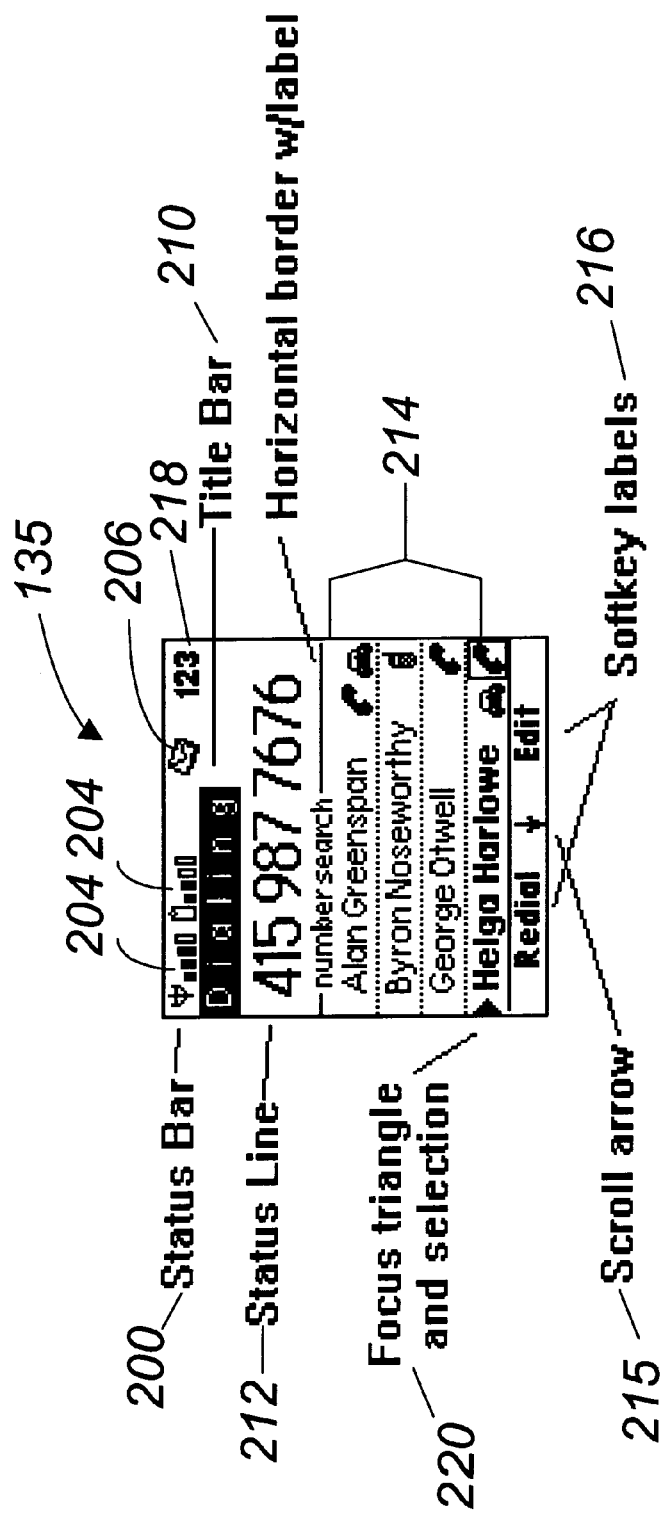
FIG. 2 is an illustration of a sample user interface page for a wireless communication device is accordance with the present invention.

Following the terminology of the World Wide Web, an individual user interface screen is herein called a "page." Referring now to FIG. 2, there is shown a basic layout of a page 135 displayed on the screen display 136 by the browser 107. Each page 135 generally has four basic areas. A status bar 200 that is preferably always present and displays items such as signal strength 202 and battery strength 204, message-waiting indicator 206. A title bar 210 displays the name for a particular screen, if so defined. A status message area 212 may be used to present status messages particular to the current content, such as a telephone number being called or answered. A content area 214 is used to display the particular content of a user interface page, for example, text of a message, phone book entries, and the like. Along the bottom (though other locations may be used) are softkey labels 216, which are dynamically updated according to key definitions provided in the user interface definition files 104. A scroll arrow 215 indicates the current direction in which the user is scrolling (either up or down). In the content area 214, a focus and selection icon 220 may optionally be used to indicate the particular item or line of content that has the focus, i.e. is the current user interface gadget or input field. A mode indicator 218 indicates the mode for text entry, whether alpha, numeric, or a combined alphanumeric mode.

Any of the pages or content displayed on the screen display 136 may be obtained locally from the user interface definition files 104 or remotely from the Internet or World Wide Web. Examples of local content include a telephone book, received text messages, or messages being created for sending, configuration settings for the wireless communication device, and the like. One of the features of the present invention is that whether the content is locally or remotely fetched is largely hidden from the user, except for the delay (if any) in obtaining it. This feature enhances the presentation of seamlessly integrated Internet and World Wide Web access with telecommunication functions.

Most of the features of the user interface are activated by means of a URL (Universal Resource Locator). Nominally, a URL is a means of identifying a piece of data, which data may be predefined, or may be generated on demand based on arguments that are encoded in the URL. A URL is a string that takes the following form:

protocol:data-identifier[?arguments]

The protocol component specifies a communication protocol that should be used to retrieve the data. For content located on the World Wide Web, the protocol is usually "http" for the HyperText Transport Protocol; local content of the user interface definition files 104 is retrieved with the "file" protocol to obtain data in a local file system stored in the memory 126. The present invention provides a number of additional new protocols that control the operation and configuration of the wireless communication device 100.

The data-identifier component is a specification of the desired content to be fetched. Currently, for content on the World Wide Web, the data-identifier normally takes the form of two '/' characters, followed by a machine name, another '/' character, and a path of some sort.

The arguments, if present, are separated from the data-identifier by a '?' and take the form of pairs made of an argument name and its value. An '=' character separates an argument name from its value. Multiple arguments are separated by an '&' character between the value of one and the name of the next.

Figure 3:
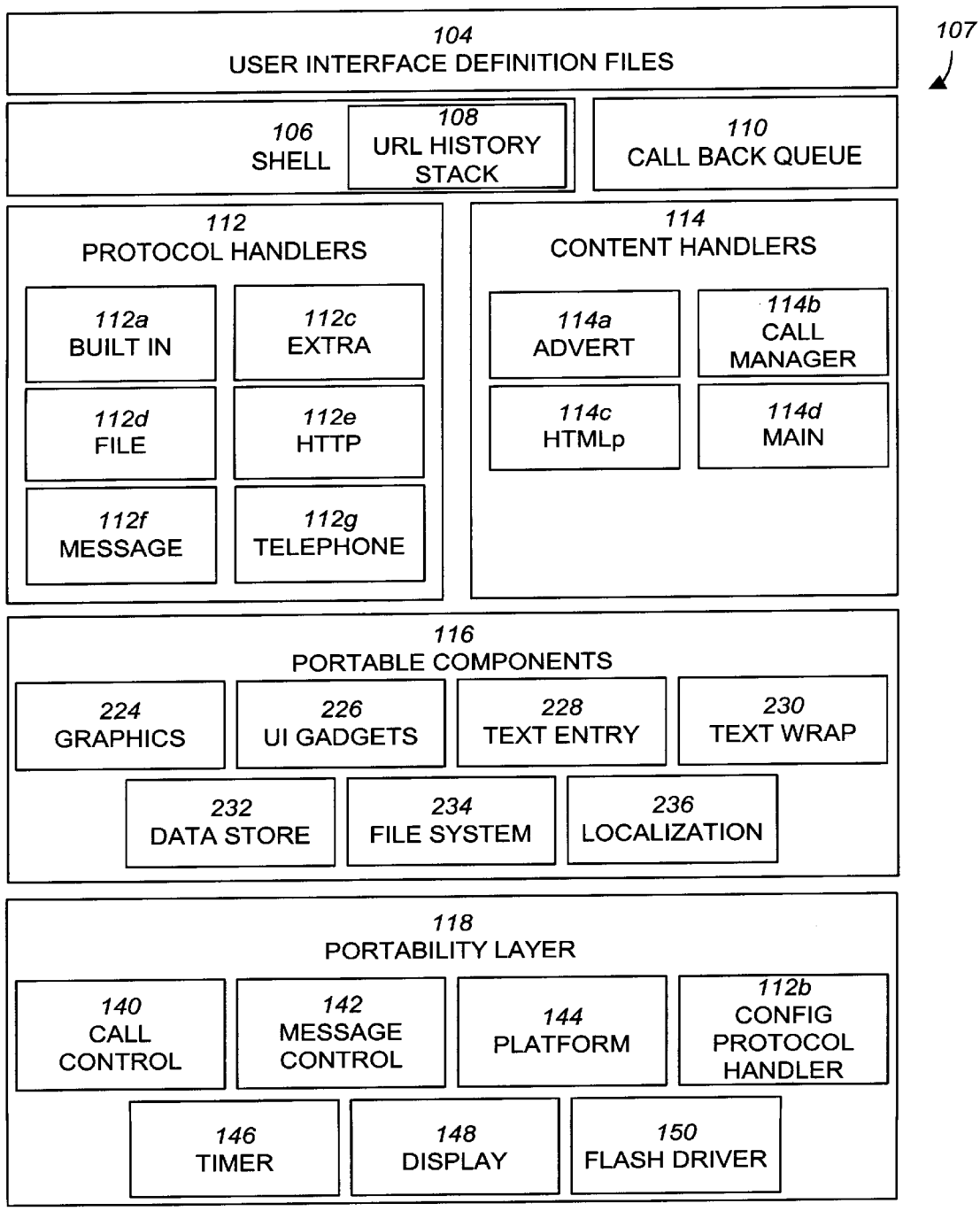
FIG. 3 is an illustration of the detailed software architecture of a man-machine interface of a wireless communication device in accordance with the present invention.

Architecturally, the browser 107 includes three major pieces: shell 106, protocol handlers 112, and content handlers 114. FIG. 3 illustrates the detailed software architecture of the MMI 102, including browser 107.

The shell 106 is responsible for maintaining the universal parts of the screen display 136, for processing URLs by passing portions of a URL to the correct protocol 112 and content handler 114 for the URL, for maintaining a history stack 108 of URLs, and for routing user input. User input routing involves passing user input keystrokes to the appropriate content handler 114 or other target entity for processing, such as entering input numbers and letters into a form, or dialing a telephone number.

Protocol handlers 112 receive a URL from the shell 106, and are responsible for fetching the data corresponding to the URL, and instructing the shell 106 which content handler 114 should receive the data. In some cases, the URL is a command to control features of the wireless communication device 100, which the protocol handler 112 is responsible for executing.

Content handlers 114 are responsible for displaying fetched URL data and interacting with the user. At least one content handler 114 is always the current content handler 114. It is from the current content handler that any new URL is provided back to the shell 106, and that receives by default any keystrokes that are not delivered to any other input target. The shell 106 is further described below with respect to FIGS. 4–5.

1. Overview of the Protocol Handlers

The protocol handlers 112 serve two functions in the MMI 102: First, they fetch data and determine its type; the determination of type in turn determines which content handler is used to display the data. Second, they perform a command in the wireless communication device 100, by accessing an embedded object or the appropriate API of the real time operating system 122, or telephone control module 120. A protocol handler 112 may return the results of that command, causing a different screen to display, or may return no results. The protocol handlers 112 of a preferred embodiment include the following.

Builtin protocol handler 112*a* provides access to icons that are built in to the wireless communication device 100.

Config protocol handler 112*b* gets and sets configuration settings of the wireless communication device 100.

Extra protocol handler 112*c* provides access to arguments and form data that are passed from an embedded object in a page, or from previously accessed pages. This protocol allows data to be passed directly into a page, without requiring the page to be dynamically generated.

File protocol handler 112*d* provides access to local content in ROM and in the flash file systems. Generally, this content is user interface definition files 104 that define the pages of the user interface. The file protocol handler 112*d* may be implemented by those of skill in the art according to a suitable specification for file system access, such as the POSIX specification.

HTTP hander 112*e* is a remote file protocol handler that provides accesses to remote content stored on the World-Wide Web, using the standard HyperText Transfer Protocol. The HTTP handler 112*e* may be implemented by those of skill in the art according to the specification defined in RFC 2068: Hypertext Transport Protocol—HTTP/1.1. Other remote file access specifications may also be used to implement a remote file protocol handler.

Message protocol handler 112*f* activates various messaging functions, including sending a message, deleting a stored message, reading new or stored messages, or locking a stored message.

Telephone protocol handler 112*g* activates various telephone functions, including making a call, answering an incoming call, displaying the phone book, editing a phone book entry, and creating a new phone book entry.

Config protocol handler 112*b* (shown as part of the portability layer 118) retrieves and sets various configuration settings for the wireless communication device 100.

a) Basic Protocol Handler API

Generally, a protocol handler 112 is similar to a device driver, in that it has a well-defined set of functions it can perform, and each protocol handler 112, though supporting the same functions, supports those functions in its own manner. Each protocol handler 112 implements three functions:

GetURL: Given a URL and a security level of the page containing the URL to be fetched, returns the data associated with the URL, and the privilege level of that data. If the URL is actually a command, rather than a reference to data, no data need be returned.

BuildURL: Given a full URL and a partial URL (without the protocol: element), returns a full URL. This is used primarily for references inside HTML pages.

PutURL: Given a URL, a stream of data to be stored under the URL, and the security level of the page containing a "put" method, stores the data if the security level is high enough to allow it.

The various embedded object and command URLs supported by the protocol handlers 112 are described below.

2. Overview of the Content Handlers

Content handlers 114 are responsible for decoding the content data of a page corresponding to a fetched URL and displaying the content, or otherwise manipulating the content. A content handler 114 typically decodes content it receives and presents a page in the screen display 136, or portion thereof. Some content handlers 114 construct the page from data they receive from the memory 126 or over a communications link, while others display the state of the wireless communication device 100 or serve some other administrative function. In a preferred embodiment of the browser 107, the content handlers 114 include the following:

CallManager content handler 114*b* manages an incoming call screen defined in the user interface definition files 104 to enable the user to receive incoming calls. The CallManager content handler 114*b* provides other functionality through embedded objects.

HTMLp content handler 114*c* displays the bulk of the user interface by accessing the appropriate user interface definition files 104 in memory 126. The HTMLp content handler 114*c* includes a HTML 3.2 compatible parser, and is capable of decoding HTML and creating the necessary data structures and objects to display text and graphics according to HTML tags. In addition, the HTMLp content handler 114*c* accepts a modified form of HTML 3.2, herein called "HTMLp" as described below, which provides a number of beneficial extensions to the features and functionality of HTML 3.2.

To better serve as a user interface and provide added flexibility in designing the user interface, the HTMLp content handler 114*c* allows objects, written in C or other programming language, to be embedded in an HTML or HTMLp page to display different types of data that are in the wireless communication device 100. However, the HTMLp content handler 114c, unlike a standard HTML parser, first passes user selected URLs in a current page to any embedded object, allowing the URL to be modified by what the user has selected or entered or fully processed before they are given to the shell 106 to process.

In the preferred embodiment, the available embedded objects include the following:

A phone book object stores records of names, associated telephone numbers, addresses, email addresses, speed dial key selection, ring tone, and other definable fields of data. The phone book object includes methods to get and set the fields of records. A phone book object may be embedded in a page and activated by the appropriate URL of the phone protocol.

A recent and missed phone call list object stores a continually updated list of telephone numbers that were recently called, received, or not answered. The call list object includes methods to delete and dial a telephone number on the list. The call list may be embedded in a page and activated by the appropriate URL, of the phone protocol.

A speed dial number list object stores a set of telephone numbers and associations to keys of the keypad 128, such that the selection of the key provides for speed dialing functionality. This list object include methods to set, get, and dial a speed dial number.

A phone number lookup object accesses the phone book object to return a telephone number(s) associated with an input or selected name or name fragment.

A phone book name lookup object accesses the phone book object to return a name(s) associated with an input or selected telephone number of number fragment.

A list object of text messages/alpha-numeric pages that have been received or sent. The message list object stores a list of messages, including email or Short Message Service messages, and includes methods to view, store, edit, delete, and send messages. The message list may be embedded in a page and activated by the appropriate URL of the message protocol.

The main content handler 114d is primarily a front-end for the HTMLp content handler 114c in that it uses HTMLp to display a main screen for the wireless communication device 100.

The advert content handler 114a is a front-end for the HTMLp content handler 114c that chooses which advertising page to display when the wireless communication device 100 is idle and instructs the HTMLp content handler 114c to display it. In addition, it intercepts keystrokes and user interface gadget activation to optionally delete an advertisement that has been responded to or expired.

a) Basic Content Handler API

Like protocol handlers 112, content handlers 114 have a well-defined interface the shell 106 uses to communicate with them. The interface is tailored around the screen display 135 in the sense that there the content area is defined within the screen display and interaction needs of content handlers 114. The four functions each content handler 114 supports are:

ContentOpen: This is the call that gives a content handler 114 control of the content area 214 of the screen display 136, the softkeys 130 and softkey labels 216, title bar 210, and status message area 212. Each content handler 114 receives the following four pieces of information when its ContentOpen function is invoked:
1. A stream of data returned by the protocol handler 112 that fetched the data; this is data to be displayed.
2. A handle to the content area 214, indicating where the data is to be displayed.
3. A flag indicating whether the content handler 114 has previously displayed this data.
4. A pointer to extra data that was passed by whatever entity asked the shell 106 to fetch the URL, allowing the extra data to be entered into the page being displayed. The use of the extra data is further described below with respect to the <TEMPLATE> tag of HTMLp, and the "extra" protocol.

ContentClose: When the user asks to close a page, or asks to open a different page, the current content handler 114 is closed. It receives a flag that indicates whether the page is maintained in the URL history stack 108, or if it has been removed from the stack permanently.

ContentProcessKey: In the absence of anything else to process a keystroke, the shell 106 delivers the keystroke to the current content handler 114 by default. The current content handler 114 is the one displaying the content whose URL is at the top of the URL, stack.

ContentActivate: When the user presses a softkey 130 or selects an item from a menu, the string that is bound to the key or menu item is passed to the current content handler 114 via this function. In some cases, the string will be a URL that can be passed straight to the shell 106 to be fetched. In other cases, the string is an indication of what the user wishes to do, and the content handler 114 may perform the action itself, or it may use an item the user has selected on the screen display 136 to generate a URL it can give to the shell 106. For example, if the user selects an entry in the phone book and presses a softkey 130 labeled "Edit", the HTMLp content handler 114c will take the string associated with that softkey 130 and pass it to the embedded phone book object, which will use the string as a template for generating the actual URL to pass to the shell 106, based on which phone book entry the user has selected in the embedded object.

The specific functionality of the content handlers 114 is further described below.

3. Control Flow

A preferred implementation of the browser 107 is organized around a single callback queue 110, which takes the place of the event loop used in other environments. Any part of the MMI 102, can request that a function be called at a later time by adding a function request to the callback queue 110.

The callback queue 110 has a number of elements, each of which has a pointer to a function to call, and two 32 bit arguments to pass to the routine. The function pointer can be to any module in the system.

Essentially, the overall system executes a top most control loop:
1. Call the next item on the callback queue 110.
2. Update the screen display 136 with any changes that call made. This step includes drawing graphical elements to the screen (e.g. scrolling, updating status messages and icons) displaying keystrokes, and displaying new pages in response to user activation of functions or features associated with URLs.
3. Go to step 1.

Items for the callback queue 110 are added primarily by asynchronous events such as keystroke (up or down), change in an active call, timer expiration, and incoming text messages.

Certain protracted operations also will use the callback queue 110 to continue the operation, while still allowing other actions (such as user input) to be handled. For example, reading the frames of an animated GIF image is broken into two conceptual phases:

1. Read the first frame and queue a call to read the next frame.
2. Attempt to read the next frame. If successftil, queue a call to read the next frame.

In this way, a page containing the animation can be displayed as soon as possible while the rest of the animation is effectively loaded in the background.

4. The Shell

The shell 106 provides handling of input keystrokes and other inputs from the lower layers, and passing of such inputs to the appropriate protocol handlers 112 and content handlers 114. A list of shell 106 functions is provided in Appendix A.

a) Keypad Input

Keypad input arrives spontaneously at the shell 106 from the portability layer 118. The shell 106 maintains a keystroke target list which is a list of entities, particularly user interface objects of the currently displayed page, that can process the keystroke. When a keystroke arrives, the shell 106 passes the keystroke to the first entity in the keystroke target list, via ShellProcessKey. If that entity decides not to process the keystroke, it calls the shell 106 to give the keystroke to the next entity in the list (ShellPreviousInput). The final entity in the list, placed there by the shell 106 when the list is initialized, disperses the keystroke to the current content handler 114, which can choose to pass to a default processing routine in the shell 106 that implements system-wide keystroke defaults, or the current content handler 114 can handle the keystroke as desired.

The shell 106 includes functions to register an entity (usually a user interface object) into the keystroke target list (ShellGrabInput) and release an entity from the list (ShellReleaseInput).

b) Softkeys

One type of key that has a special function is a softkey 130, which is a key whose label is displayed on a page in the screen display 136, and whose purpose changes from page to page, according to defined parameters in the user interface definition files 104. The shell 106 manages a number of softkeys 130, typically between one and three, but variable depending on the wireless communication device 100. Each softkey 130 may be bound to a string, or to a menu whose menu items specify a string, or the softkey 130 can be set to pop one or more entries from the URL slack, or to do nothing.

When a softkey 130 or a menu item that is bound to a string is activated, the string is passed to the current content handler 114 via its ContentActivate function. In some cases, the string that is bound to a softkey 130 is a URL to be fetched. In this instance, the URL, is passed by the content handler 114 to the shell 106 for processing (ShellGetURL) and fetching by the appropriate protocol handler 112 and content handler 114. In other cases, the bound string is a command that the content handler 114 handles itself without changing pages. Finally, the bound string may be a mixture of the two: a template URL (see below) that is modified by the content handler 114, based on some input from the user, before being fetched.

As noted above, as part of its ContentActivate function, the HTMLp content handler 114c passes a string bound to a user selected user interface entity to any embedded object in the current page before it examines the string itself. Some embedded objects simply take commands to operate on what data they are displaying in this way, while others look for special escapes in the string to substitute some portion of the data the user has selected, yielding a URL, that they then pass to the shell 106. The HTMLp content handler 114c also has certain special commands it accepts, rather than just accepting URLs from hyperlinks.

c) URL Processing

Figure 4:
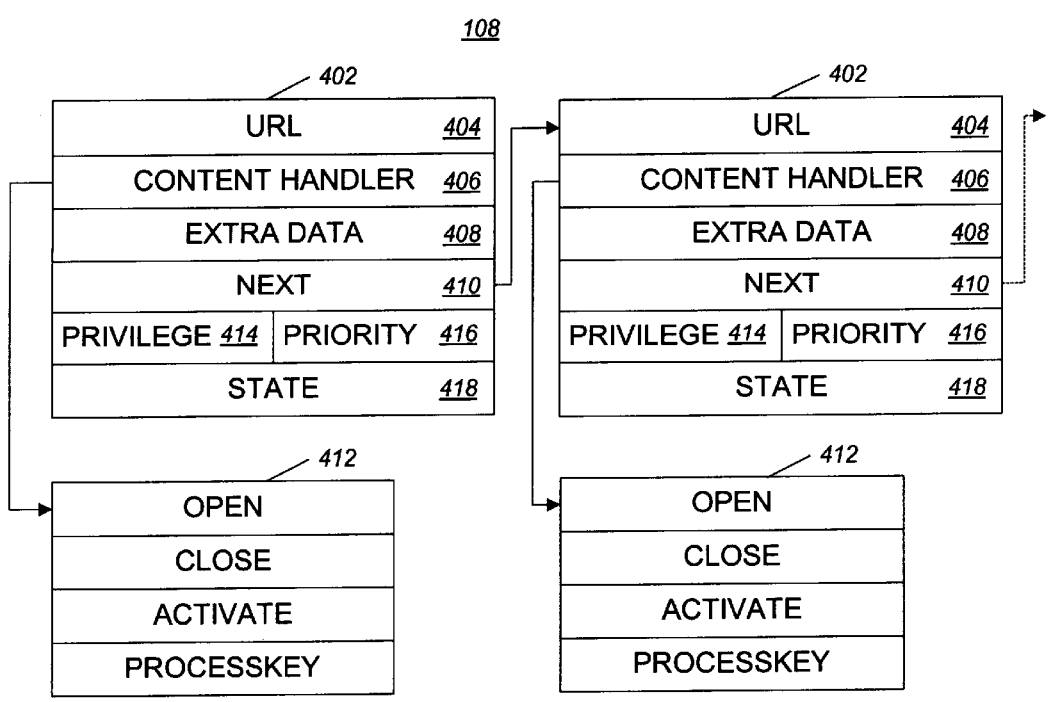
FIG. 4 is an illustration of the URL history stack.

The step of updating the screen display 136 in the above described control flow, when done in the context of obtaining a new page for display, is accomplished by passing a URL to the shell 106 via the ShellGetURL function. FIG. 4 illustrates the URL history stack 108 used by the shell 106 to support URL processing. The URL history stack 108 is a LIFO stack. Each entry 402 includes a URL 404, a pointer 406 to a function table 412 for functions for the particular content handler 114 that handles the URL, extra data 408 (if any) that was passed in with the URL to be retrieved by the "extra" protocol or to be used by the content handler for the URL, a pointer 410 to the next URL, a privilege level 414 at which the page is operating, the priority 416 of the URL, and a pointer to the state block 418 the shell 106 maintains on behalf of the content handler 114.

Figure 5:
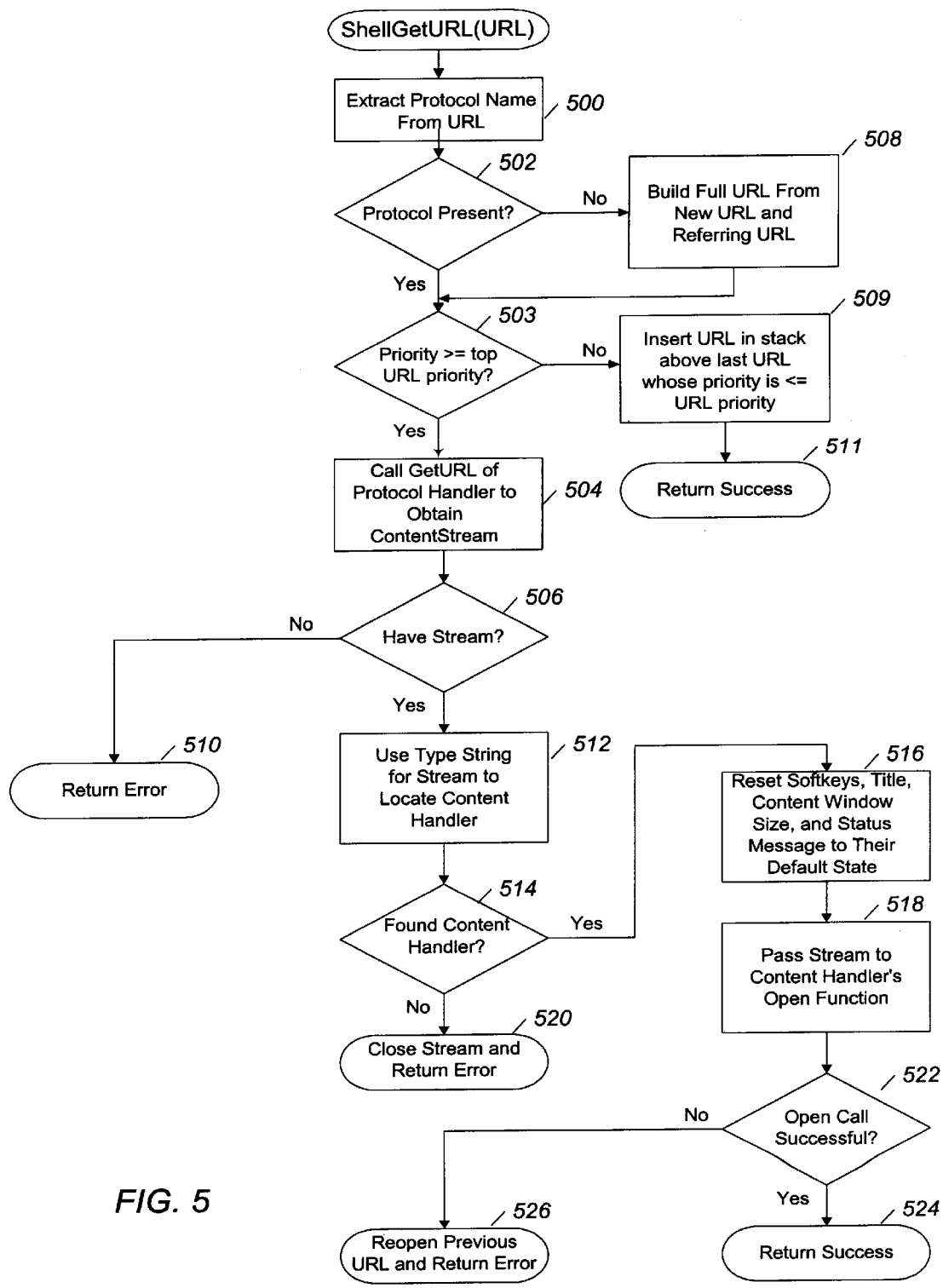
FIG. 5 is a flowchart of the operation of the shell in handling received URLs.

Referring to FIG. 5 there is shown a flowchart of the operation of the shell 106 in handling a URL. The shell 106 extracts 500 the first part of the URL string, before the first ':' character, and compares 502 it to the list of known protocol handlers 112 to identify the appropriate handler for fetching the URL data. If no protocol handler 112 is found, then the shell 106 creates 508 a complete URL by calling the BuildURL function of the protocol for the URL currently at the top of the URL stack, passing it the current top URL and the URL that is being fetched. The protocol handler 112 returns the absolute URL that should be used in place of the relative one that was passed in.

If a protocol handler 112 is found, the shell 106 calls 504 the GetURL function of this protocol handler 112, passing the remainder of the URL. The protocol handler 112 is expected to fetch the URL, and return a pointer to a ContentStream structure that includes a string indicating the type of data returned, the privilege level at which the data should be interpreted, and a pointer to a Stream, which contains the actual data (the data need not be present yet, but reading from the stream must return the data as it arrives). If no stream is returned 506, the shell 106 returns 510 an error.

The shell 106 matches 512 the data-type string against the list of known content handlers 112. If there is no match, the shell 106 returns 520 an error. If there is a match 514, this content handler 114 becomes the current content handler. The shell 106 resets 516 the softkeys 130, content area 214 size, title bar 210, and status message area 212 to their default state. The shell 106 invokes the ContentOpen function of the current content handler 114, passing both the ContentStream and control of the content display area 214 to the current content handler 114 for the content to be displayed.

If the open call is successful 522, the shell 106 updates the URL history stack 108, placing the URL, the pointer to the current content handler 114 functions, any extra data, on the stack, and returns 524 success to the entity requesting the URL, otherwise, the shell 106 reopens 526 the previous URL from the URL history stack 108, and returns an error.

5. Security

Because content that is received over the air is allowed to activate telephone features and access telephone data, such as telephone book entries, the present invention provides mechanisms for security to prevent unauthorized access to functions or data.

When a URL is fetched by a protocol handler 112 as part of its GetURL function, its data are assigned a privilege level by the protocol handler. If content comes from a privileged source, the protocol handler 112 assigns the highest privilege level For example, all pages from the user interface definition files 104 which are stored in the ROM 126 of the wireless communication device 100 are assigned the highest privilege 10 level. Formatted text messages, whether received or created by the user, are assigned a lowest privilege level. Content that does not have an assigned privilege level is automatically given the lowest privilege level by the shell 106. For example, content from the World Wide Web (unless otherwise pre-assigned) is given the lowest privilege level. The privilege level of an item of content is stored with its URL in the URL history stack 108.

Selected functions of the wireless communication device 100 are configured to be privilege-sensitive by either the manufacturer of the wireless communication device 100 or the service operator. When such a function is called it determines the privilege level of the page requesting the content from the page's URL in the URL history stack 108. If the privilege level of the requesting page is higher than the privilege level of the requested content, then the content is accessed. If the privilege level of the requesting page is lower than the privilege level of the requested content, then the function can either deny the access out of hand, or confirm the operation with the user. For example, if a lower privilege page requests to make a telephone call via the CallManager, the user is alerted to the actual number being dialed and must confirm the request before the phone is dialed.

6. The Content Handlers

The following sections outline how the individual content handlers 114 implement the four functions in the API to each content handler 114.

a) The HTMLP Content Handler (1) HTMLp API

The HTMLp content handler 114c provides a fully HTML compliant parser, using the HTML 3.2 specification. This parser is activated as needed by the HTMLp content handler 114c during parsing of a page of content to create user interface entities for display of the screen display 136, and for storing respective data associated with such entities, such as labels, and associated data, including URLs to be fetched when the user interface entity is selected.

As noted above, each content handler 114 provides an external interface of four functions, HTMLpOpen, HTMLpClose, HTMLpActivate, and HTMLpProcessKey. HTMLpOpen and HTMLpClose are described here. For ease of understanding HTMLpActivate, and HTMLpProcessKey are described below, after a description of the new tags of HTMLp.

(a) HTMLpOpen

This function, called by the shell 106, gives control of the content area 214 of the screen display 136 to the HTMLp content handler 114c for displaying a page of content. As noted, the HTMLp content handler 114c receives from the shell 106 a stream of data to display, a handle to the content area 214, a display flag indicating whether the content data (the page) has been previously displayed, and a pointer to any extra data to be associated with the page.

The function determines from the display flag whether the page has been previously displayed, and if so, whether any embedded object in the page was cached. In this case, the page is redisplayed and any embedded object has a RestoreState function called to reestablish its previous state.

If the embedded objects for a page were not cached, or this is the first time the page is being displayed, the content stream for the page is passed to the underlying HTML parser to be interpreted as HTMLp code. The parser will create windows, and user interface entities as needed, and wrap text and update and assign softkeys 130 as necessary. When the page has been completely parsed, it is displayed to the user. In creating the user interface entities, the HTML parser establishes a table of associations between the user interface elements (including keys 132, softkeys 130, menu items, and the like) and URLs (whether local or remote) bound to these entities. The association identifies each particular user interface entity, and a URL that is to be fetched if the entity is selected or otherwise activated by the user. These associations are used when subsequently processing key strokes received by the page by the HTMLpProcessKey function. A handle to the main window that holds all the other pieces of the page is set as a state block 418 for the page via a call to ShellSetState.

(b) HTMLpClose

This function is called when the user closes the current page or switches to a different page. The shell 106 passes in a flag indicating whether the page is to be removed from the URL history stack 108, or if it may remain on the URL history stack 108. If the page is not to be removed, and the page has not been marked as non-cacheable, then the main page is set not visible, effectively hiding it from the user, but maintaining it as an active page.

If the page is non-cacheable or the page is to be removed from the URL history stack 108, the page window and its associated data structures are destroyed. A page is deemed non-cacheable when it refers to data outside itself that could potentially change while the page is not displayed. For example, if the page contains an <INC> ("include") tag or uses the configuration mechanisms described below to display a configuration setting, it is considered non-cacheable. The use of the conditional <IF> tag, and the <TEMPLATE> tag may or may not cause a page to be non-cacheable, depending on whether the DYNAMIC attribute for these tags is set, and whether a %[url] escape is encountered inside a <TEMPLATE> </TEMPLATE> block. These features are further explained below.

(2) Extensions to HTML:HTMLp

The present invention provides an MMI 102 that is fully HTML compatible. However, in addition to merely displaying content, it is desirable to provide a set of HTML extensions for further refining the user interface of a wireless communication device 100, making it more functional for telecommunication functions and the small screen display 136, and allowing the wireless communication device to be easily and quickly customized by both the device manufacturer and the service operator.

The extensions which make up HTMLp are as follows:

(a) A. User Interface Extensions

In this section, the extensions of HTMLp which enrich the user interface are described. These various tags are decoded by the HTMLp content handler 114c when it receives a page of content from the shell 106

(i) Binding Keys to Functions: <KEY> Tag

A typical wireless communication device 100 possesses one to three softkeys 130, the standard number keys 134, and a number of special-purpose keys 132. A new extension of HTMLp allows any key of the keypad 128 to be bound by an HTML page using the <KEY> tag. The syntax is:

<KEY KEY=key LABEL=string ACTION= url|POP|DONE|CLEAR|MENU|GO|NONE>

The value of the KEY attribute is one of the following:

1, . . . m Specifies a softkey to be bound. Keys are numbered from left to right, or from top to bottom (depending on where they are on the phone). Typically (m<=3), but this may be varied per device.

send Specifies the "Send" or "Talk" key.

back Specifies the "Back" key. Not all devices have this key. A page must be privileged to bind this key.

n Specifies one of the dialing keys, where n is the label on the key (0–9, *, or #). To bind all dialing keys to the same action, specify #x.

end Specifies the "End" key. A page must be privileged to bind this key.

mode Specifies the "Mode" or "ABC" key.

clear Specifies the "Clear" or "Del" key.

up Specifies the up-arrow key or down action.

down Specifies the down-arrow key or down action.

left Specifics the left-arrow key.

right Specifies the right-arrow key.

select Specifies the select key or action.

power Specifies the power key. A page must be privileged to bind this key.

default Specifies an action for any key for which no other action has been specified, with the exception of the back, end, and power keys, for which actions must always be explicitly specified, if any other than the standard actions are to be taken.

If the key is a softkey 130, the value of the LABEL attribute is the string that appears in the on-screen label for the key. If the string is too long to fit in the space allotted, it is truncated. The LABEL attribute is valid only for softkeys 130.

The value of the ACTION attribute specifies what should happen when the bound key is pressed. The possible values are:

URL Specifies a URL to be fetched, or some other command for an embedded object in the page. The URL is passed to the HTMLp content handler's HTMLpActivate function for processing.

POP Requests that the previous page be displayed.

DONE Requests that the page before the most-recent <TOP> page be displayed.

CLEAR Requests that all pages be cleared from the URL history stack 108 and the main screen be displayed.

MENU Specifies that the softkey 130 should bring up a menu. The items in the menu are specified by <KEY-MENU> tags in the <HEAD> section. This is valid only for softkeys 130.

GO Asks that the currently selected link be fetched. This is valid only for pages with the <LINKMENU> attribute.

NONE Asks that no action be taken when the key is pressed. This allows the default action for the key to be overridden.

When the HTMLp content handler 114c loads a page with the <KEY> tag, it creates a key binding table that stores the association between the key, label (if any) and action.

The string bound to the ACTION attribute is processed by the HTMLpActivate function, as follows.

(ii) HTMLpActivate

The HTMLpActivate function is used to determine the appropriate response to the string that is bound to a user interface entity, such as a key, softkey, menu item, hyperlink, or the like. The input is a string from the shell 106, and more particularly, a string that is bound to the ACTION attribute of a KEY or KEYMENU tag, or the HREF attribute of an A tag. The new HTMLp tags generally allow any key or menu item of the wireless communication device 100 to be associated with a specific action or URL.

Figure 6A:
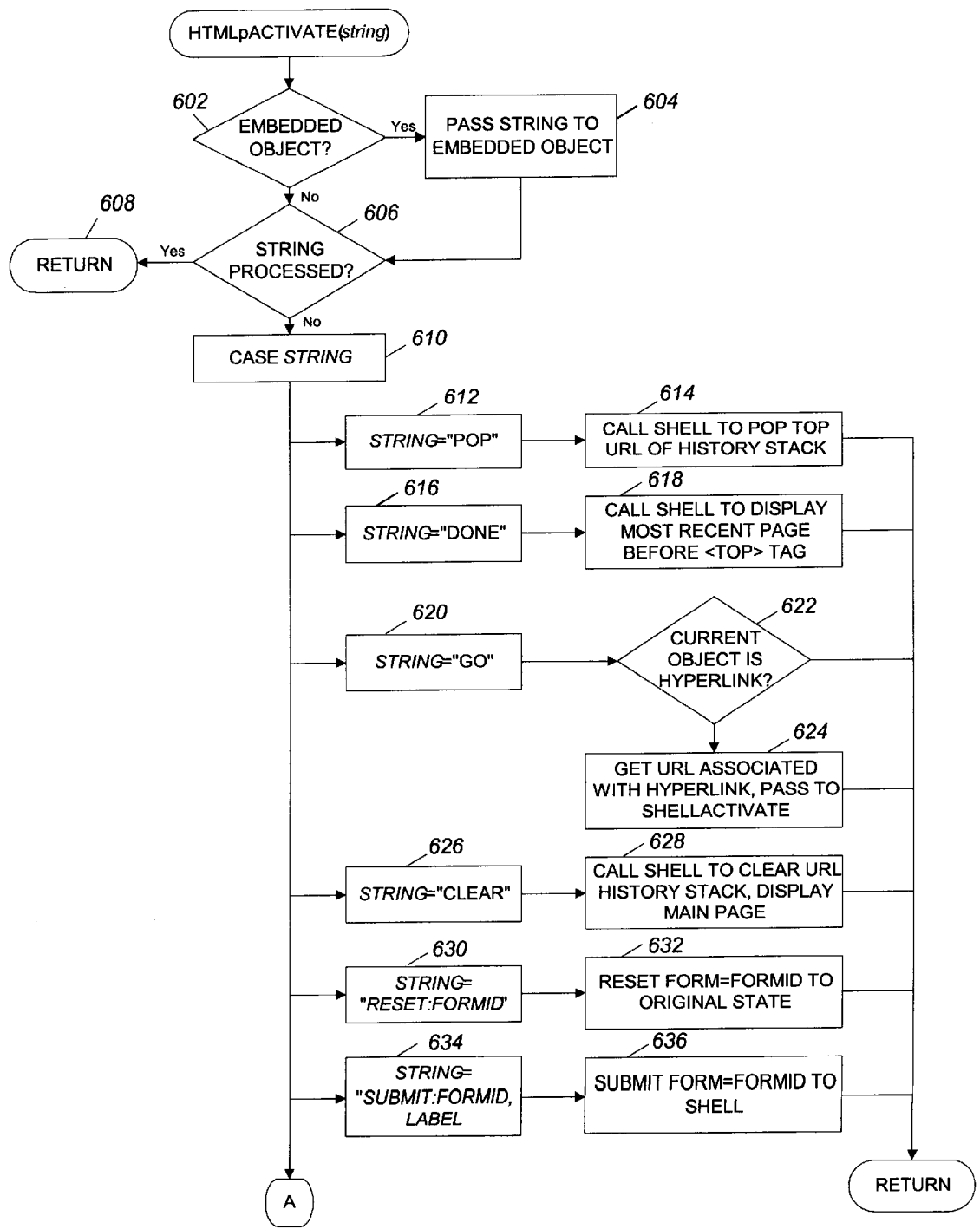
FIG. 6 is a flowchart of the operation of the HTMLp content handler in processing a string input associated with a user interface gadget
Figure 6B:
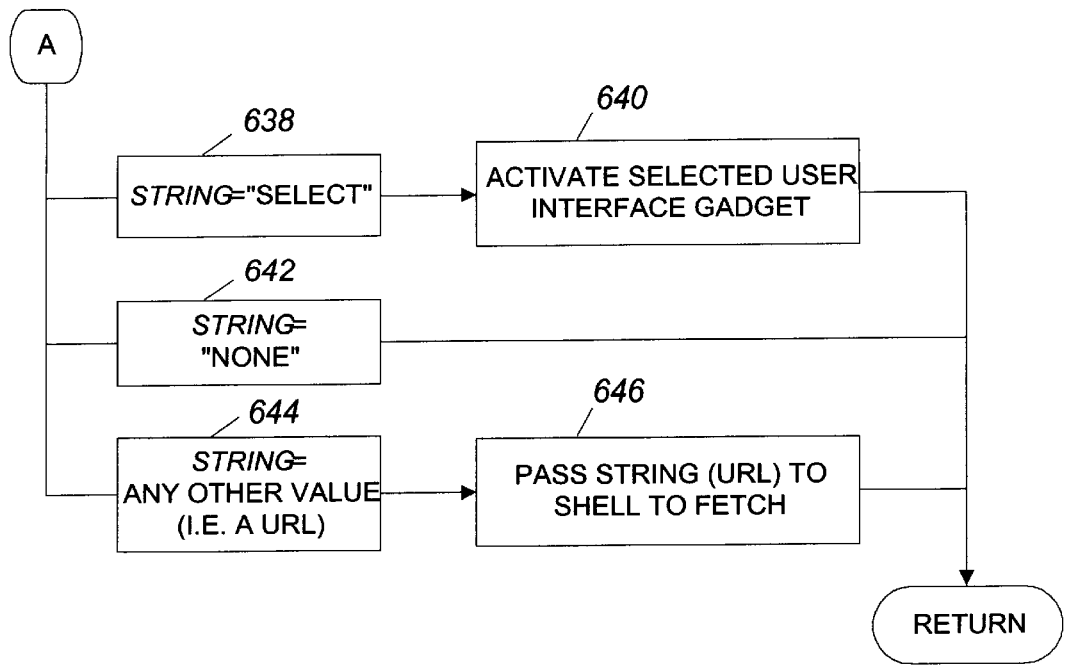

Referring to FIGS. 6a–6b, there is shown a flowchart of one embodiment of the HTMLpActivate function. The HTMLp content handler 114c maintains a list of embedded objects in the current page. If there is an embedded object in the page (602), the function passes the string to the embedded object for processing 604. The embedded object returns a Boolean indicating whether the string was processed, and that no further processing of the string is necessary. If the string was processed by the embedded object (606), then the function returns 608 control to the shell 106. The processing 604 of a string to an embedded object is further described below.

If the string was not processed, the HTMLpActivate function proceeds to process 610 the string according to its value as an ACTION attribute.

If the string is "POP," (612) then the shell's ShellGoBack (POP) function is called 614. This function pops the top URL of the URL history stack 108, and cause the previous URL to be loaded.

Similarly, if the string is "DONE," (616) the ShellGoBack (DONE) function is called 618, which is similar, but displays the page before the most recent <TOP> tag; the <TOP> tag identifies the first part of a multi-part form, as further described below.

The HTMLp content handler 114c maintains a pointer to a current object in the page, which can be an input field in a form or a hyperlink. This current object is where the input focus is located.

If the string is "GO," (620) and the current object is not a hyperlink (622), then nothing happens. If the current object is a hyperlink, the content handler 114 gets 624 the URL string associated with the hyperlink, and passes that URL, string to ShellGetURI, which then fetches the actual content.

If the string is "CLEAR," (626) then the ShellGoBack (CLEAR) of the shell 106 is called 628. This function clears the URL history stack 108 and causes a default main page to be displayed.

If the string has the form "resetformid," (630) then the function returns 632 the input elements of form number formid to their original state. This action is bound to any softkey 130 or softkey menu for an <INPUT TYPE=reset> gadget.

If the string has the form "submitformid,label," (634) then the function submits 636 form number formid according to the METHOD and ACTION attributes of the FORM tag that defined form number formid. If present, label indicates which <INPUT TYPE=submit> gadget the user activated, so its name-value pair can be submitted along with the values from the rest of the gadgets in the form.

If the string is "SELECT", (638) then the function activates 640 the user interface gadget the user has selected, according to the gadget type as follows:

| | |
|---|---|
| <INPUT TYPE=radio> | Selects that radio button and unselects other radio buttons with the same name. |
| <INPUT TYPE=checkbox> | Checks or unchecks the checkbox. |
| <SELECT> | If the options are displayed, it chooses the option the user has selected. If the SELECT list is a pop-down list, the pop-down is closed. |
| hyperlink | Follows the link. |

If the string is "NONE" (642), then no action is taken.

After all these conditionals are passed, if the string is any other value (644), such as a URL, then it is passed 646 to ShellGetURL to be processed. If the URL has no arguments (there is no '?' in it), any parameters that were passed to this page as extra data are also passed in the call to ShellGetURL.

An example of the HTMLpActivate function and its particular benefits for embedded objects is further described below.

An example of processing by the Activate function using the <KEY> tag is as follows. Assume that a page contains the following KEY tag:

<KEY KEY="send" ACTION=phone:dial >

When this page is loaded, the HTMLp content handler 114c stores the association between the Send key and the URL "phone:dial" in its key binding table. This stored data will be used to activate the telephone dialing function of the telephone protocol handler 112g when the user presses the Send key. The HTMLp content handler 114c is the current content handler 114.

Assume that at some later point the user presses the Send key. The portability layer 118 calls the shell's ShellProcessKey function indicating that a key has been pressed, and passes in a key number for the Send key, and a flag indicating that it has been pressed. As noted above, the shell 106 maintains the keystroke target list. The ShellProcessKey sends the received key to the first target on the stack. If this target does not have a purpose for the key, then the target calls the PreviousInput function of the shell 106, passing the Send key index. The shell 106 finds the next item on its keystroke target list. This process repeats until the key is passed to the HTMLp content handler 114c. This happens when the shell 106 calls the ProcessKey function of the current content handler 114, since the URL at the top of the URL history stack 108 contains the pointer 406 to the HTMLp content handler 114c.

The shell 106 then calls the HTMLpProcessKey("Send"). This function looks at the key binding table, which includes the association between the Send key and the URL "phone:dial." The HTMLp content handler 114c calls ShellActivate(phone:dial), which calls the HTMLp content handler's 114c HTMLpActivate function.

Here, it is assumed that there is no embedded object in the page. The function then tests the input string against the various other actions, such as POP, DONE, GO, CLEAR, and NONE. Since the string "phone:dial" does not match any of these, the HTMLpActivate function calls the shell's ShellGetURL(phone:dial) function.

The shell 106 processes this function, as shown in the flowchart of FIG. 5. Continuing the example, the shell determines that the URL is for the telephone protocol handler 112g, and passes the "dial" portion to it for processing. This protocol handler 112g returns a content stream of type "CallManager" (destined for the call manager content handler 114b) that contains the number to be dialed. The shell 106 closes the HTMLp content handler 114c, but does not remove the URL from the URL history stack 108. The shell 106 places the URL "phone:dial" on the top of the URL history stack 108. The shell 106 gets from the content stream returned by the telephone protocol handler 112g the string name of the content handler 114 to handle the stream. The shell 106 looks up the string in its table, and updates the CONTENT field of the top entry of the URL history stack 108. Finally, the shell 106 invokes the Open function of the new current content handler 114, passing in the content stream data. In the Open routine of the call manager content handler 114b, it retrieves the phone number from the stream and invokes the necessary function in the telephone control module 120 to establish the phone call.

(iii) Building Menus

If a softkey 130 is bound to a menu using the <KEY> tag, and ACTION="menu", then the entries for the menu are specified using a <KEYMENU> tag in the HEAD section of the page. The <KEYMENU> tag has the following syntax:

<KEYMENU KEY=n LABEL=string ACTION= url|POP|DONE|CLEAR|GO>

Entries are displayed in the menu in the order in which they are encountered. However, menu entries do not all have to be together in the header.

The value of the KEY attribute specifies to which menu the entry should be added. This is the same value as given for the <KEY> tag that specified a menu should exist.

The value of the LABEL attribute is the string that appears in the menu entry. The menu will be as wide as necessary to hold all the entries. However, the label will be truncated if it is wider than the screen.

The value of the ACTION attribute specifies what should happen when the entry is selected. The possible values are:

URL Specifies a URL to be fetched, or some other command for an embedded object in the page.

POP Requests that the previous page be displayed.

DONE Requests that the page before the most-recent <TOP> page be displayed.

CLEAR Requests that all pages be popped from the URL stack and the main screen be displayed.

GO Requests that the currently selected link be fetched. This is valid only for pages with the <LINKMENU> attribute.

These ACTION attributes are processed in the same manner as the attributes of the <KEY> tag in the HTMLpActivate function, as described above.

FIG. 7 illustrates example of the HTMLp source code for page with a key menu defined, and the screen display 136 when the menu is selected to be displayed. The HTMLp code is shown on the left, and the resulting page on the right. Line 4 defines a menu for the first softkey (KEY=1) Note that when the menu is open, the softkey label 216 for the menu changes to "Select," indicating that if the user presses the softkey 130 again, the selected entry will be activated; this label 216 may change to instead close the menu, leaving the Send key to activate the selection, Lines 5–7 define the menu items for this menu, each of which has its ACTION attribute specifying one of the user interface definition files 104 for the appropriate page to display to retrieve messages, recent calls, or phone settings. Selecting one of the entries in the menu, either by pressing the softkey marked "Select" or pressing the numbered key matching the icon to the left of the entry, causes the ACTION specified in the KEYMENU to be executed. In this example, the appropriate $HTML_p$ user interface definition file 104 is fetched from ROM.

(iv) Delayed Help

Many user interfaces for computers provide some form of online context-specific help text. Conventionally, these help screens are displayed in their own window overlaying the portion of the user interface where the user is expected to enter data. In addition, help screens are typically passive, and appear only in response to a direct action of the user to request help. However, in a wireless communication device with a very small screen display, overlaying a help screen over the content area would hinder the user. In addition, since the user may not know that help is available, passively waiting for the user to request help may be insufficient to assist some users.

To assist users who might be uncertain of what to do next when viewing a page, and to provide such help without obscuring the content area 214 of a page where the user is expected to input data, the present invention enables help text to automatically scroll across the screen in place of the title 210 of a page after a certain amount of time has elapsed without a user input keystroke. More than one help text string may be specified, in which case the strings are displayed in succession, with a suitable interval between each one. The help text strings are displayed only once each, each time the page is viewed.

To allow pages to specify one or more help strings a new <HELP> tag is specified in the <HEAD> section of the document. The syntax of the <HELP> tag is:
    <HELP>help string</HELP>
where help string is the help text to be displayed.

When a page containing the <HELP> tag is loaded, the HTMLp content handler 114c builds a structure, such as a table, that includes the help text strings. This table is passed to the shell 106, which stores the table for later use. The functionality of <HELP> tag is then handled primarily by the shell 106 during idle time processing.

The shell 106 maintain a counter of the number of seconds since the last keystroke. The counter is normally cleared on each ShellProcessKey. The real time operating system 122 has a timer that runs in the background, and calls a routine in the shell 106 that increments the counter. If counter reaches a threshold number of seconds, the shell 106 creates a scrolling banner object, and instructs it to display the first help text string in the table. The scrolling banner object internally determines when the help text string is fully scrolled off of the screen display 136, and notifies the shell 106, which redisplays the title 210. A second threshold is set for displaying the next help string. The thresholds are predetermined by the shell 106 based on a desired length of time for displaying the help text strings.

FIG. 8 shows an example of the HTMLp source for a page including two HELP tags, and the resulting sequence through which the screen display 136 passes when the page is loaded. Lines 7–8 of the HTMLp code define the help text to be displayed. The second and third screen images show the first help text string being scrolled in place of the title.

(v) Pages as Templates

There are a number of extensions of HTML in the present invention that allow pages to be designed using a standard HTML editor, using arguments passed by C code to complete form entry fields, or specifying data to be fetched on the fly from the device to determine the initial state of a form in a page. These extensions include templates, conditional HTML, configuration setting capabilities, and "included" HTML.

Generally, the C code for an embedded object has parameters to be displayed, but it is desirable that the format of the display be defined in the HTML for the page. For example, a page displaying a form of data for an incoming call preferably displays a telephone number and its associated name. Accordingly, the HTML page for displaying the incoming call should be able to take the parameters (telephone number and caller name) and format them as necessary.

However, conventional HTML 3.2 provides no mechanism to pass data directly into a page for this desired application, but rather at best allows the HTML for the page to be created on demand. The generation of HTML is both slow and compute-intensive, and the executable scripts for generating a page typically require more storage than the page being generated, thereby making it less efficient than storing the page itself. By allowing indirect passing of arguments, the present invention eliminates the need to generate HTML at run time. This enables the pages to be stored in the ROM 126, and requires less memory than the code for generating the HTML on demand.

(a) Using Pages as Templates

The first extension which enables data to be passed into a page is the <TEMPLATE> tag. The <TEMPLATE> tag may appear anywhere in page. It must be matched by a corresponding </TEMPLATE> tag at the appropriate place in the structure of the document.

All text between the <TEMPLATE> and </TEMPLATE> tags is examined for escapes of the form %(url), %[url] or %<url>. This includes text within tags, even within quoted attribute values. When such an escape is seen, the data for the URL are fetched and, if they are plain text or HTML, they are inserted into the HTML document in place of the escape exactly as if they had been there all along. To include a % character in the text between <TEMPLATE> and </TEMPLATE>, it must be preceded by another %, as in "%%".

The form %<url> causes the text returned as the data for url to be encoded for use as an argument for another URL. URL arguments have a restricted character set, with anything outside that character set being encoded as % followed by two hexadecimal digits.

The distinction between %(url) and %[url] lies in the caching behavior of the HTMLP content handler 114c. Normally, the data for a page are parsed and the information needed to render the page is saved so long as the URL remains on the URL, history stack 108. This allows for quick redisplay of a page that has already been fetched. If, however, a %[url] escape is seen in a template section, it indicates that the data for the URL are dynamic enough to warrant the reparsing the page when it needs to be redisplayed, to catch any changes in the URL data since the user last saw the page.

Figure 9:
FIG. 9 is an example HTMLp file and page showing the use of the <TEMPLATE> tag for template files.

FIG. 9 illustrates an example of the TEMPLATE tag. In this example, the text between the <TEMPLATE> tags on lines 19–25 defines the template text; the escape on line 20 results in the URL "extra:name" being fetched, which replaces the text with whatever data is stored under the variable "name". The screen display shows this as the text "Adam M."

The HTML 4.0 specification provides for the use of embedded objects in pages. Generally, an embedded object is an item of code positioned at a location on the page that is responsible for constructing and displaying its own content. An embedded object is specified in the URL for the OBJECT tag, located in the desired position in the HTML source. Normally, the URL specifies a code entity such as an ActiveX control, a Java applet, C code, and the like. In the HTML 4.0 specification, the URL is merely passed to a server which return the desired entity. However, in HTML 4.0 once a page with an embedded object is loaded, no further processing or passing of arguments to the embedded object can occur. In particular, when a user selects a hyperlink (a user interface gadget associated with a URL) on a page containing the embedded object, the embedded object does not have any opportunity to process the URL, and instead, the URL is merely followed to the linked page.

However, the present invention extends the functionality of embedded objects by providing URL associated with a hyperlink or user interface gadget first to embedded objects for processing. This lets an embedded object respond directly to arguments provided in HTML forms, without having to have the server update the page. The implementation of this embedded object functionality is provided in the HTMLpActivate function of the HTMLp content handler 114c, as described above with respect to FIG. 6.

As described, when the HTMLp content handler 114c processes a string that is a URL, if there is an embedded object in the page, the HTMLp content handler 114c passes the URL to the embedded object. In accordance with the present invention, an embedded object does one of three actions in processing a URL:

Process the URL as a command,

Look for escape sequences in the URL, and substitute for those sequences information from the data the user selected, before passing the URL to the shell 106 to be fetched; or Return the URL to the $HTML_p$ content handler 114c without processing, to be processed according to the remainder of HTMLpActivate.

As an example of the second type of processing, an instance of the phone book embedded object in an HTMLp page may look for escape sequences such as "@n" or "@I" to replace with the name or record ID of the phone book record the user has selected. The phone book object includes an edit method that can edit either the name of a record, or any of the fields. Passing the URL "phone:edit?Name=@n" to the phone book object will begin the process of adding another number to the selected phone book record by entering the phone book entry creation process with the name already set from the selected phone book record;, passing the URL "phone:edit?id=@i" to the phone book object will edit all the fields of the record.

The advantage of this extended functionality is that instead of having pages hardcoded in C, they can have those elements that require the data access and dynamic behavior of C be coded in C, while the specification of functions the user can perform is done in HTML. This is not possible in HTML 4.0 because the only way for an embedded object to interact with the user is by putting up its own user interface, which again will be hardcoded in the language in which the embedded object is implemented, and thus not easily modified or branded by the service operator.

Figure 10:
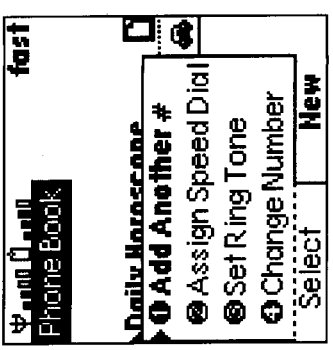
FIG. 10 is an example HTMLp file and page for editing a phone book.
Figure 11:
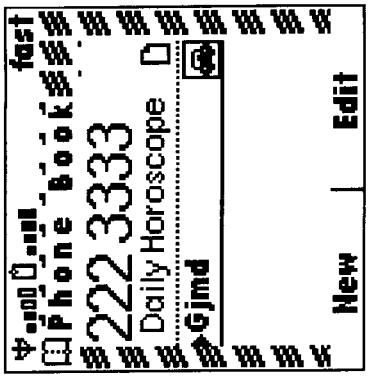
FIG. 11 is another example HTMLp file and page for editing a phone book.

FIGS. 10 and 11 provide two examples of possible phone book pages, and illustrate the flexibility embedded objects can provide with the extended processing of the present invention.

In FIG. 10, the user can create a new entry, or modify one of the fields of an existing phone book entry to change its speed dial key, ring tone, or number. Line 5 defines a key menu, which is shown displayed, activated by the user pressing the first softkey 130. The menu entries (lines 6–12) are bound to URLs that have escape placeholders for data from the current selection. In particular, line 6 defines the ACTION for the menu item to be a URL for the embedded phone book object that will change to the first page of the phone book entry creation process with the name already specified to be that of the current selection in the embedded phone book object. Generally, other URLs in the present invention can be activated using pieces of the selected phone book record to fill in their arguments; any of these URLs can be bound to menu entries, softkeys, or other keys on the keypad. The specific escape sequences are described below, with respect to the phone:list URL of the phone protocol.

In FIG. 11, the user can create a new entry, or go to a separate page to display all the parameters for a particular entry and change them if she wishes (this is done via a separate screen, pbedit.html; the '@' escapes in the editurl argument to the phone:list embedded object extract all the relevant pieces of the entry for passing to pbedit.html). In addition, the a graphical title bar is used here, along with a tiled background of the wireless communication device manufacturer's logo as a border. The object to embed is specified in line 10 with a URL to the phone list object.

When the HTMLp content handler 114c encounters an <OBJECT> tag, it requests the shell 106 to fetch the data associated with the URL given as the CODE attribute to the OBJECT tag. The shell 106 returns this data as a content stream, which must be of type "Object". In the stream is a structure that contains:

A pointer to the object (a window to be made a child of the HTMLp page window)

A pointer to a function HTMLpActivate can call with the string it hasbeen given.

A pointer to a function that will fetch the current state of the object. This is called by HTMLpClose.

A pointer to a function that accepts the state that was fetched and restores the object to that state. This is called by HTMLpOpen when it is told the page has been displayed before.

A pointer to a function that returns the "value" of the object as a string. This is called when the object is part of a form that is being submitted.

A pointer to a function that accepts the "value" to which the object should set itself. The value is a string. The function is called when the object is part of a form and extra data that have the same name as the object (as given by the NAME attribute to the OBJECT tag) were passed.

(b) Accessing Device Settings

The various configurable parameters of the wireless communication device 100 are accessible via the config protocol, further described below. It is desirable to provide pages that can adjust these settings using form gadgets to specify the possible values for each setting. However, to do this, it must be possible to set the initial state of these form gadgets to match the current value of the setting they're supposed to affect.

The form gadgets most preferably used to set the value of a device setting are the radio button, the checkbox, and the scrolling list. The radio button and checkbox are both accessed via the INPUT tag, with a TYPE attribute of either RADIO or CHECKBOX. For these input elements, it is possible in HTML 3.2 to specify a selection attribution which defines whether the input element is selected on the form. The selection attributes include CHECKED and SELECTED. The CHECKED attribute indicates that a radio button or checkbox is to be initially selected. Similarly, a scrolling list is specified by a <SELECT> tag, with <OPTION> tags inside it, any of which may have the SELECTED attribute to indicate that that option of the selection list should be initially selected.

Normally these attributes are Boolean; if the CHECKED or SELECTED attributes exist in the source, the radio button, checkbox, or option is selected, while if they do not, it is not selected. In the present invention, however, these attributes have been extended to accept a value. The value takes the form of an expression, which, if it evaluates true, causes the item to be selected initially.

The expression fetches data from a URL and either treats it as a Boolean value, to be checked for truth or falseness, or compares it to a string for equality or inequality.

The syntax is:

ATTRIBUTE=[!]url or

ATTRIBUTE=url[!]=string

ATTRIBUTE is either CHECKED or SELECTED. The URL here is to a config protocol, and takes the form "config:setting" where setting is the particular setting of interest which the config protocol handler 112b will access.

The first syntax form treats the fetched URL data as a Boolean value, converting the text to an integer and seeing if it is 0 or non-zero. If the leading "!" is present and the value is 0, the item is selected, while if the leading "!" is absent and the value is non-zero, the item is selected. If the url itself contains an equal sign, it must be enclosed in parentheses.

The second syntax form performs a string comparison between the string and the data retrieved for the URL. If "!=" is given, the item is selected if the strings are not equal, while if just=is given, the item is selected if the strings are equal.

If the data returned by the URL is neither plain text nor HTML, the expression always evaluates false and the item remains unchecked.

FIG. 12 provides an example of the use of this extension, showing both the HTMLp source, and the resulting page. Lines 9–14 specify the various configuration settings, showing the CHECKED attribute being set by an expression which is a URL to the config protocol hander. The illustrated page shows the resulting user interface for configuring these settings. In this example, the user will be presented with three radio buttons and a text input field. The user will be able to specify whether the backlight for the screen display 136 should be on only when the device is in-use, or when it's in-use or is plugged in, or not at all. In addition, the user can set the number of seconds without input after which the wireless communication device is consider to no longer be in use. These settings may be stored in the "backlight" and "backlight delay" settings, respectively. When the screen first appears, the radio button that corresponds to the current setting will be checked, and the text input field will contain the current delay.

Generally, when an <INPUT> tag with this extended selection attribute is loaded, the HTMLp content handler 114c passes the URL to the shell 106 to be fetched. The HTMLp content handler 114c evaluates the fetched data according to its syntax form, as described above, and establishes the value of the selection attribute according to the evaluation of the URL data. "Including" HTML "Including" is an extension to HTML that allows blocks of HTML or HTMLp code to be referenced in a page. Any included HTML, is recursively resolved, so that included HTML may itself include other HTML. At present, the HTML 4.0 provides no mechanism to include blocks of HTML from one page into another. A benefit of included HTML is that common HTML components, such a page headers or footers, navigation toolbars, and the like, which are desired to appear in a number of pages, may be easily incorporated by a single reference to the included pages.

The present invention provides a mechanism for including HTML (which also includes plain text) from any source, by giving its URL. This is used primarily to display device settings via template pages, but can also be used to reduce content size by placing elements common to multiple pages in a separate part of the content archive and including it in the other pages. The mechanism is provided by the <INC> tag, which has the following syntax:

<INC SRC=url DYNAMIC>

The SRC (source) attribute must be present, and specifies the URL whose data are to be included in the document at that point. When the <INC> tag is resolved by the HTMLp content handler 114c, the data associated with the URL is fetched inserted at the location of the <INC> tag.

An <INC> tag may be used anywhere in a page, except from within another tag. For example, "<A HREF=<INC SRC=file:commonurl.txt>>" is not allowed.

FIG. 13 illustrates an example of the <INC> tag. In this example, the first page infor.html has an <INC> tag on line 2 referencing the second file bbody.html, which itself has an <INC> tag on line 8 referencing a third file stdlogo.html. When the first page is loaded, the HTMLp content handler 114c fully resolves all <INC> tags, and produces the resulting page, as shown. File info.html has an <INC> tag on line 13 which references the file endbody.html, and this latter file includes the </BODY> tag properly closing the <BODY> tag that appeared in a completely different file, bbody.html.

Generally, when parsing a page, as the HTMLp content handler 114c identifies an <INC> tag, it fetches the reference URL and directly inserts the data from the file into the source of the present file, and resolves it as needed for displaying the page.

If the DYNAMIC attribute is specified for the <INC> tag, it causes the page to be rebuilt when the user returns to it, rather than using display instructions that were cached when the page was temporarily closed. In general, the DYNAMIC attribute indicates that the url used as the SRC refers to data that may change while the page is temporarily closed, so it must be reread and the page rebuilt to accommodate any such change.

(d) Conditional HTML

The display of pieces of a template HTMLp page can be controlled by parameters passed with the URL for the template page, either directly as arguments following a '?' in a URL for the file protocol 112d (arguments specified in a URL for the file protocol 112d are available as values within the file using the extra:protocol), as form data from a METHOD=NEXT form in the referring URL, or as parameters from C code in the present invention.

Conventional HTML does not allow for conditional expressions to be encoded directly in the HTML source of a page to control which elements of the page are displayed. The present invention overcomes this deficiency with the new <IF> tag. The <IF> tag allows for testing of expressions, such parameters or device settings, to control the display of a page. The syntax is as follows:

<IF TEST=expression DYNAMIC>html<ELSE TEST=expression>html<ELSE>html</IF>

The expression in the TEST attribute is evaluated exactly like that described for the CHECKED and SELECTED attributes, above.

For example, consider the HTMLp source:

<IF TEST=extra:conf>
      <KEY KEY=1 LABEL=Conference ACTION=phone:conference>
    <ELSE>
      <KEY KEY=1 LABEL="Pick Up" ACTION=phone:answer>
    </IF>
    <KEY KEY=send ACTION=phone:answer>
    <IF TEST=config:anykey>
      <KEY KEY=default ACTION=phone:answer>
      <KEY KEY=back ACTION=phone:answer>
    <ELSE>
      <KEY KEY=default ACTION=none>
      <KEY KEY=back ACTION=phone:ignore>
    </IF>

In the first <IF> tag, TEST is evaluated with respect to extra data "conf" being passed into the page by the C code that loaded the page. This data is stored in a variable available to the HTMLp content handler 114c. When the page is loaded, if "conf" evaluates to TRUE, then the first softkey 130 (KEY=1) is labeled "Conference" and is bound in the key binding table to the URL "phone:conference", to allow the user to activate the conference feature of the telephone. If "conf" evaluates to FALSE, then the softkey is labeled "Pick Up" instead and the key is bound to a different URL.

In the second <IF> tag, the tested data is a configuration setting of the wireless communication device, accessed by the "config:anykey" URL. Depending on the device configuration for this setting, either all keys, including the Back key, will be bound to the "phone:answer" function, or all keys but the Back key (and any other key that has a specific binding) will do nothing, while the Back key will be bound to the "phone:ignore" function.

The <IF> tag has a DYNAMIC attribute that tells the parser that the URL it uses generates dynamic data and the page should be reparsed, similar to the %[url] form used in template mode to signal that url refers to data dynamic enough to require the page to be rebuilt when it is again made visible.

(vi) Phone Number Entry Field

HTML 4.0 is designed as a general purpose language, and does not include any features that make it particularly adapted for use in a wireless communication device, particularly one capable of making telephone calls, and storing telephone numbers and associated names.

To make HTML more adapted for such a wireless communication device 100, the present invention specifies "phonenum" and "phonename" as new values for the TYPE attribute of the <INPUT> tag. Generally, <INPUT> tag allows specification of a data input type, such as a checkbox, radio button, text, or image.

The new input type of the present invention allows the user to enter a phone number or a person's name. As the user types, the input field uses the input data to look up a matching record in a phone book data structure. Matching records are then displayed in a list below the input field in exactly the same format as is used in the phone book display. Once the matching records are displayed, the user is able to select an item in the list, and have that item be used to complete the form.

More particularly, when the input type is "phonenum," the input digits are compared against all telephone numbers in the phone book; matching telephone are displayed in a list. When the user selects one of the matching telephone numbers in the list, this causes the input field to be replaced by the full selected telephone number, with the portion that matched the input underlined. In matching, single digits (0–9) or double digits (00–99) are matched only against the speed dial list, and display matching speed dial numbers.

When the input type is "phonename", the input characters are compared against the names in the phone book, and those entries that match are displayed, with the characters that matched drawn underlined. Matches in the first word of the name take precedence over matches in subsequent words and the list is sorted accordingly. When the user selects one of the matching names, this causes the input field to be replaced by the full matching name.

FIG. 14 illustrates an example of the HTMLp source and the resulting page. Here, line 7 specifies the phone protocol for dialing a telephone number; the input type is "phonenum". The user has first typed in "2" which is matched against the speed dial list and displays a matching name. In the next image, the user has typed in "995" which is matched against the phone book list, and displays a single matching name. In the third image, the user has selected the name, which causes the entire telephone number that matches including prepending and remaining digits to be inserted into to the input field for use in dialing.

(b) Multi-part Forms

As mentioned earlier, in typical HTML pages destined for the desktop and its large screen, a conventional form will use many input fields. If such a form were displayed on the small screen display 136 of a typical wireless communication device 100, it would be very easy for the user to become lost in the form, because she loses the context of the form, most of which will be scrolled off the screen display 136 at any given time, or she cannot see much of the data being entered. FIG. 16 illustrates an example of a conventional HTML form which would be cumbersome to use on a screen display 136 of a wireless communication device 100.

One solution is to break the single form into a series of forms that each gather one or two of the items required. In this case, however, conventional HTML requires the data from each form to be transmitted to the server as part of the URL that fetches the next form. The server then takes the data passed in the URL and returns a page that must be generated on-the-fly with the passed-in data from the previous forms included as "hidden" type input elements in the form in the returned page. In this manner, the data the user enters get sent up and back multiple times until the entire form has been filled in. This process is very bandwidth intensive, and time consuming, and costly.

The other drawback to breaking a form into multiple forms is what the user has to go through if she decides in the middle that she does not want to complete the form after all. In such a case, the user has to hit the "End" or "Back" key once for each of the subforms that have been filled in, since each is a separate page. If the user is in a hurry, she could easily overshoot and end up dropping out of a place she actually wanted to be in when canceling the form.

FIGS. 17a1, and 17a2, 17b1, and 17b2, illustrate a conventional multiple form method, as described above, where parameters received from a client computer in one HTML page are inserted by the server computer as HIDDEN type inputs in a next HTML page before being uploaded to the client computer. As seen in the figures, multiple pages have to be dynamically created to continually pass this data back and forth between the client and server.

This protocol for sending data back and forth between a server and a client results from a fundamental assumption of standard HTML that each transaction between a client and server is stateless, and thus, no data from previous states may be implicitly relied on to complete a current state.

The present invention overcomes these deficiencies of HTML with a new "NEXT" method for forms, and a new <TOP> tag, which are designed to take advantage of the fact that client is fully able to save its own state and use this information in determining subsequent states.

(vii) The "NEXT" Form Method

A form in an HTML page consists of one or more input elements for gathering data from the user. The data, each piece tagged with the name of the input element from which it came, is submitted to a server according to two parameters in the FORM tag: the METHOD and the ACTION. The ACTION is a URL to which the data are usually appended, while the METHOD is either GET or POST. GET is used to fetch another page based on the data, while POST is usually used to send data to finalize a transaction.

To these two methods, the present invention adds a new NEXT method. Generally, the NEXT method allows a form to be specified in multiple parts, with each part including a subset of all of the input fields of the overall form, and the data for the entire form stored in an external data structure.

The NEXT method has the following effects:

1. The method used on the ACTION URL is "GET" without any modification of the URL; the page is simply fetched from the server. GetURL is the function called for the protocol handler 112.

2. Any form in the fetched page begins with the name/value data-set active in the form on the current page, This includes any name/value data that was passed from a previous page. This replaces the use of "hidden" input fields, avoiding the bandwidth penalty of having to transfer the data up to the server and have it transfer the data and the page back again. Instead, the page can reside on the server without an associated CGI script, or it can reside on the device, having been downloaded with the other pages that make up the transaction when the user subscribed to the service.

FIGS. 18a1, 18a2, 18a3, 18b1, and 18b2, illustrate the HTMLp source and pages for a multi-part form that captures the same information as the illustrated conventional HTML pages, but presents in a significantly more useful and easy to use format for a screen display 136. The first three pages, "purchaseform.html," "addr.html," and "credit.html" all use the NEXT method in the <FORM> tag to specify the next page to be loaded to obtain additional inputs. The last page "confirm.html," uses a conventional ACTION value to specify the CGI script for processing all of the data accumulated on the multi-part form. In this manner, much lower degree of bandwidth is needed between the server and the client to obtain all of the inputs to the form and transmit them back to the server, since the client (the wireless communication device 100) maintains the state data of the previous input pages. This state data of the name, address, credit card number, and so forth is maintained in an internal data structure of the wireless communication device 100 in its memory 126, and thus need not be embedded in HIDDEN type input elements as in conventional HTML. This internal data structure is created as the first page is parsed by the HTMLp content handler 114c, and updated as each new page in the multi-page form is loaded.

The <TOP> tag and "DONE" action used in the "confirm.html" page are explained in the following section.

(viii) Complex Interactions

Given that what would be a multi-element form in standard HTML displayed in a desktop browser can now be transformed into multiple pages in HTMLp, each of which contains a one- or two-element form (in order to fit on the screen display 136 comfortably), a user might easily find herself in the middle of providing data for each of the fields and decide she wishes to terminate the whole process. If all she can do is go back to the previous page, this could be a slow and tedious process to terminate the transaction.

To make termination of a multi-page form easier, the present invention allows a page to be marked as the beginning of a complex interaction a user might want to exit completely. It does this by providing the <TOP> tag:

<TOP> at the desired location of the "top" of the interaction. Such an interaction may be a multi-part form, or any other complex group of pages.

To access the top of an interaction, a softkey 130 is defined using the <KEY> tag with an ACTION attribute of "DONE". When this softkey 130 is selected by the user, the user will return to the page that referred the user to the most recent page marked with <TOP>. This processing of the DONE value for ACTION takes place during the HTMLpActivate function, as described above.

(b) Navigation

The display of HTML on a conventional wireless communication device 100 is further hampered by the heavily-restricted keyboard and the absence of any pointing device. In a typical HTML environment, there is a scrollbar that can be clicked or dragged, a tab key to shift between fields in a form, and a mouse that can select hyperlinks included in the content should the user wish to follow them.

In a wireless communication device 100 in which the present invention advantageously operates, however, there is only the up key, down key, and possibly one of the softkeys 130 that may be relied upon to provide navigational controls. To provide a rich set of navigational abilities, the present invention provides the following features to HTMLp.

(i) Form Entries

When a page contains form elements, the Up and Down arrows are overloaded to allow moving between the form fields in the following fashion:

If the next (for the Down arrow) or previous (for the Up arrow) field in the form is visible, then it is made the active form field. This is denoted by a graphical selection indicator; a text input element will also get a blinking text cursor.

If the next (or previous) field in the form is not visible on-screen, the screen is scrolled so that the next (or previous) line of the page is brought on-screen. If the next (or previous) field is in the line that was brought on-screen, then it will be made the active form field. Otherwise, the current form field remains active.

As the screen display is scrolled, the current form field, is continually updated without requiring the user to directly select the field. In this manners the user can easily switch among fields merely by scrolling, while being able to predictably read explanatory text leading up to the next field to be filled in.

In addition to this, if the first softkey 130 is not bound by the page to some other purpose, it will change its action in the key binding table as the current form field changes, as follows:

TABLE 1

Softkey Navigation Defaults

| GADGET WITH FOCUS | SOFTKEY LABEL | ACTION |
|---|---|---|
| Text field | no label | — |
| Scrolling List (single selectable) | OK | Selects and generates Submit |
| Scrolling List (multi-selectable) | Select | Selects/de-selects item. |
| Popdown (closed) | Open | Opens popdown |
| Popdown (open) | Select | Closes popdown and makes selection |
| Checkbox (selected) | Clear | De-selects |
| Checkbox (unselected) | Select | Selects |
| Radio button (unselected) | Select | Selects button |
| Radio button (selected) | no label | — |
| Standard link | Select | Activates Link |
| Phone:Dial link | Call | Goes to Dial screen displaying the number (can also be activated with Send button). |

The various actions defined in Table 1 provide for appropriate and dynamically variable behavior of the softkey 130 depending on the type of user interface gadget that is the current form field. These actions are dynamically assigned as the user scrolls a page and changes the focus between gadgets, thereby changing the current form field. For example, if the current form field is a hyperlink, then the softkey is automatically assigned to the URL for the link, and selection of the softkey automatically fetches the hyperlink. If the form field is some type of selection device, such as a list, popdown, checkbox, or radio button, then the softkey will either select, deselect, or submit an item from the selection device, as appropriate. For example, if a scrolling list has an item preselected using the SELECTED attribute (with or without the expression evaluation feature of the present invention) then the softkey 130 is defined to deselect the item.

Figure 15:
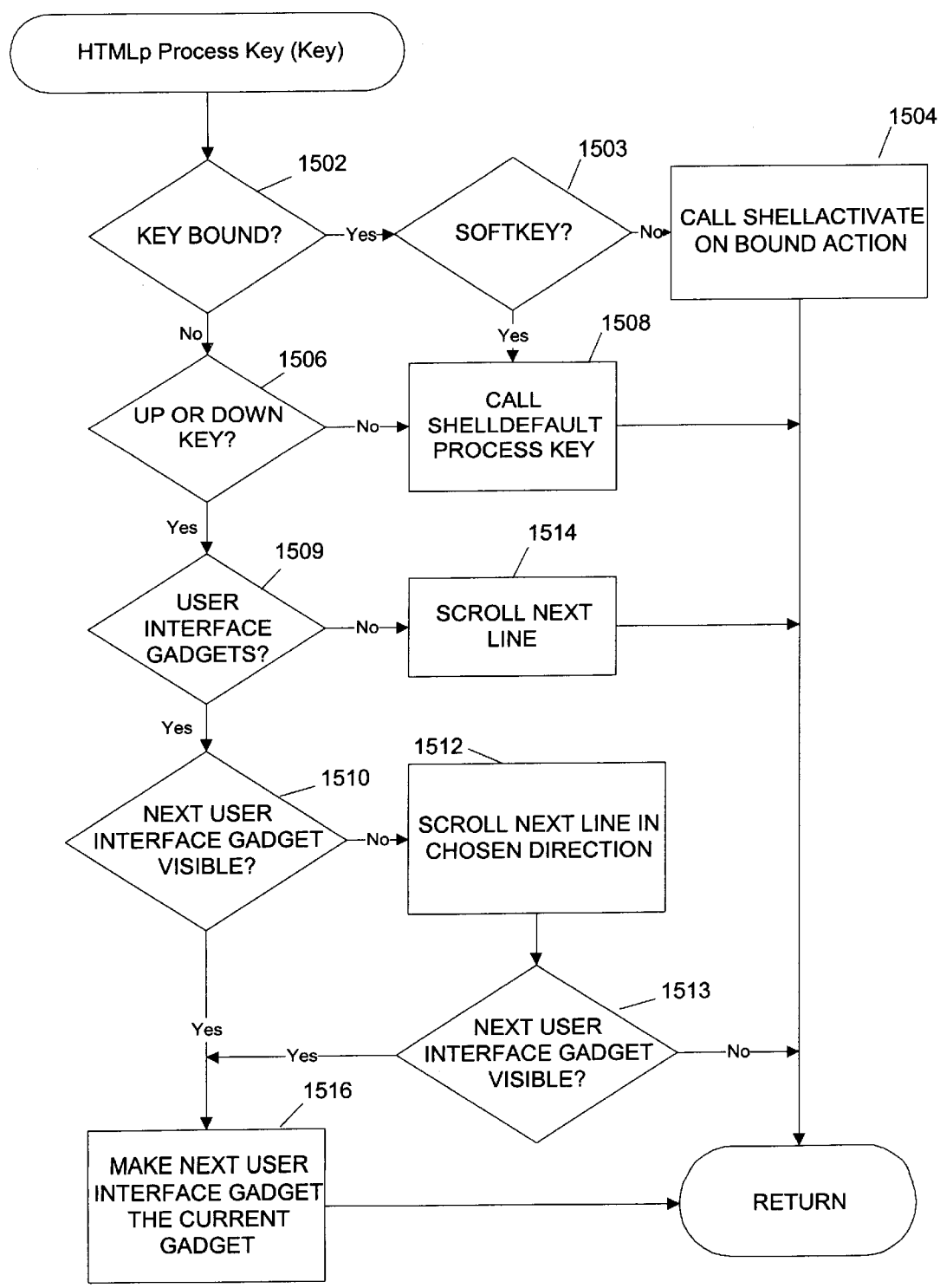
FIG. 15 is a flowchart of the process for handling an input key by the HTMLp content handler.

This functionality for page navigation is implemented in the HTMLpProcessKey function. This function is called by the shell 106 when no other entity of the current page elects to receive an input keystroke. The input to the function is a key number indicating the key of keypad 128, and a Boolean indicating whether the key is pressed or released. Referring to FIG. 15 there is shown a flowchart of one embodiment of the HTMLpProcessKey function.

If there is a URL associated with the key, then the ProcessKey function 606 invokes 1502 the GetURL function of the shell 106, passing the associated URL. The shell 106 will process this URL as illustrated in FIG. 5, to determine the appropriate protocol handler 112 and content handler 114 for handling the URL.

The function determines 1502 from the key number whether or not the key has been bound to some action using the <KEY> tag, or the KEY attribute of the <A> or <INPUT> tags. If so, and the key is not a softkey 130 (which is handled by the shell 106), then that action is passed 1504 to ShellActivate when the key is released.

Otherwise, only the Up and Down keys are handled specially (1506); all others are passed 1508 to ShellDefault-ProcessKey to receive their default handling.

The behavior of the Up and Down keys depends on whether there are selectable user interface gadgets on the page. A selectable gadget is either a form input field (from the INPUT, SELECT, TEXTAREA or OBJECT tags), or a hyperlink (if the LINKMENU tag is present). If there are no selectable gadgets on the page (1509), then the function makes 1514 the next line in the given direction visible.

If there are selectable gadgets on the page (1509), the reaction to an UP or DOWN key is as follows. If the next user interface gadget in the chosen direction is visible (1510), the function makes 1516 that gadget the current gadget. If the next user interface gadget is not visible, then the content area 214 is scrolled 1512 so that the next line in the given direction is visible. If this makes the next gadget visible 1513, it is made 1516 the current gadget. If no user interface gadgets are visible, then no gadget is current.

(ii) Content-as-Menu

Content that does not contain a form can roughly be grouped into two classes: 1) informational content that is meant to be read, and 2) menu content that allows the user to select something from a list, in order to get further information or perform some action.

The scrolling and link-selection behavior needed by the user is different for each of these types of content. In informational content, the scrolling should allow the next piece of the text to be read (as that is the focus of the content), with any links being selected from a menu (the links are of secondary importance). For menu content, however, the importance is reversed: the text serves to explain the links, but it is the links themselves the user needs to see. As such, a link should always be selected and any scrolling that occurs should occur in the context of getting to the next link. Conventional HTML does not distinguish between these types of content, and provides no mechanism for altering the navigational features of the computer displaying the content to accommodate their differences.

To distinguish between these two types of content, and provide the desired navigational controls, the present invention provides a new <LINKMENU> tag. The <LINKMENU> tag can be given in the header to indicate the content is a menu of choices. The syntax is as follows:

<LINKMENU TARGET=name NOSCROLL>

The TARGET attribute has a value that is matched against the NAME attribute for all links on the page. The link whose name value matches the TARGET value is the link that is initially selected when the page is displayed. If the TARGET value takes the form of a URL (the first part of the value is alpha characters followed by a colon), the URL is fetched and the returned contents are compared against the NAME attributes for all links on the page.

If the NOSCROLL attribute is present, it requests that the display not scroll to make the selected link visible.

Specifying a <LINKMENU> has the following effects: First, links are not distinguished graphically (e.g. they are not underlined), as in conventional HTML. Second, the first link on the page is marked as selected (unless the TARGET attribute is given). Finally, the up and down keys set the current user interface gadget to the previous or next link that is visible, as described in the HTMLpProcessKey method. The next link is defined as the one below the current one and the shortest horizontal distance away; this allows columns of links to be handled gracefully and in an expected manner. If the previous or next link is not visible, the screen scrolls a single line in the appropriate direction. If the desired link is then visible, it is selected. otherwise the current link remains active, unless it is now not visible.

If <LINKMENU> is not given in a page, the content is treated as follows. First, links are distinguished by underlining them. Second, If the last softkey is not bound to anything, all links in the page are gathered into a menu bound to that softkey. Finally, the up and down selectors scroll the page one text line at a time.

This functionality of the <LINKMENU> tag is effected by the HTMLp content handler 114c when the handler parses the page and sets up the key binding table and menus.

FIG. 19 illustrates an example of the second type of behavior, where <LINKMENU> is not specified. In this example, all of the links to other content including files, such as iguana.gif, and lizards/blue-tongued-iguana.html, or database data, <a href=map?city=adelaide label=map>, are automatically placed in a menu named "Links" that is bound to the second softkey 130. This menu is displayed, as in the second image, when the softkey 130 is pressed.

FIG. 20 illustrates the first type of behavior, where <LINKMENU> is specified. Note that the links in the page, e.g., <A HREF=flights/ua909.html>UA 909</A>, are not underlined. as in conventional HTML. Rather, the Up and Down arrows will move and select these links in order.

(iii) Binding a Link to a Key

The present invention provides new attributes for the <A> tag. These attributes provide a compatible way to provide content for both a wireless communication device 100 and a desktop computer, as a standard HTML browser will ignore the attributes. These attributes are the KEY and LABEL attributes:

<A KEY=key LABEL=string HREF=url>

If specified, the KEY attribute asks that the indicated key should follow the URL specified by this for the HREF. The "back" key may not be bound in this way. This attribute thus provides a means for binding a specific key to a specific URL.

If specified, the LABEL string will be used in one of two ways:

If a KEY is also provided and is a softkey 130, the string will be the label for the softkey 130 displayed on the screen display 136.

If a KEY is not provided, the string will be the label used in the menu of links that is automatically built by HTMLp content handler 114c when the LINKMENU tag is not given. In the absence of a LABEL attribute, the text of the link will be used (as much of it as will fit).

(iv) Binding Keys to Input Elements

Conventional HTML provides for SUBMIT and RESET attributes for the <INPUT> tag. However, these attributes a hardcoded to either a return key, or a mouse click on a user interface gadget.

The present invention extends the use of the SUBMIT and RESET input elements by enabling them to also be bound to particular keys, using a KEY attribute for the <INPUT> tag that specifies the desired key to be bound.

In a preferred embodiment, by default, SUBMIT elements are bound to a second softkey 130, and RESET elements are bound to the third softkey 130. If a device has only two softkeys 130, RESET elements are inaccessible. Given the simplicity of forms on these devices, however, this is not usually a problem.

A form with multiple SUBMIT elements will have all of them placed in a menu on the second softkey 130, unless an explicit key binding is given. Multiple SUBMIT or RESET elements bound to the same key will be combined into a menu on that key.

(c) Specialized Content

The present invention also includes additional extensions to HTML to support specialized types of content or provide a way to map existing World-Wide Web practices to the smaller screen display 136 of the wireless communication devices 100.

(i) Dialing the phone

Like other telephone type products, wireless communication devices 100 can access DTMF-based network services, or other systems that use DTMF tones to control functionality, such as voicemail systems, and the like. Accordingly, HTMLp includes a new tag that makes it very easy to generate DTMF tones when a page is fetched in order to easily interface with such systems. This is accomplished using the new <DIAL> tag: <DIAL NAME=string ICON=number NOSCREENCHANGE>(n|n@t;)+</DIAL>n is a number or special dial code (like p for pause). @t, specifies a duration, in tenths of seconds, if it is present. The choice between generating DTMF tones and making a new call is made based on whether a call is currently active (not on hold): if a call is active, the DTMF tones are generated.

The NAME and ICON attributes specify the party being called, to be used in the page that is displayed while the call is being placed, and in the follow-up page that allows the dialed number to easily be placed in the phone book. While the ICON attribute is also used in a call-connecting page, its primary purpose is in a call follow-up page that allows the user to store the dialed number in the phone book: phone numbers are identified by their icon in the embedded phone book object and elsewhere, and the ICON attribute specifies the icon to use, if the user does not change it when actually entering the number.

Figure 22:
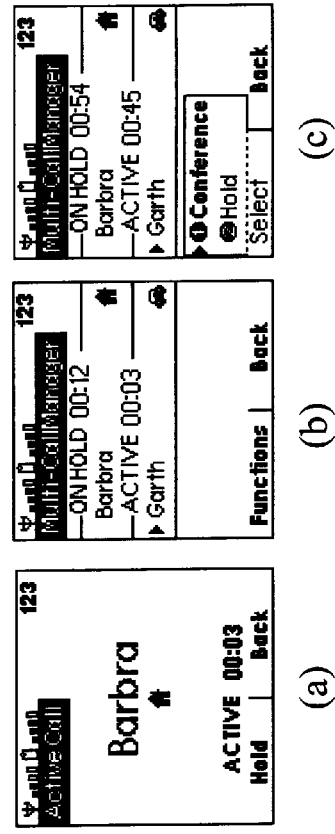
FIGS. 22a–22c illustrate various user interface pages for handling active calls.

The NOSCREENCHANGE attribute indicates that the display should return to this page after the call is successful, rather than changing to be a standard call management page, such as in FIG. 22.

Any attempt by a non-privileged page to actually make a new call is confirmed with the user, to prevent malicious content from issuing unwanted phone calls.

This tag allows for a user interface page to provide a graphical instruction sheet for existing DTMF-based command trees. The user activates functions on the screen which then bring up a new page that generates the appropriate DTMF tones to execute the action the user requested, and that displays the operations available to the user in the new state. FIG. 25 illustrates an example of this type of use. The file entitled "Voice Box" is a user interface page for accessing a voice mail system. The <DIAL> tag in line 2 includes the telephone number for the voice mail system, and a user password "4416722". Lines 4–8 define the keys of the keypad 128 to activate various functions of the system. In the file entitled "Listen", the <DIAL> tag in line 2 first generates the DTMF tone corresponding to the number "5" which triggers the voice mail system to enter a playback mode. Lines 4–8 here assign respective number keys 134 to various actions, each of which is a URL to dial a specific number that generates further functions of the voice mail system. Thus, using the <DIAL> tag allows the user to navigate a voice response system's command tree in graphical manner while providing the correct underlying DTMF signals.

The <DIAL> is provided by the HITMLp content handler 114c to the shell 106, which in turn provides it to the telephone protocol handler 112g for processing, and generation of the DTMF tones corresponding the numbers provided in the URL.

(ii) Advertising Content

Existing World-Wide Web content is largely supported by graphical advertising banners. The limited bandwidth and screen size of the screen display 136 on wireless communication devices 100 makes this sort of advertising problematic, however since conventional image-intensive advertising banners will not properly display on a wireless communication device 100.

The present invention overcomes this limitation by providing an extension to the existing <MARQUEE> tag. This tag normally specifies text to be scrolled across the screen, but is limited to the <BODY> section of the page. Conventionally, if the <MARQUEE> tag is placed in the <HEAD> section, a conventional browser will ignore tag.

In the present invention, HTMLp content handler 114c allows the <MARQUEE> tag to be placed in the <HEAD> section of a document. When so used, the accompanying advertising text in the <MARQUEE> tag alternates with the title of the page and any delayed help that has been specified with the <HELP> tag. This functionality is implemented by the HTMLp content handler 114c responding to a call from the shell 106, which is asked to notify the HTMLp content handler 114c every other time the shell 106 would otherwise display delayed help. When notified, the HTMLp content handler 114c instructs the shell 106 to scroll the advertising text across the title area 210.

In summary, the HTMLp content handler 114c and the HTMLp extensions provide numerous beneficial features and functions not present in conventional HTML.

b) The Advertising Manager

The advertising manager content handler 114a selects an advertisement to display at idle time, deletes old advertisements or those that have been responded to or run their requisite number of times. The advertisements are defined as HTML or HTMLp pages and stored in memory 126 as part of the user interface definition files 104. Advertisements are typically downloaded to the wireless communication device 100 by the operator on a scheduled basis. After the user responds to them, or they have been displayed a certain number of times, or if a more-important advertisement arrives, downloaded advertisements are automatically deleted.

The advertising manager content handler 114a implements the basic content handler functions as follows:

(1) AdvertOpen

An advertisement page is never rerun, as the advertising manager content handler 114a marks the page as temporary, and thus does not store it on the URL history stack 108. This means that any other page that comes up (e.g. incoming call, battery low, or like) will replace the advertising page in the URL history stack 108.

When AdvertOpen is called, it looks at the set of advertisement pages it has available and chooses one to display. It opens the file and passes the stream to the $HTML_p$ content handler 114c to display.

(2) AdvertClose

This function checks the advertisement page it was displaying, and if it is marked for deletion (because it has been responded to or because it has been displayed the required number of times), it deletes the advertisement page.

(3) AdvertActivate

The string is passed to the HTMLp content handler 114c to be processed in HTMLpActivate after the current advertisement is marked for deletion since the user has responded to it.

(4) AdvertProcessKey

Any key press that is not otherwise bound in the advertisement page causes the page to be closed and the key press to be reprocessed by the page that was active before the advertisement page appeared.

c) The Call Manager

The call manager content handler 114b is used for two purposes:
1. To display the active calls
2. To display the connection progress for an outgoing call There is only ever one page on the URL history stack 108 that currently uses the call manager content handler 114b, and that page is in one of these two modes. The call manager content handler 114b implements the basic content handler functions as follows:

(1) CallManagerOpen

If the page is being rerun, this function makes the window it created before to display the page visible again and redisplays its contents.

If this is the first time the page is being opened, CallManagerOpen examines the stream of data for the URL to see if there is a phone number to be dialed. In the stream will be a string of the form:

num=string&name=siring&icon=n

This tells the function the number to dial (with following DTMF tones, if any), the name to display for the number (if the number itself is not in the phone book), and the icon to display along with the name.

If there is a number to dial, the call manager content handler 114b will enter dialing mode, using an interface provided by the telephone control module 120 and display a dialing page showing the progress in making the phone call. This page provides feedback as to which DTMF tones are being dialed, and will report errors should they arise. FIGS. 21a–e illustrate an example dialing page, showing the status of the connection as "connecting," "line is busy," and so forth. In FIGS. 20c–e also show the entire phone number being dialed, with a moving indicator under the present digit which is being dialed.

Figure 21:
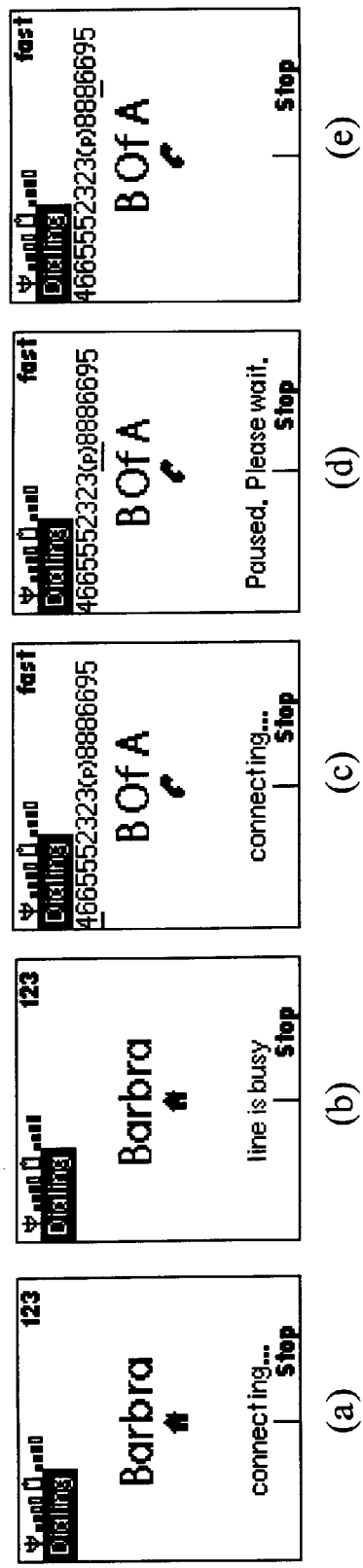
FIGS. 21a–21e illustrate various user interface pages for dialing a telephone number.

In the absence of a number to dial, the content handler 114b CallManagerOpen function displays the list of active calls, along with interface to manipulate them. A simpler interface is presented if there is only one call active. FIGS. 21a–c illustrate these interfaces. FIG. 21a shows the interface for a single active call; FIG. 21b shows the interface for multiple active calls; FIG. 21c shows the same interface as FIG. 21b but with a softkey 130 menu that allows for selection of whether to conference or hold a call.

(2) CallManagerClose

If the page is being closed permanently, and is removed from the URL history stack 108, this will free up the resources it allocated to display the active calls. If there are still calls active, this function calls ShellAddIdleHook so after a certain amount of time with no user input, the list of active calls will again be displayed.

(3) CallManagerActivate

This function looks for the following commands that are bound to the softkeys 130, depending on what actions are available for the selected call:

Conference Joins the other (on-hold) call to the current call in a multi-party call.

Split Removes the selected call from the multi-party call it is in.

Hold Places the selected call or multi-party call on hold.

Pick Up Activates an on-hold call or multi-party call.

Back Closes the call manager screen.

Stop Stops the current DTMF sequence and displays the list of active calls in place of the call-in-progress screen.

(4) CallManagerProcessKey

This function handles the Up and Down keys in the multiple-call case, moving the user selection from one call to the next. The call that is selected is made the active call and the old active call is put on hold.

Number keys 134 generate DTMF tones if the active call is selected (in spite of the response to the Up and Down keys, which would seem to indicate that it is not possible to have the currently selected call not be active, it is possible for the selected call to be on-hold if the user just asked to put it on hold and has not changed the selection), else a dialer screen is brought up, and the digit is entered as the first of a number to call.

The End key terminates the current call. If the call is part of a multi-party call, it is removed from the conference before it is terminated.

The Send key brings up the dialer screen, but does not affect the current call until the user hits Send to make the second call.

d) The Main Content Handler

The main content handler 114d serves largely as a front-end for the HTMLp content handler 114c to display the main page of the device.

(1) MainOpen

Resets the input mode to numeric and the shift state to unshifted, so when the user starts pressing keys, they start dialing a number.

It then opens a stream to the main page, and passes the stream to the HTMLp content handler 114c to display. A sample main page is illustrated in FIG. 22.

(2) MainClose

Calls HTMLpClose with the same arguments.

(3) MainActivate

Calls HTMLpActivate with the same arguments.

(4) MainProcessKey

If the key is End and there are calls active, this function will bring up the active call screen, so the user does not have to wait for it to appear to be able to hang up.

Any other key press is passed to HTMLpProcessKey to be processed.

7. The Protocol Handlers

In accordance with the present invention, the functionality of the wireless communication device 100 is accessed through a number of protocols and protocol handlers 112 that fetch or post data or execute a requested function in response to a URL identifying such data or function.

In a preferred embodiment, there are three main protocols for interacting with the wireless communication device 100: phone, message, and config. A fourth protocol, the "extra" protocol, enables HTMLp template pages to be used for most of the user interface, as described with the <TEMPLATE> tag and other features.

For each protocol, the supported URLs are separated into those that return an object to be embedded in an HTML or HTMLp page, and those that display content or activate a function of the wireless communication device 100.

a) The Phone Protocol

This is the primary protocol for accessing the features of the device and the various embedded objects that are written in C, rather than HTML. It is decoded by the telephone protocol handler 112g. These embedded objects include the phone book object, recent call list object, and the likes as described above. Each embedded object has parameters width and height. These parameters are specified in the URL for the embedded object, and define the pixel width and height for a window to be provided by the embedded object to display its output.

Each embedded object also has a set of methods which it executes according to the URL specification.

(1) Embedded Objects

For each embedded object, there is described the parameters it accepts, as well as the methods that can be performed on it. These methods are strings that are bound to keys 128, hyperlinks, or softkey menu entries.

phone: dialing?width=number&height=number&storekey=n,storelabel/editlabel

Returns a stream containing an embedded object for dialing the phone. The object can look up entries in a stored phone book data structure by number or by name, and displays matches below its input field, as described above, with respect to the phonename and phonenum attributes of the <INPUT> tag.

Parameters storekey Specifies which softkey 130 should be used to allow the user to edit an entry, if she has selected an entry in the match list, or to store the number or name that she has entered. The storelabel and editlabel values specified for the storekey parameter specify the label to be given to the softkey when it is set to perform either of those two functions.

Methods edit Requests that the number selected in the match list be edited.

store Requests that what the user has typed be stored in the phone book by entering the new-phone book-entry sequence with the appropriate field filled in from what the user has typed. If the current text entry mode is numeric, the entered data are taken to be the phone number; if the current text entry mode is non-numeric, it is taken to be the name.

Any action that contains an '@' character is also considered a method of this object. The @ escapes described for the phone:list object will also function here.

phone:list?width=number&height=number&editkey=n,label&service=string&data=string&showstatus Returns a stream containing the phone book embedded object to display records from the phone book data structure.

Parameters editkey Specifies a softkey 130 whose label and action should be changed depending on what is selected (only phone numbers can be edited).

service, data Specify strings to display in the status message area 212 when a service (URL) or data (stored content) entry is selected, while showstatus determines whether any status message 212 is displayed (for phone number entries, the phone number is displayed).

Methods new If the list is in search mode and an entry in the match list has been selected, a new-phone book-entry sequence, a sequence of user interface definition files 104 that collect the name, number, and so forth, and store the result in the phone book, is entered using the name of the selected entry as the name for the new entry. If no entry in the match list is selected, the new-phone book-entry sequence is entered with what the user has typed as initial data. The data are used for the phone number if the current text-entry mode is numeric, or for the name if the current text-entry mode is not numeric.

edit A URL is generated to edit the current phone book entry, and the URL is fetched.

delete The current phone book entry is deleted, after confirming the request with the user.

Any URL that contains an @ character is also considered a method of this object, and is searched for the following escapes. If an escape is found, it is replaced by the relevant piece of data from the current selection. Once all escapes have been substituted for, the resulting URL is fetched.

TABLE 2

Escapes Values

| Escape | Replaced By |
|---|---|
| @i | The record ID of the selected entry |
| @o | The offset of the selected phone number in the entry (0–7) |
| @n | The name in the selected entry |
| @N | The selected phone number (generates an error if the selected icon is not a phone number) |
| @I | The icon of the selected phone number (generates an error if the selected icon is not a phone number) |
| @S | The speed dial number of the selected phone number (generates an error if the selected icon is not a phone number) |
| @r | The ring tone for all numbers in the selected entry |
| @R | The ring priority for all numbers in the selected entry |
| @c | The category for the selected entry |
| @g | The group within the category for the selected entry |
| @@ | A single '@' character. | phone:recentcall?filter=number&editkey=n,editlabel/storelabel&callkey=n,label&width=n&height=n&noempty Returns a stream that contains an embedded object that can display the list of recently-received or -placed phone calls. Each item in the list of calls has a set of flags associated with it. The object can be told to display only items that have a certain flag set. The one flag currently defined is bit 0, which marks a call from a number where the user failed to answer the call.

Parameters

If filter is present, it indicates only calls of a particular type should be displayed (the sole current filter value is 1, meaning incoming calls that went unanswered). editkey and callkey specify a softkey whose label and action should be changed based on the call that has been selected. If noempty is present, it indicates that the screen containing the object should not be displayed if the list of calls, after filtering, is empty.

Methods edit If the current selection is a number that is in the phone book, this brings up the phone book edit screen for the number.

store If the current selection is not a number that is in the phone book, this brings up the new-phone book-entry sequence with the phone number set to the current selection.

call Initiates a call to the number in the current selection.

dismiss Closes the screen after clearing the "missed" flag (bit 0) for all items in the list.

phone:ringtone?width=number&height=n-umber&ptrAddr=hex

Returns a stream that contains an embedded object that can display the list of ring tones the device can produce for an incoming call.

Parameters

If ptrAddr is given, the object gives the user the option of using the system-default ring. When the user has chosen a ring, its number is then placed at the memory address given by hex. If ptrAddr is not given, the object sets the system-default ring.

Methods test Plays the selected ring tone through once.

ok Sets the ring tone to that selected and closes the screen.

phone:speeddial?width=number&height=number&ptrAddr=hexnumber&Name=string&icon=n

Returns a stream containing an embedded object to display the list of speed dial locations.

Parameters ptrAddr specifies where the object should store the selected speed dial number when the user chooses an entry. The Name and icon arguments are identical to those in phone:store, specifying the name and icon of the number being assigned a speed dial number.

Methods ok Sets the speed dial number to the current selection, if the current selection is not currently assigned to another number, then closes the screen. The Name and icon arguments are used in building a confirmation screen for the user.

clear Clears the assignment of the selected speed dial entry.

(2) Content/Command URLs phone:active

Returns a stream of type "CallManager" that causes the active-call screen to display, allowing the user to manipulate any calls that may be active. Does nothing if no calls are active.

phone:answer

Causes any incoming phone call to be answered, returning a stream that causes the active-call screen to display. Does nothing if no incoming phone call. The referring URL is popped from the URL stack if there was an incoming phone call.

phone:conf

Causes any incoming phone call to be answered and joined with the current active phone call. Returns a stream that causes the active-call screen to display. Does nothing if no incoming phone call. The referring URL is popped from the URL history stack 108 if there was an incoming phone call.

phone:dial?num=string&name=string&icon=number&hidden

Causes a voice call to be created to the indicated number. If name and icon are provided, they are used in the page that displays the call progress, and in any follow-up page where the user is asked if she wishes to add the number to the phone book. If hidden is specified, the user will not see the call once it has connected (the active call screen will not be displayed). The URL returns a stream that causes the call-progress screen to be displayed.

If no arguments are given, the URL returns a stream that causes a dialer screen to be displayed, allowing the user to enter a phone number to call.

If the page issuing the request lacks sufficient privilege, the user will be asked if it is permissible to dial the phone number. For example, a received text message lacks sufficient privilege, as it might contain a call to a 900 or long-distance number that the user is not aware of.

phone:display?id=number

Returns a stream that displays the Data field of the specified phone book record.

phone:edit?name=string&num=string&offset=number&id=number

Returns a stream that causes a new/edit screen of the phone book to be displayed with the passed parameters. Offset and id are used only internally to edit an existing record (offset indicates which phone number to edit, while id is the identifier of the record to edit). Name and num, however, can be used to create a new phone book record, giving the user a chance to select an appropriate icon and otherwise edit the entry before storing it in the phone book.

phone:firstopen?password=string

Checks the given password string against that stored in the configuration settings. If it matches, the referring screen is popped and replaced by phone:main. If it does not match, the phone is turned off. This allows the power-on security screen to be an HTML page.

phone:ignore

Causes any incoming phone call to be rejected. The referring URL is popped from the URL history stack 108 if there was an incoming phone call. Does nothing if there is no incoming call. No stream is returned, so the URL that was active before the referring URL was fetched is redisplayed.

phone:indir?url=string&pop=action

Fetches one or more URLs (which activates their side-effects, whatever they may be) before returning the stream from the last one fetched. If the pop argument is given, it indicates that one or more URLs should be removed from the URL history stack 108 before the returned data are displayed. action can be one of pop, abort, or clear, to remove one URL, all the URLs in the current interaction, or all URLs from the history stack 108.

phone:look?cat=number&sort&form=format

Retrieves names from the phone book that are in the category whose number is given by the cat argument. If the sort argument is given, the results are sorted alphabetically. The form argument specifies in what format the data are to be provided. They are always in some form of HTML (the result of this URL is an HTML stream), but the tags used vary as follows:

link: each entry name is formatted as a link to the appropriate place: for an entry with a Service field., the HREF is the contents of the Service field, while for an entry with a Data field, the HREF will show that data. All other entries dial the first number in the entry.

form: the names are formatted as <OPTION> elements of a <SELECT> list (which must surround the <INC> tag that fetches this data). The value of each option is the URL, as described for link.

menu: each entry is provided as a <KEYMENU> tag in the same manner as for link. The key to use is specified by form=menu=x, where x is the key.

count: produces the number of records that are in the given category.

The phone:look URL, when combined with the new <INC> tag, allows an HTML page to display a subset of the phone book in some sort of branded, graphical context. More importantly, it provides a simple way for both a service operator and for the user to manage which services are available to the user. Groups of services are stored in the phone book with a particular category. The device then has a page that uses this URL to display those entries and allow the user to select one of the services. Adding and removing services are simply a matter of adding or removing an entry in the phone book; there is no need to modify the page that displays the list of services.

phone:main

Returns a stream that causes a predefined main screen to be displayed.

phone:release?id=number

Releases the active call, or the specified call if the id argument is given. Returns no data.

phone:shortcut?num=n

Activates a shortcut function. n ranges from 0–9.

Shortcuts are defined by the manufacturer of the wireless communication device 100, and are typically activated by holding down one of the softkeys 130 and then pressing one of the numeric keys 134. They are generally available from all screens, with the exception of the power-on password screen.

For example, shortcut 1 might lock or unlock the keypad, while shortcut 2 might mute the phone's ringer, and shortcut 3 might activate or disable password protection when the wireless communication device 100 is turned on. Certain shortcuts might also be restricted on certain screens other than the power-on password screen.

phone:store?Name=string&Phone=speed=icon=string&Owner=string&Service=url&Category=number&Group=number&Ring=number&Data=type%0adata&speed=speed&icon=i con&id=id&offset=number&prio=n&pop=string Creates, augments or edits a record in the phone book. If id and offset are specified, the selected phone number in that record is edited. Otherwise, if a record with the same Name already exists, the record is augmented, while an unmatched Name causes a new record to be created.

Parameters

Phone The contents of this parameter vary depending on whether the "speed" and "icon" parameters are specified. If they are not specified, this parameter contains a string of the formn "speed=icon=number/speed=icon=number . . . " In other words, a string that specifies one or more phone numbers, giving the speed dial location and icon to associate with each. If "speed" and "icon" are specified, this parameter contains only the single phone number to store in the phone book.

Owner Specifies a password that allows the contents of the entry to be updated over the air.

Service Specifies a URL to be stored in the entry. This URL appears like a phone number in the phone book, but when the Send key is pressed, the data for the URL are fetched.

Category Allows an entry to be hidden from the normal phone book screen, but found by the phone:look URL for inclusion in an HTML page. Categories 0, 1, and 2 are displayed by the normal phone book.

Ring Specifies a ring tone (0 to 127, with 0 meaning to use the system default) to use when a call arrives from any number in this phone book record. If the high bit (32768) is set, it indicates that calls coming from any number in this phone book record should ring through, even if the device is in quiet mode. The high bit can also be set using the prio argument. If this is 1, the high bit will be set.

Data Allows arbitrary data to be stored in a phone book record. The data appear like a phone number in the phone book, but when the Send key is pressed, the data are displayed. The first part of the argument value is the type of data. Typically this will be either text or HTMLp. The second part is the data itself, as a string of hex digits, two per octet to be stored.

Pop (Optional) Causes the URL that requested the phone:store URL to be removed from the URL history stack 108 according to the string value (pop ⇒ just the URL is removed, done ⇒ all URLs back beyond the most recent top URL are removed, and clear ⇒ all URLs back to the main screen are removed).

This particular command provides significant flexibility to the user. First, the DATA argument allows any data, not just telephone numbers, to be stored in the phone book. In particular, URLs, images, audio data, and any other content may be stored, creating a general purpose database in the wireless communication device 100. For example, a user may be viewing Web content, select a URL that is displayed, and immediately store it to the phone book for later recall.

Second, the RING argument allows different ring tones to be specified for each phone book entry . This RING tone will be used when an incoming call is received from any number in that phone book entry. This allows the user to specify particular, distinct ring tones for various telephone numbers. For example, the user may specify particular ring tones for different family members, co-workers, a doctor's office or the like.

Third, the RING argument also allows for priority ringing for any phone book entry and its ring tone, by setting the high bit of the ring tone value, or specifying a non-zero PRIO argument. A conventional wireless communication device typically includes a quiet mode that silences the telephone and normally prevents it from ringing for any incoming call. With the present invention, this RING argument can specify that calls from the phone book entry are not so blocked, and allowed to ring. Thus, the user may set this priority ringing for family members and other important persons, so that even during quiet mode, telephone calls from such persons are allowed to ring.

The call manager content handler 114*b* implements this feature by comparing the telephone number of each incoming telephone call with its store telephone numbers, and using the specified ring tone (if any) to select and control the ringing of the phone.

b) The message Protocol

Text messages, similar to alpha-numeric pages, can be received and viewed using the present invention. Messages are stored in a file and identified by a unique identifier. This protocol is handled by the message protocol handler 112*f.*

(1) Embedded Objects message:list?width=number&height=number&type=type&num=string&lockkey=n,locklabel/unlocklabel Returns a stream containing an embedded object that displays a list of the messages of the given type.

Parameters num (Optional) Indicates that only messages from the given source are to be displayed.

lockkey (Optional) Specifies which softkey 130 is to be updated based on whether the selected message is currently locked; pressing that softkey will toggle the locked state of the message. The locklabel and unlocklabel portions of the parameter specify the label to be given to the softkey 130 based on the function it is then performing.

type (Optional) Specifies what type of messages are to be displayed. Possible values are "TEXT", "FAX" or "VOICE".

Methods lock Locks the selected message against automatic deletion.

unlock Unlocks the selected message, allowing it to be automatically deleted.

new Begins composing a new outgoing message.

open Displays the selected message and marks it as read.

Any URL that contains an @ is also considered a method for this object. It is searched for the following escapes; if an escape is found, it is replaced by the relevant piece of data from the current selection. Once all escapes have been substituted for, the resulting URL is fetched.

TABLE 3

Escapes for Messages

| Escape | Replaced By |
|---|---|
| @i | The record ID of the selected message |
| @b | The body of the selected message (URL-encoded) |
| @n | The phone number to call if one wishes to reply to the message by voice. For a numeric page (a message with just a phone number in it), this will be the number in the page. For all other messages, this is the phone number of the message sender. |
| @s | The phone number of the message sender |
| @@ | A single '@' character |

(2) Content/Command URLs message:count?type=type

Returns a stream that contains the number of messages that are waiting, as text. The possible type values are VOICE, TEXT, or FAX. Usually this is used with the <INC> tag in implementing an inbox for all types of messages, providing a list of the types of messages the device supports, where the list enables the user to get to the individual screen for that type of message. The list can use this URL and the <INC> tag to display the number of messages available on this screen as part of the text that makes up the list. The URL can also be used in the TEST attribute of an IF tag to select a different <IMG> tag based on whether there are any messages of that type available. For example, a static image could be used when there are no messages, while an animated one is used when there are messages of that type available.

message:operate?reply=&delete=&lock=& unlock= &adjust=&id=number

Performs an operation on the message whose id is specified. The possible operations (only one of which may be specified in the URL) are:

reply: causes the message-composition screen to be brought up, with the destination address set to the sender of the message whose id is specified.

delete: causes the message to be deleted, delconfirm: causes the message to be deleted after the user has been asked to confirm the deletion.

lock: causes the message to be marked locked, which prevents it from automatically being deleted when the message store is full.

unlock: causes the message to be marked unlocked, which allows it to be automatically deleted when the message store is full.

If the adjust argument is given, it causes the URL history stack 108 to be adjusted in the following manner:

reply: no adjustment is made.

delete: the referring URL is popped from the URL stack lock, unlock: a stream from the message:read URL is returned for the message, replacing the referring URL.

This URL requires sufficient privilege to operate. If the referring URL lacks the privilege, the operation is confirmed with the user.

message:read?id=number

Returns a stream to display the message whose id is passed. The stream is for a template HTML file. The parameters that fill in that template are returned based on the contents of the message.

message:send ?addr=string&body=string&newaddr= &newbody=&pop=&reply=id

Requests that a text message be sent to the indicated address. If addr is missing, or newaddr is present, this returns a stream and parameters that allow the user to set the address for the message, while maintaining any body that was given.

If body is missing, or newbody is present, this returns a stream and parameters that allow the user to add or edit a body for the message, while maintaining any addr and reply that were given.

If both addr and body are given, and both newaddr and newbody are absent, the message is sent. If reply is given, the corresponding message is marked as having been replied to.

If the message is sent, and pop is present the referring URL is popped from the URL history stack 108.

This URL also operates with the POST operation (PutURL), where the addr is specified in the URL and the stream of data to put to the URL are taken to be the body of the message.

This URL requires sufficient privilege to operate. If the referring URL lacks the privilege, the operation is confirmed with the user.

c) The config Protocol

The third protocol for interaction with device functions is the config protocol, which is used to set and get device configuration information. This protocol is handled by the config protocol handler 112b.

The URLs that are formed with this protocol are the device settings themselves. When a URL is fetched, the current setting of the URL is converted to text and returned as a stream. When data are posted to a config protocol URL, the data are converted as necessary and the device setting is set. A config URL may address bits within a device setting, both for getting and setting. The URL then looks like this:

config:setting.bitnumber:bitsize

If :bitsize is not present, 1 is assumed.

Bitnumber runs from 0 to 31, with 31 being the most-significant bit.

Most settings may be fetched by any module, though some (like the wireless communication device's PIN number) may only be obtained by pages with sufficient privilege (typically HTML files that are in the ROM memory 126). No device setting may be set without sufficient privilege (again, typically by HTML files that are in the ROM memory 126).

Multiple settings can be set by posting to "config:set". The stream then contains lines of the form "setting.bitnumber:bitsize/value"

TABLE 4

Configuration URLs

| URL | TYPE | FUNCTION |
| --- | --- | --- |
| config:keypadlock | Boolean | Engages or disengages keypad lock, when set. |
| config:smspriority | int16 | Rates how important incoming messages are: 0 => display all messages, 1 => display messages with the smskeyword, 2 => put all messages in the inbox |
| config:smskeyword | char[16] | Specifies a word to look for in incoming messages to determine if they are important enough to display. |
| config:ringtone | int16 | Specifies a ring sequence (1–127) to use by default. |
| config:ringmode | int16 | Specifies how to ring the phone: 0 => periodic ringing, 1 => periodic ringing + vibration, 2 => ring only once, 3 => do not ring at all. |
| config:setquietmode | boolean | When set, only calls from high-priority numbers will cause the phone to ring in its normal way. |
| config:quietmode | int16 | Specifies how to ring the phone for non-high priority numbers when in quiet mode. 0 => vibrate, 1 => chirp, 2 => don't do anything. |
| config:setpassword | boolean | When set, causes the user to be asked for a password whenever the phone is powered on. |
| config:password | char[4] | The password that must be entered. |
| config:backlight | boolean | If true, then backlight is turned on when the phone is in-use. |
| config:keyclicks | boolean | If true, then keystrokes generate a clicking sound appropriate to the key that was hit. |
| config:autosearch | boolean | If true, the phone book is searched for matches as the user dials the phone. |
| config:followup | boolean | If true, and a call is made to or received from a number that is not in the phone book and that hasn't been called recently, the user is asked whether to put the number in the phone book. |
| config:lasttime | int16 | The number of seconds the last call was connected. |
| config:totaltime | int32 | The total number of seconds that spent connected. | d) The "extra" Protocol

The "extra" protocol is used primarily with the new <INC>, <IF> and <TEMPLATE> tags to enable HTMLp templates to function as the bulk of the user interface of the present invention. This protocol is handled by the extra protocol handler 112c.

Generally, extra parameters are passed to an HTMLp template either from:

1) the C code of the MMI 102.
2) as an arguments string to a file URL. This takes the form "file://filename?variablename=extra_data". The extra data is stored with its variable name and used to complete the HTML for whatever page is fetching filename.
3) as data from a previous form that used the new METHOD=NEXT attribute to pass the form data to the next URL.

In addition, when a URL that is in an HTMLp page is fetched and it has no arguments, any parameters that were passed to the page that contains the URL being fetched are also passed to the URL that is being fetched.

The extra protocol handler 112c looks for an argument that matches the URL and converts the argument to a stream. For example, "<INC src=extra:body>" will include the "body" argument into the HTMLp stream. As another example, assume there is an HTMLp page that is used to display a message in a standard format with standard graphical elements. The message to display is given as an argument for the URL that loads the HTML page.

For example the URL

"File://message.html?message=Please+enter+a+valid+phone+number"

when given to the extra protocol handler 112 will stores the text "Please enter a valid phone number" as a text string with variable name "message." This extra data will be displayed in any other page by use of the "extra:message" URL, which will output the string data. FIG. 22 illustrates this use. In this example, the extra data is retrieved by use of the <INC> tag, and results in the text string being directly incorporated into the page.

Generally, the extra protocol handler 112c is invoked as a result of the HTMLp content handler 114c parsing an "extra" URL in a HTMLp page. When so identified, the URL is passed to the extra protocol handler 112c for decoding and retrieval of the extra data, which is returned to the HTMLp content handler 114c to render into the page.

e) The builtin Protocol

The builtin protocol provides access to built-in icons and images for use in the SRC attribute of an IMG tag. These icons and images are stored in the ROM of the memory 126. The "builtin" text forms the protocol component of the URL, and the name of the desired icon makes up the data component of the URL. FIG. 23 illustrates a preferred set of icons, and the full URL for specifying them.

Generally, the builtin protocol hander 112a is invoked as a result of the HTMLp content handler 114c parsing a "builtin" URL in a HTMLp page. When so identified, the URL is passed to the builtin protocol handler 112a for decoding and retrieval of the icon or image data from memory 126, which is returned to the HTMLp content handler 114c to render into the page.

C. PORTABLE COMPONENTS

Referring again to FIG. 3, the portable components 116 are a set of user interface entities and other functional components that are used to implement the user interface and storage needs of the wireless communication device 100. The components write to the APIs provided by the portability layer 118, and they serve as the basic implementation elements of the MMI 102 while remaining portable for use with different wireless communication devices 100.

1. Graphics

The graphics system 224 divides the screen display 136 into sections called windows. Windows are arranged in a hierarchy, where child windows are wholly contained within their parent window. However, unlike other window systems, the window system of the present invention distinguishes between two types of windows: "dull" and "sprite". Rather than having every user interface component and window have its own bitmap as in conventional systems, which requires more complex bitmap handling, the graphic system 224 takes advantage of the fact that user interface components generally do not overlap. Instead, the graphics system 224 defines some windows (e.g., dialog boxes, or other windows that do overlap with other windows and need to obscure them) to have a bitmap (to be "sprite"), while the others (the "dull" windows) draw into the bitmap of their nearest ancestor that has one. This distinction reduces the amount of memory needed to store user interface components, and simplifies the process of updating the screen display 136.

When a user interface element draws to a window, the drawing actually happens to a bitmap in memory 126, not directly to the screen display 136. At some point (in the top loop, actually, where the callback queue 110 is processed) all the changes to any and all of these bitmaps are transferred to the screen display 136. This operation ensures a correct and clean update of the screen display 136, and simplifies the underlying video driver, which need only transfer the bitmap from memory 126 to the screen display 136.

The graphic systems 224 provides the following basic graphic primitives:

Lines (thick or thin, arbitrary or special-cased single-pixel-thick vertical and horizontal; horizontal lines, vertical lines, and rectangles can also have a fill pattern to let them be dotted or dashed);

Rectangles (outline or filled);

Bitmaps (single-bit-per-pixel, drawn either as a stencil [a set bit gets drawn in a color, while a clear bit does nothing] or as an image [a set bit gets drawn in one color, while a clear bit gets drawn in another]); and Text.

The coordinate system of the screen display 136 is such that coordinates fall between pixels on the screen display 136 The result is that if rectangle is drawn from (a, b) to (c, d) and another from (c, b) to (e, d), they will not overlap.

Text is drawn and manipulated using a data structure called a TextState. Text has various configurable attributes:

Point size (preset small, medium, and large);

Style (plain, bold, italic, underline, fixed-width and strike-through); and

Color.

TextState also stores the drawing position, which is updated to be just after the string that was drawn, so that multiple strings may be drawn one after another without having to compute their width.

2. User Interface Gadgets

Most of the user interface of a wireless communication device 100 may be provided in the form of softkeys 130 and softkey menus. The content area 214 will generally display text, icons, and HTML forms, and the like. To support these features, a number of user interface gadgets 226 are provided:

Checkbox: used to implement both checkboxes and radio buttons (radio buttons rely on an external callback to know the other radio buttons that need to be deselected when the user selects one) Instantiated in response to <INPUT TYPE=checkbox> and <INPUT TYPE=radio> in HTML.

Icon: displays a built-in icon.

LabelLine: a horizontal line with an optional text label in a standard location in a standard font. Instantiated by the <HR> tag in HTML.

List: the basis for all the various lists of items in the user interface. Specific list subclasses draw the individual items (placed by the List) and determine when the List's selection should be adjusted by a keystroke or other means.

Popup: implements a popup list of strings from which the user can select one or multiple items. Each item has a string value bound to it. Instantiated by the <SELECT> tag in HTML when the SIZE parameter is 1.

ScrollBanner: implements a single-line text banner that can scroll from right to left or from left to right at a specified speed. Instantiated by the <MARQUEE> tag in HTML.

StringList: implements the list part of the Popup, but can also stand alone as a scrolling list. Softkey menus are implemented by a StringList. Instantiated by the <SELECT> tag in HTML when the SIZE parameter is not 1.

TextEdit: a single-line or multi-line text editing area. Instantiated by the <INPUT TYPE=text> and <INPUT TYPE=password> tags in HTML.

These entities are created as needed by the various modules to display various graphic elements.

These various types of user interface elements are created by the HTMLp content handler 114c when a page is parsed and in response to corresponding HTML tags. For example, an INPUTTYPE=TEXT tag in a page will result in a TextEdit object at the appropriate location on the screen display 136. When the user selects the object with the Up or Down key, it is given the input focus to receive keystrokes input by the user, as such keystrokes are passed by the shell 106 to the TextEdit object.

Associated with the user interface gadgets are a couple other modules for entering and displaying text. The TextEntry module 228 accepts keystrokes and maps them to commands for text input. The commands include displaying provisional (subject to further modification based on subsequent keystrokes) characters and words, and replacement provisional characters and words, making the last provisional character or word final, and moving the cursor or inserting symbol characters.

Any entity requiring text input registers with the TextEntry module 228 and then passes nearly all keystrokes to it, rather than interpreting the keystrokes itself. Front-end processing for various pictographic languages is handled in this module, as well.

Another module is the TextWrap module 230, which handles arbitrary regions and wraps text and objects inside those regions. This module is primarily used in displaying HTML content, but can also be used for list entries that are allowed to wrap over multiple lines.

3. Data Store

Another element of the implementation is the data store 232. The data store 232 is a simple "flat-file" database with the following characteristics:

Up to 255 fields per record. Fields have both a name and a number, but only the number is used for actually accessing the data.

All records are defined to logically have all fields. As a storage optimization, if no data have been given for a particular field for a particular record, the field for that record takes up no space.

Each record has a unique identifier (16-bits at the moment) that is used to gain access to the record.

Database records are not manipulated directly. Instead, functions to get and set the fields of a record are used.

A database can have up to eight indices maintained for it. Each index has a selection routine and a comparison routine. The selection routine determines which records are part of the index, while the comparison routine is used to sort the records in the index. When the index is defined, it specifies which database fields are used by the selection and comparison routines. When a record is altered, only if one of those fields is changed will the record be repositioned in, added to, or removed from the index.

To access a record, one of two functions is called to get a DataStoreRecord token. When an entity is done examining or manipulating the record, it calls DataStoreRecordDone.

4. File Systems

The wireless communication device 100 has a file interface that communicates with two underlying file systems:

A read-only filesystem that is a data structure compiled into the code.

A flash filesystem that is spread among flash memory chips of the wireless communication device 100.

File access is via a (minimal) familiar set of functions:

FileOpen
FileCreate
FileRead
FileWrite
FileSeek
FileTruncate
FileClose
FileDelete Each file system is defined by a structure containing routines to call for all the basic operations. The reference for an open file contains file system-specific data and a pointer to the table of routines for the file system on which the file sits. When a file is opened, the upper layer examines the name of the file to be affected and chooses the appropriate table of routines, then uses the Open routine in that table to open the file. Thereafter, access to the file is through the file reference.

D. PORTABILITY LAYER

Referring again to FIG. 3, there is shown the various modules of the portability layer 118. The portability layer 118 is designed to make it relatively simple to implement the MMI 102 with an arbitrary telephone control module 120 and real time operating system 122. It provides the following modules:

1. Call Control

The call control module 140 allows the upper layers to create and manipulate calls, generate DTMF tones, and receive notification of state changes.

The interface is asynchronous, in the sense that operations are performed on calls, but the success or failure of each operation is reported some time after the operation was requested.

TABLE 5

| Call Control Functions | |
| --- | --- |
| FUNCTION | PURPOSE |
| CallCreate | Attempts to begin a telephone call, given the number to dial. The call can be voice, or data, or fax. |
| CallCreateHidden | Like CallCreate, but signals that the call should not be visible to the user. |
| CallRelease | Attempts to hang up a call. If the call is part of a call group (conference), the entire group is hung up. |
| CallHold | Attempts to put a call (or call group) on hold. |
| CallResume | Attempts to take a call (or call group) off hold. If another call or call group is currently active, it is placed on hold first. |
| CallCombine | Attempts to join an on-hold call with the currently active call or call group to form a new or larger call group. |
| CallSeparate | Attempts to extract a call from a call group, making it a separate call again. |
| CallGetInfo | Retrieves various pieces of information about an active call, such as what actions may be performed on it, its current state, to what number it's connected, the time when it connected, the time when it was put on hold, and whether it should be hidden from the user. |
| CallPickup | Attempts to answer an incoming call. |
| CallStartSequence | Marks the start of a series of call manipulation steps that depend on each other. If one of the steps fails, the rest of the steps in the sequence are not attempted. |

TABLE 5-continued

| Call Control Functions | |
| --- | --- |
| FUNCTION | PURPOSE |
| CallEndSequence | Marks the end of a series of call manipulation steps. |
| CallStartDTMF | Begins generating a DTMF tone corresponding to a particular key. |
| CallEndDTMF | Stops generating the DTMF tone that was previously started. |
| CallEnumerate | Calls a function for each active call in the system. |
| CallDataAvailable | For a data call, returns the number of bytes available for reading. |
| CallDataRead | For a data call, reads available data. |
| CallDataWrite | For a data call, writes data to the network. |
| CallSetNotify | Specifies the routine to be called at the end of each call operation and when various asynchronous events occur, such as the arrival of an incoming call. |

2. Message Control

The message control module 142 allows the upper layers to transmit and receive short text messages. This layer may or may not support segmentation and reassembly of larger messages.

TABLE 6

| Message Control Functions | |
| --- | --- |
| FUNCTION | PURPOSE |
| SMSCreate | Given the various parameters of a text message (destination number, body data, body format, and options), returns an SMS token for the message that can then be sent. |
| SMSCreateFromURL | Takes a string of URL-encoded arguments and uses them to create an SMS token for the message. |
| SMSSend | Takes an SMS token and sends the associated message. Notification function is called when the message has succeeded or failed in its attempt at sending. |
| SMSDestroy | Frees the memory used by an SMS token. |

3. Platform

The platform module 144 provides for platform-specific functions.

TABLE 7

| Platform Functions | |
| --- | --- |
| FUNCTION | PURPOSE |
| PlatMutexInitialize | Initializes a variable that call guarantee exclusive access when passed to PlatMutexGrab. While the MMI 102 is single-threaded, there are pieces of the portability layer 118 that may run on a different thread. Those parts of the upper layers that might be called from a different thread (where interrupt-handling code is also viewed as a separate thread) use this mechanism to guarantee exclusive access to data structures. |
| PlatMutexGrab | Gains exclusive access to whatever is governed by the mutual exclusion variable initialized by PlatMutexInitialize. |
| PlatMutexRelease | Releases exclusive access to whatever is governed by the mutual exclusion variable initialized by PlatMutexInitialize. |
| PlatMutexDestroy | Frees up any resources allocated by PlatMutexInitialize. |

TABLE 7-continued

Platform Functions

| FUNCTION | PURPOSE |
| --- | --- |
| PlatWaitForSomething | Pauses until PlatHaveSomething is called. This provides a hook for the portability layer 118 to shut down or yield control of the processor, so the upper layers do not waste processor time unnecessarily. |
| PlatHaveSomething | Releases the upper layer if it is waiting in PlatWaitForSomething. |
| PlatRingPlay | Plays a ring tune or other sound through the system's speaker. Sounds are defined by an index, a volume level, and whether vibration should also happen. 127 sounds are defined as system sounds (keyclicks and error sounds, for example), while 127 sounds are defined as tunes for the phone ringer. Returns immediately, allowing the sound to play in the background. |
| PlatRingStop | Interrupts an active sound that was started with PlatRingPlay. |
| PlatRingGetNumberOfRings | Returns the number of phone ring tunes that are supported/defined. |
| PlatRingGetName | Returns the name of one of the phone ring tunes, for displaying to the user to allow her to select a default ring, or a ring for a particular person. |
| PlatGetPowerStatus | Retrieves the current state of the battery and AC adapter. |

4. Timer

The timer module 146 provides basic timing services that allow the upper layers to receive a function call after a specified amount of time has passed.

TABLE 8

Timer Functions

| FUNCTION | PURPOSE |
| --- | --- |
| TimerAlloc | Allocates a timer that can be used repeatedly. Sets the routine to be called when the timer expires. The routine is called synchronously via the callback queue; it does not interrupt other operations. |
| TimerStart | Specifies the next timeout interval for the timer, in milliseconds. After approximately that amount of time, the routine specified in TimerAlloc is called. |
| TimerStop | Stops a timer from firing. If the timer has already fired, and a call to the timer routine is in the callback queue, the call is removed from the queue, so there is no need to handle getting a call after having stopped the timer. |
| TimerFree | Frees up an allocated timer. If the timer was running, it is also stopped. |
| TimerGetSeconds | Returns a 32-bit counter of seconds. The counter does not need to be relative to anything in particular, so long as it increases steadily once each second. |

5. Display

The display module 148 manages the screen display 136.

TABLE 9

Display Functions

| FUNCTION | PURPOSE |
| --- | --- |
| DisplayDriverBlitIn | Copies part of a bitmap to a point on the display. |
| DisplaySetBacklight | Turns the display's backlight on or off. |
| DisplayDriverSetContrast | Sets the display's contrast to the specified value. |
| DisplayDriverGetContrast | Retrieves the current contrast for the display. |

6. Flash Driver

The flash driver module 150 allows the upper layer file system module 234 to read and write the flash memory chips on the wireless communication device 100.

TABLE 10

Flash Drive Functions

| FUNCTION | PURPOSE |
| --- | --- |
| FlashDriverInitialize | Initializes access to the flash memory. |
| FlashDriverGetInfo | Returns information about the flash driver and the device it is driving. It includes:<br>• The number of erase units in the device<br>• How big each erase unit is<br>• If the device reads and writes in pages, rather than on arbitrary byte boundaries, the driver can specify the page size.<br>• If either the device or the driver supports error-correction for written pages, the driver can indicate this to the flash file system. |
| FlashDriverErase | Erases an erase unit of the device. It may happen synchronously or asynchronously, but in either case a callback function is called when the erase is complete, indicating if the erase was successful. |
| FlashDriverWrite | Writes a number of blocks of bytes to an erase unit in the device. If the device reads and writes in pages, the size of the blocks will always be a page size, though the driver may have to provide harmless bytes for one or more of the blocks that make up the page. |
| FlashDriverRead | Reads a number of bytes from an erase unit in the device. |

7. Config Protocol Handler

This protocol handler 112b allows C code and HTML to get and set configuration settings of the wireless communication device 100. These settings are the ones implemented by the upper layers, and the module communicates other settings to lower-level code as needed. Because of its need to access configuration settings, the config protocol handler 112b is preferably located in the portability layer 118.

A config URL may address bits within a device setting, both for getting and setting. A config URL has the following syntax:

config:setting.bitnumber:bitsize

If :bitsize is not present, 1 is assumed. Bitnumber runs from 0 to 15, with 15 being the most-significant bit.

Most settings may be fetched by any module or page that needs them, though some configuration setting, such as the telephone's PIN number, may only be obtained by URLs with sufficient privilege (typically HTML files that are in the device's ROM). No device setting may be set without sufficient privilege (again, typically by HTML files that are in the device ROM).

The following are a set of preferred configuration URLs for invoking respective functions of the config protocol handler 112b:

TABLE 11

Config Protocol Handler Functions

| FUNCTION | PURPOSE |
| --- | --- |
| ConfigGetIntValue | Retrieves an integral configuration setting. |
| ConfigSetIntValue | Sets an integral configuration setting. |
| ConfigGetStringValue | Retrieves a string configuration setting. |
| ConfigSetStringValue | Sets a string configuration setting. |

TABLE 11-continued

Config Protocol Handler Functions

| FUNCTION | PURPOSE |
| --- | --- |
| ConfigParseSetting | Parses a string reference to a configuration setting, yielding the data type of the setting, and, for integral settings, which bits of the value to affect or fetch. |
| ConfigCheckPassword | Examines the arguments from a URL for a password and compares it against the password stored in the configuration settings. |
| ConfigConfirmPassword | Handles obtaining a password from the user and resubmitting a URL with a password attached (to be examined by ConfigCheckPassword) |

In summary, the present invention provides a system, various methods, and a software product that substantially enhances the flexibility and functionality of wireless communication devices. The present invention, including the use of protocol handlers and content handlers, provides a system and software architecture in which all features and functionality of the wireless communication device may be accessed and manipulated through a markup language based user interface. The extended features of HTMLp and the HTMLp content handler specifically allow Web and other content to be easily displayed on the small screen display of a wireless communication device, and enhance the menuing, navigational features and the form handling features of HTML. By providing access to telephone or other functionality of the wireless communication device through a markup language-based user interface, the present invention allows service operators to easily and quickly generate new user interfaces and custom feature sets for different wireless communication devices, without requiring the expertise, software development environment, or software management problems of conventional MMIs. Further, the present invention allows service operators and manufacturers to quickly and efficiently brand wireless communication devices as desired, again without requiring creation of different MMI software for each service operator.

APPENDIX A

The Shell Functions

The shell 106 offers many functions for the other parts of the present invention to use to process keys, manage the URL history stack 108, and handle other data. They are described briefly as follows:

KEY PROCESSING FUNCTIONS

| FUNCTION | PURPOSE |
| --- | --- |
| ShellProcessKey | Accepts keystroke from the portability layer and passes it to the first entity in the keypad target list. |
| ShellGrabInput | Registers an entity as interested in receiving keystrokes. The keypad target list is processed in LIFO order. An entity is defined as a table of two routines plus a void * those routines can use for any purpose. The two routines are: ProcessKey, which actually receives the keystrokes. GrabChange, which is notified when the entity is or is not at the head of the keypad target list. |
| ShellReleaseInput | Unregisters an entity from the keypad target list. |

-continued

KEY PROCESSING FUNCTIONS

| FUNCTION | PURPOSE |
| --- | --- |
| ShellPreviousInput | Passes the keystroke to the entity that registered before the one calling this function. When called from a content handler's ContentProcessKey function, the shell will process the keystroke according to the system-wide defaults. |

URL STACK MANAGEMENT

| FUNCTION | PURPOSE |
| --- | --- |
| ShellGetURLWithDataAndFlags | Fetches the data associated with the URL and hands control of the content area to the handler for the type of content that is returned by the protocol handler, placing the URL at the top of the URL stack. In addition to the ContentStream returned by the protocol handler, the content handler receives the ShellExtraData passed to this routine. The caller also passes a set of flags that contain the priority of the URL (how important it is to display the data; if the URL stack contains a URL that is of higher priority, the fetching and display of the data associated with the passed URL is delayed until the user has removed the higher-priority URL from the stack) and the privilege level at which to fetch the passed URL. |
| ShellGetURL | Fetches the data associated with the URL and displays it, passing no extra data and using the priority and privilege of the URL at the top of the URL stack. |
| ShellGetURLFlags | Gets the flags (priority and privilege) for the URL at the top of the URL stack. |
| ShellDisplayContent | This is the moral equivalent of a dialog box in the present invention. It allows you to bring up a content handler directly without having to have a protocol handler and URL involved. The content handler receives the same flags and privilege as is enjoyed by the URL that is bringing it up. |
| ShellGetURLStream | Fetches the data associated with the URL without changing what's displayed in the content area. |
| ShellRerun | Refetches the data for the top URL on the URL stack and causes it to be displayed again. |
| ShellGoBack | Pops one or more URL's from the URL stack. The caller passes a parameter that says whether to simply remove the top-most URL, all URL's involved in the current interaction (see section viii) or all URL's but the very first. |
| ShellGoBackString | Like ShellGoBack, but accepts a dynamically-allocated string. |
| ShellPopURL | Pops a specific URL off the URL stack. |
| ShellMarkTop | Marks the current URL as the start of a complex interaction, all components of which can be popped from the stack at once by passing the appropriate argument to ShellGoBack. |
| ShellMarkTemp | Turns on or off the "temporary" attribute of the top-most URL. When a URL is marked temporary, any attempt to fetch another URL will cause the temporary URL to be popped from the stack before the new URL is displayed. |
| ShellPutURL | Stores data for the passed URL. Does not affect the URL stack. |

-continued

URL STACK MANAGEMENT

| FUNCTION | PURPOSE |
| --- | --- |
| ShellSetState | Records a block of state to be associated with the top-most URL on the URL stack. The content handler for the URL is responsible for freeing and altering the contents of the block; the shell merely tracks the address. The intent is to allow the user to return to the same visual place when she pops back to this URL. The shell does not attempt to cache URL data returned by protocol handlers. |
| ShellGetState | Retrieves the block of state for the top-most URL, as was set by calling ShellSetState. |
| ShellGetExtraData | Returns the pointer to the extra data that were passed with the top-most URL. |

URL GENERATION & DECOMPOSITION

| FUNCTION | PURPOSE |
| --- | --- |
| ShellParseURLArgs | Begin parsing the arguments that were encoded in a URL. Arguments are of the form "*name=value*", with multiple arguments separated by '&' characters. Arguments usually follow the first '?' in a URL. |
| ShellGetNextURLArg | Fetches the next argument from the argument list, using the token returned by ShellParseURLArgs. |
| ShellDoneWithURLArgs | Finish parsing arguments from a URL. |
| ShellFindURLArgs | Shorthand function that will search a URL argument string for specific arguments and return their values. Some arguments may be marked as mandatory, causing no values to be returned if not all the mandatory arguments are present. |
| ShellBeginURLArgs | Begin constructing a URL argument list. An initial set of name/value pairs may be given in this call. |
| ShellAppendURLArg | Adds another name/value pair to the argument list that's being built. |
| ShellFinishURLArgs | Returns the now-complete argument string with all name/value pairs suitably formatted and encoded. |
| ShellPrependURLToArgs | Specifies the URL for which these are the arguments. ShellFinishURLArgs will return the URL with the arguments attached. |
| ShellEncodeURLArg | Encodes a string for inclusion in a URL argument list. This is used by ShellAppendURLArg and ShellBeginURLArgs, but is also made available for general use. |

CONTENT STREAM MANAGEMENT

| FUNCTION | PURPOSE |
| --- | --- |
| ShellCreateContentStream | Allocates a ContentStream structure for a stream of the passed type. |
| ShellCloseContentStream | Closes a content stream and frees the ContentStream structure. |

| FUNCTION | PURPOSE |
| --- | --- |
| SOFTKEY MANAGEMENT | |
| ShellDefineKeyGo | Requests that a softkey be given a particular label, and when the key is pressed, the current content handler's ContentActivate function be given the passed string. |
| ShellDefineKeyBack | Requests that a softkey be given a particular label, and when the key is pressed, ShellGoBack be called with the passed argument. |
| ShellDefineKeyMenu | Requests that a softkey be given a particular label, and when the key is pressed, it bring up a menu with the passed entries. When one of the entries is selected, the current content handler's ContentActivate function is called with the string specified for the selected entry. |
| ShellDefineKeyNothing | Requests that a softkey have any previous binding removed. |
| MISCELLANEOUS SCREEN ELEMENTS | |
| ShellDisplayStatus | If the status message area is visible, the shell will display the passed message in that area. |
| ShellDisplayTitle | If the title area is visible, the shell will display the passed title in that area. |
| ShellSetScrollable | Lets the user know whether the content can be scrolled in either direction (up or down). |
| ShellSetNewMail | Show or remove the new-mail icon from the screen. |
| ShellEnlargeContent | Requests that the content area be enlarged to take over the indicated pieces of the screen. The takeover lasts until the next URL is displayed and is not automatically reestablished when the URL making the request is redisplayed. |

| FUNCTION | PURPOSE |
| --- | --- |
| TEXT ENTRY MODES | |
| ShellSetTextEntryMode | Changes the global text-entry mode and updates the mode indicator on the display. The shell itself does not act differently based on the mode, but it is the custodian of the current mode setting that other parts of the present invention consult. |
| ShellSetTextShiftState | Sets the shift state that is used by other parts of the invention. The shift state may also modify the mode indicator the shell displays. |
| ShellGetTextEntryMode | Fetches the current text entry mode. |
| ShellGetTextShiftState | Fetches the current shift state. |
| ShellSetModeSequence | Specifies the sequence of modes through which the shell should cycle when implementing the default processing for the "mode" key. Anywhere from one to all three modes may be specified. |
| ShellEnforceModeSequence | Ensure that the global mode is set to either any of the modes in the current sequence, or to the first mode in the current sequence, depending on the passed parameter. |

-continued

| FUNCTION | PURPOSE |
|---|---|
| IDLE-TIME PROCESSING | |
| ShellAddIdleHook | Requests that a function be called after a specified number of seconds have passed without any user input. |
| ShellRemoveIdleHook | Removes a function that was previously registered with ShellAddIdleHook. |
| ShellDisableIdle | Disables all idle-time processing. This may be called multiple times, but each call must be matched by a corresponding call to ShellEnableIdle. |
| ShellEnableIdle | Re-enables idle-time processing if there are no more outstanding calls to ShellDisableIdle. |

| MISCELLANEOUS FUNCTIONS | |
|---|---|
| FUNCTION | PURPOSE |
| ShellPowerOff | Pops all URL's off the URL stack and asks the portability layer to power off the device. |
| ShellStandardDialog | Brings up a full-screen dialog in a standard format. The caller can specify the message, the style of dialog desired, what to do with the softkeys, and a time without user input after which to take a default action. |

What is claimed is:

1. A computer program product for use on a wireless communication device, the wireless communication device including a memory, a screen display,
   a processor for executing the computer program product, and controls for operating the wireless communication device, the computer program product comprising:
      a shell for receiving a URL having a protocol component and a data component, the data specifying a command to be executed or content to be fetched, the shell providing the data component to a protocol handler according to the protocol component, and the fetched content to a content handler for processing;
      a plurality of protocol handlers, each protocol handler communicatively coupled to the shell to receive a URL and either fetch content specified by the data component and provide the fetched content to the shell, or execute the command specified by the data component; and
      a plurality of content handlers, each content handler communicatively coupled to the shell to receive fetched content and process the fetched content to output the content to the screen display of the wireless communication device.

2. The computer program product of claim 1, wherein:
   the plurality of protocol handlers include:
      a telephone protocol handler that receives a URL from the shell and decodes the URL to activate a telephony function of the wireless communications device;
      a file protocol handler that receives a URL from the shell and decodes the URL to access data stored in a memory of the wireless communications device;
      a remote file protocol handler that receives a URL from the shell and fetches content addressed by the data component of the URL that is stored remotely from the wireless communication device; and
   the plurality of content handlers include:
      a markup language content handler that receives markup language content corresponding to a URL and displays the content on the screen display of the wireless communication device.

3. The computer program product of claim 2, wherein the plurality of protocol handlers include:
   a message protocol handler that receives a URL from the shell and executes a command specified by the data to activate an alphanumeric message display or transmission function of the wireless communication device; and
   a configuration protocol handler that receives a URL from the shell and establishes a configuration setting of the wireless communications device according to the data component of the URL.

4. The computer program product of claim 1, in combination with:
   the wireless communication device wherein:
      the screen display displays fetched content;
      the memory coupled to the screen display, for storing the shell, the protocol handlers, and the content handlers; and
      the processor coupled to the memory to execute the shell, the protocol handlers and content handlers.

5. A wireless communication apparatus, the wireless communication apparatus including a memory, a screen display, and a processor for executing the browser program product, the browser program product comprising:
   shell means for receiving a URL having a protocol component and a data component, the data specifying a command to be executed or content to be fetched, the shell means providing the data component to a protocol handler according to the protocol component, and the fetched content to a content handler means for processing;
   a plurality of protocol handler means, each protocol handler means communicatively coupled to the shell means to receive a URL and either fetch content specified by the data component and provide the fetched content to the shell means, or execute the command specified by the data component; and
   a plurality of content handler means, each content handler means coupled to the shell means to receive fetched content and process the fetched content to output the content to the screen display of the wireless communication apparatus.

6. A wireless communication device, comprising:
   a screen display;
   a plurality of keys;
   a plurality of configurable features;
   a processor coupled to the screen display and the keys;
   a shell executed by the processor for receiving a URL having a protocol component and a data component, the data specifying a command to be executed or content to be fetched, the shell providing the data component to a protocol handler according to the protocol component, and the fetched content to a content handler for processing;
   a plurality of protocol handlers, each protocol handler executed by the processor and coupled to receive a URL from the shell and either fetch content specified by the data component and provide the fetched content to the shell, or execute the command specified by the data component; and a markup language content handler executed by the processor and coupled to the shell that receives markup language content corresponding to a URL and displays the content on the screen display, the markup language handler decoding markup language tags from a group comprising:
- a key tag defining an action for one of the plurality of keys;
- a help tag defining help text data to be periodically displayed on the screen display;
- a keymenu tag defining a menu item for a menu associated with a key;
- a tag specifying a second markup language page different from a first markup language page for including the data of the second markup language page in the first markup language page;
- an input type tag defining an input field for receiving a user input of a configuration setting, and a selection attribute equal to the value of an expression including a URL for a configurable feature, the selection attribute indicating whether the input field is preselected; and
- a conditional tag having an expression including a URL and first markup language data to be conditionally displayed according to the value of the expression.

7. A computer-implemented method of operating a wireless communications device having at least one softkey, comprising:
- receiving a first user interface definition page defined in a markup language;
- parsing the first user interface definition page, and storing an association between one of the softkeys and menu of menu items, each menu item associated with either a URL or an action;
- responsive to receiving a user selection of the softkey, displaying the menu of menu items;
- responsive to user selection of a displayed menu item associated with an action, effecting the action; and responsive to user selection of a menu item associated with a URL, either fetching data specified by the URL or effecting a communication function of the wireless communication device specified by the URL.

8. A browser program product for controlling the operation of a wireless communication device by execution of the browser by a processor of the wireless communication device, the browser executing the operations of:
- retrieving a first user interface definition page defined in a markup language;
- parsing the first user interface definition page, and storing an association between a softkey and a menu of menu items, each menu item associated with either a URL or an action;
- responsive to receiving a user selection of the softkey, displaying the menu of menu items;
- responsive to user selection of a displayed menu item associated with an action, effecting the action; and
- responsive to user selection of a menu item associated with a URL, either fetching data specified by the URL or effecting a communication function of the wireless communication device specified by the URL.

9. A computer implemented method executed by a wireless communication device for displaying a page of data on a screen display of the wireless communication device, the method comprising:
- receiving a first markup language page containing a tag specifying a URL referencing a second markup language page;
- fetching the second markup language page according to the URL;
- replacing the tag with the second markup language page to form a combined markup language page; and
- displaying the combined markup language page on the screen display of the wireless communication device.

10. A browser program product for controlling the operation of a wireless communication device by execution of the browser by a processor of the wireless communication device, the browser executing the operations of:
- receiving a first markup language page containing a template tag, the template tag specifying a URL referencing a second markup language page;
- fetching the second markup language page according to the URL;
- replacing the template tag with the second markup language page to form a combined markup language page; and
- displaying the combined markup language page.

11. A browser program product for controlling the operation of a wireless communication device by execution of the browser by a processor of the wireless communication device, the browser executing the operations of:
- receiving a first markup language page containing an escape sequence specifying a URL referencing a second markup language page;
- fetching the second markup language page according to the URL;
- replacing the escape sequence with the second markup language page to form a combined markup language page; and
- displaying the combined markup language page.

12. A computer implemented method of displaying a page of configuration settings for a wireless communication device having a plurality of configurable features, the method comprising:
- receiving a markup language page including an input type tag defining an input field for receiving a user input of a configuration setting, and a selection attribute equal to the value of an expression including a URL for a configurable feature, the selection attribute indicating whether the input field is preselected;
- fetching data associated with the URL;
- evaluating the expression using the fetched data to determine a value of the expression, and
- displaying the page including the input field of the configuration setting according to the selection attribute as pre-selected or unselected according to the value of the expression.

13. The method of claim 12, wherein:
- the expression has the form (selection attribute=URL); and
- evaluating the expression using the fetched data to determine a value of the expression comprises:
  - converting the data associated with the URL to an integer value; and
  - evaluating the expression to obtain either a zero or non-zero value.

14. The method of claim 12, wherein:
the expression has the form (selection attribute=(URL= string)), where string is an arbitrary alphanumeric string; and
evaluating the expression using the fetched data to determine a value of the expression comprises:
evaluating the expression by determining if the data associated with the URL is the same as the string to obtain either a zero or non-zero value.

15. A browser program product for displaying a page of configuration settings for a wireless communication device having a plurality of configurable features, the browser controlling the operation of a wireless communication device by execution of the browser by a processor of the wireless communication device, the browser executing the operations of:
receiving a markup language page including an input type tag defining an input field for receiving a user input of a configuration setting, and a selection attribute equal to the value of an expression including a URL for a configurable feature, the selection attribute indicating whether the input field is preselected;
fetching data associated with the URL;
evaluating the expression using the fetched data to determine a value of the expression; and
displaying the page including the input field of the configuration setting according to the selection attribute as pre-selected or unselected according to the value of the expression.

16. A computer implemented method executed by a wireless communication device for displaying a page of data on a screen display of the wireless communication device, the method comprising:
receiving a markup language page including a conditional tag having an expression including a URL and first markup language data to be conditionally displayed according to the value of the expression;
fetching data associated with the URL;
evaluating the expression using the fetched data to determine a value of the expression;
responsive to the value of the expression being true, displaying on the screen display the markup language page with the first markup language data; and
responsive to the value of the expression being false, displaying on the screen display the markup language page without the first markup language data.

17. The method of claim 16, wherein:
the conditional tag includes second markup language data; and
responsive to the value of the expression being false, displaying on the screen display the markup language page without the first markup language comprises displaying the markup language page with the second markup language data.

18. A browser program product for controlling the operation of a wireless communication device by execution of the browser by a processor of the wireless communication device and displaying a page of markup language data, the browser executing the operations of:
receiving a markup language page including a conditional tag having an expression including a URL and first markup language data to be displayed according to the value of the expression;
fetching data associated with the URL;
evaluating the expression using the fetched data to determine a value of the expression;
responsive to the value of the expression being true, displaying the markup language page with the first markup language data; and
responsive to the value of the expression being false, displaying the markup language page without the first markup language data.

19. A computer implemented method executed by a wireless communication device for navigating a markup language page displayed on a screen display of the wireless communication device, the markup language page containing a plurality of hyperlinks, the method comprising:
receiving a markup language page including a plurality of hyperlinks;
selecting a hyperlink of the markup language page as a current hyperlink;
scrolling the markup language file in a direction on the screen display in response to a user input to display only a portion of the markup language file;
determining whether a next hyperlink in the direction of scrolling is visible;
responsive to the next hyperlink in the direction of scrolling being visible, making next hyperlink the current hyperlink; and
responsive to the next hyperlink in the direction of scrolling not being visible, scrolling a portion of the markup language file.

20. The method of claim 19, wherein:
the markup language page has an attribute specifying a target name of a hyperlink included in the page; and
selecting a hyperlink of the markup language page as a current hyperlink further comprises:
comparing the target name specified in the attribute with names specified in each of the hyperlinks; and
selecting as the current hyperlink the hyperlink having a name matching the target name.

21. A browser program product for controlling the operation of a wireless communication device by execution of the browser by a processor of the wireless communication device and displaying a page of markup language data, the browser executing the operations of:
receiving a markup language page including a plurality of hyperlinks;
selecting a hyperlink of the markup language page as a current hyperlink;
scrolling the markup language page in a direction on the screen display in response to a user input to display only a portion of the markup language page;
determining whether a next hyperlink in the direction of scrolling is visible;
responsive to the next hyperlink in the direction of scrolling being visible, making next hyperlink the current hyperlink; and
responsive to the next hyperlink in the direction of scrolling not being visible, scrolling a portion of the markup language page.

22. A computer implemented method of processing data in a form in a stateless system having a server and a wireless communication client device receiving input data, the method comprising:
receiving on the wireless communication client device a first markup language page including a first part of a form having at least one input field for receiving user input of data;

receiving a first user input of first data into the first part of the form on the wireless communication client device;

receiving a second markup language page on the wireless communication client device including a second part of the form while storing locally on the client the received first data;

receiving a second user input of second data into the second part of the form on the wireless communication client device;

combining the stored first data and the second data into a URL; and submitting the URL to the server for processing.

23. A computer-implemented method of operating a wireless communications device having a screen display, a plurality of keys, including at least one softkey, and a plurality of configurable features that can be established by configuration settings, the method comprising:

a) receiving a first markup language page including at least one tag selected from a group of tags consisting of:
   a first tag defining an association between a key and an action;
   a second tag defining help data;
   a third tag defining an association between a softkey and a menu of menu items, each menu item associated with either a URL or an action;
   a fourth tag specifying a URL referencing a second markup language page;
   a fifth tag accompany an escape sequence specifying a URL referencing a third markup language page;
   a sixth tag defining an input field for receiving a user input of a configuration setting, and a selection attribute equal to the value of an expression including a URL for a configurable feature, the selection attribute indicating whether the input field is preselected;
   a seventh tag having an expression including a URL and first markup language data to be conditionally displayed according to the value of the expression;
   an eighth tag having attribute specifying a target name of at least one hyperlink included in the first markup language page; and
   a ninth, <MARQUEE> tag including displayable text in a header portion of the first markup language page;

b) responsive to a tag in the first markup language being the first tag:
   receiving a user selection of the key; and
   effecting the action associated with the user selected key;

c) responsive to a tag in the first markup language page being the second tag:
   storing the help data;
   displaying the first markup language page in a window;
   displaying a title of the first markup language page in a title bar area of the window;
   responsive to an elapsed amount of time since a last user input exceeding a threshold, replacing the title in the title bar area by scrolling the stored help data in the title bar; and
   responsive to completion of the scrolling of the stored help data, redisplaying the title in the title bar area;

d) responsive to a tag in the first markup language page being the third tag:
   storing the association between the softkey and the menu of menu items;
   responsive to receiving a user selection of the softkey, displaying the menu of menu items;
   responsive to user selection of a displayed menu item associated with an action, effecting the action; and
   responsive to user selection of a menu item associated with a URL, either fetching data specified by the URL or effecting a communication function of the wireless communication device specified by the URL;

e) responsive to a tag in the first markup language page being the fourth tag:
   fetching the second markup language page according to the URL;
   replacing the fourth tag with the second markup language page to form a combined markup language page; and
   displaying the combined markup language page;

f) responsive to a tag in the first markup language page being the fifth tag:
   fetching the third markup language page according to the URL;
   replacing the escape sequence with the third markup language page to form a combined markup language page; and
   displaying the combined markup language page;

g) responsive to a tag in the first markup language page being the sixth tag:
   fetching data associated with the URL;
   evaluating the expression using the fetched data to determine a value of the expression; and
   displaying the first markup language page including the input field of the configuration setting according to the selection attribute as pre-selected or unselected according to the value of the expression;

h) responsive to a tag in the first markup language page being the seventh tag:
   fetching data associated with the URL;
   evaluating the expression using the fetched data to determine a value of the expression;
   responsive to the value of the expression being true, displaying the first markup language page with the first markup language data; and
   responsive to the value of the expression being false, displaying the first markup language page without the first markup language data;

i) responsive to a tag in the first markup language page being the eighth tag:
   selecting one of the hyperlinks of the first markup language page as a current hyperlink;
   scrolling the first markup language page in a direction on the screen display in response to a user input to display only a portion of the first markup language page;
   determining whether a next hyperlink in the direction of scrolling is visible;
   responsive to the next hyperlink in the direction of scrolling being visible, making next hyperlink the current hyperlink; and
   responsive to the next hyperlink in the direction of scrolling not being visible, scrolling a portion of the first markup language page; and j) responsive to a tag in the first markup language page being the ninth tag:
   displaying the first markup language page in a window having a title of the first markup language page in a title bar area;

incrementing a counter of an elapsed amount of time; and responsive to the counter equaling or exceeding a threshold amount of time, replacing the title by scrolling the displayable text included in the <MARQUEE> tag in the title bar area.

24. In a wireless communication device having a processor, a screen display, a plurality of keys, including at least one softkey, and a plurality of configurable features that can be established by configuration settings, a browser program product for controlling the operation of the wireless communication device by execution of the browser by the processor, the browser executing the operations of:

a) receiving a first markup language page including at least one tag selected from a group of tags consisting of:

a first tag defining an association between a key and an action;

a second tag defining help data;

a third tag defining an association between a softkey and a menu of menu items, each menu item associated with either a URL or an action;

a fourth tag specifying a URL referencing a second markup language page;

a fifth tag accompany an escape sequence specifying a URL referencing a third markup language page;

a sixth tag defining an input field for receiving a user input of a configuration setting, and a selection attribute equal to the value of an expression including a URL for a configurable feature, the selection attribute indicating whether the input field is preselected;

a seventh tag having an expression including a URL and first markup language data to be conditionally displayed according to the value of the expression;

an eighth tag having attribute specifying a target name of at least one hyperlink included in the first markup language page; and a ninth, <MARQUEE> tag including displayable text in a header portion of the first markup language page;

b) responsive to a tag in the first markup language page being the first tag:
receiving a user selection of the key; and
effecting the action associated with the user selected key;

c) responsive to a tag in the first markup language page being the second tag:
storing the help data;
displaying the first markup language page in a window;
displaying a title of the first markup language page in a title bar area of the window;
responsive to an elapsed amount of time since a last user input exceeding a threshold, replacing the title in the title bar area by scrolling the stored help data in the title bar; and
responsive to completion of the scrolling of the stored help data, redisplaying the title in the title bar area;

d) responsive to a tag in the first markup language page being the third tag:
storing the association between the softkey and the menu of menu items;
responsive to receiving a user selection of the softkey, displaying the menu of menu items;
responsive to user selection of a displayed menu item associated with an action, effecting the action; and
responsive to user selection of a menu item associated with a URL, either fetching data specified by the URL or effecting a communication function of the wireless communication device specified by the URL;

e) responsive to a tag in the first markup language page being the fourth tag:
fetching the second markup language page according to the URL;
replacing the fourth tag with the second markup language page to form a combined markup language page; and
displaying the combined markup language page;

f) responsive to a tag in the first markup language page being the fifth tag:
fetching the third markup language page according to the URL;
replacing the escape sequence with the third markup language page to form a combined markup language page; and
displaying the combined markup language page;

g) responsive to a tag in the first markup language page being the sixth tag:
fetching data associated with the URL;
evaluating the expression using the fetched data to determine a value of the expression; and
displaying the first markup language page including the input field of the configuration setting according to the selection attribute as pre-selected or unselected according to the value of the expression;

h) responsive to a tag in the first markup language page being the seventh tag:
fetching data associated with the URL;
evaluating the expression using the fetched data to determine a value of the expression;
responsive to the value of the expression being true, displaying the first markup language page with the first markup language data; and
responsive to the value of the expression being false, displaying the first markup language page without the first markup language data;

i) responsive to a tag in the first markup language page being the eighth tag:
selecting one of the hyperlinks of the first markup language page as a current hyperlink;
scrolling the first markup language page in a direction on the screen display in response to a user input to display only a portion of the first markup language page;
determining whether a next hyperlink in the direction of scrolling is visible;
responsive to the next hyperlink in the direction of scrolling being visible, making next hyperlink the current hyperlink; and
responsive to the next hyperlink in the direction of scrolling not being visible, scrolling a portion of the first markup language page; and j) responsive to a tag in the first markup language page being the ninth tag:
displaying the first markup language page in a window having a title of the first markup language page in a title bar area;
incrementing a counter of an elapsed amount of time; and
responsive to the counter equaling or exceeding a threshold amount of time, replacing the title by scrolling the displayable text included in the <MARQUEE> tag in the title bar area.

* * * * *

(12) EX PARTE REEXAMINATION CERTIFICATE (10220th)

United States Patent
De Boor et al.

(10) Number: US 6,173,316 C1
(45) Certificate Issued: Jul. 14, 2014

(54) WIRELESS COMMUNICATION DEVICE WITH MARKUP LANGUAGE BASED MAN-MACHINE INTERFACE

(75) Inventors: Adam De Boor, Alameda, CA (US); Michael D. Eggers, Oakland, CA (US)

(73) Assignee: Access Co., Ltd., Sarugaku-cho, Chiyoda-ku, Tokyo (JP)

Reexamination Request:
No. 90/012,540, Sep. 13, 2012

Reexamination Certificate for:
Patent No.: 6,173,316
Issued: Jan. 9, 2001
Appl. No.: 09/057,394
Filed: Apr. 8, 1998

(51) Int. Cl.
*G06F 17/30* (2006.01)
*G06F 9/44* (2006.01)
*H04M 1/725* (2006.01)
*H04M 1/72* (2006.01)
*H04M 1/247* (2006.01)

(52) U.S. Cl.
USPC .............. 709/218; 707/999.009; 707/999.01; 707/E17.114; 707/E17.119; 709/202; 709/203; 709/219; 709/227; 709/228; 709/250; 715/234; 715/784

(58) Field of Classification Search
None
See application file for complete search history.

(56) References Cited

To view the complete listing of prior art documents cited during the proceeding for Reexamination Control Number 90/012,540, please refer to the USPTO's public Patent Application Information Retrieval (PAIR) system under the Display References tab.

*Primary Examiner* — Majid A. Banankhah

(57) ABSTRACT

A system, method, and software product provide a wireless communications device with a markup language based man-machine interface. The man-machine interface provides a user interface for the various telecommunications functionality of the wireless communication device, including dialing telephone numbers, answering telephone calls, creating messages, sending messages, receiving messages, establishing configuration settings, which is defined in markup language, such as HTML, and accessed through a browser program executed by the wireless communication device. This feature enables direct access to Internet and World Wide Web content, such as Web pages, to be directly integrated with telecommunication functions of the device, and allows Web content to be seamlessly integrated with other types of data, since all data presented to the user via the user interface is presented via markup language-based pages. The browser processes an extended form of HTML that provides new tags and attributes that enhance the navigational, logical, and display capabilities of conventional HTML, and particularly adapt HTML to be displayed and used on wireless communication devices with small screen displays. The wireless communication device includes the browser, a set of portable components, and portability layer. The browser includes protocol handlers, which implement different protocols for accessing various functions of the wireless communication device, and content handlers, which implement various content display mechanisms for fetching and outputting content on a screen display.

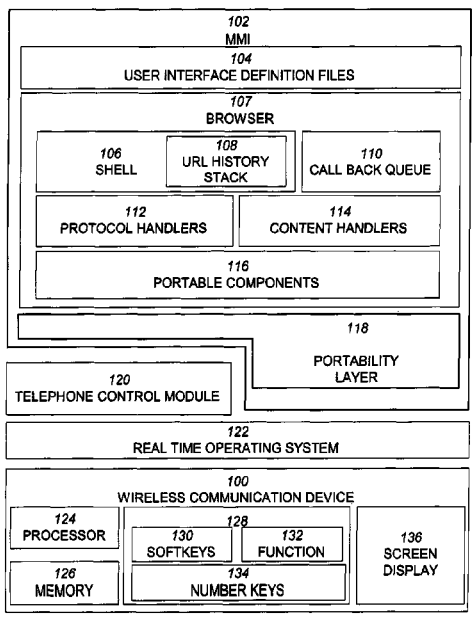

US 6,173,316 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-5 is confirmed.

New claims 25-66 are added and determined to be patentable.

Claims 6-24 were not reexamined.

*25. The computer program product of claim 1, wherein the plurality of protocol handlers include a telephone protocol handler that receives a URL from the shell and decodes the URL to activate a telephony, messaging and configuration functionality of the wireless communication device.*

*26. The computer program product of claim 25, wherein the fetched content comprises phone status information content.*

*27. The computer program product of claim 1, wherein the plurality of protocol handlers include a file protocol handler that receives a URL from the shell and decodes the URL to access data stored in a memory of the wireless communication device.*

*28. The computer program product of claim 1, wherein the plurality of protocol handlers include a remote file protocol handler that receives a URL from the shell and fetches content addressed by the data component of the URL that is stored remotely from the wireless communication device.*

*29. The computer program product of claim 1, wherein the plurality of content handlers include a markup language content handler that receives markup language content corresponding to a URL and displays the content on the screen display of the wireless communication device.*

*30. The computer program product of claim 1, wherein the plurality of protocol handlers includes a message protocol handler that receives a URL from the shell and decodes the URL to activate an alphanumeric message function of the wireless communication device.*

*31. The computer program product of claim 1, wherein the plurality of protocol handlers includes a configuration protocol handler that receives a URL from the shell and decodes the URL to control a configuration setting of the wireless communications device.*

*32. The computer program product of claim 1, wherein the fetched content comprises markup language content stored in the memory of the wireless communication device.*

*33. The computer program product of claim 1, wherein the shell chooses an appropriate protocol handler from said plurality of protocol handlers in accordance with the protocol component of the URL.*

*34. The computer program product of claim 1, wherein the shell provides the fetched content to a content handler by choosing an appropriate content handler in accordance with the type of content being fetched.*

*35. A computer program product for use on a wireless communication device, the wireless communication device including a memory, a screen display, a processor for executing the computer program product, and controls for operating the wireless communication device, the computer program product comprising:*

*a shell for receiving a URL having a protocol component and a data component, the data component specifying content to be fetched, the shell providing the data component to a protocol handler according to the protocol component, and the fetched content to a content handler for processing;*

*a plurality of protocol handlers, respectively configured for different protocols, each protocol handler communicatively coupled to the shell to receive a URL, the protocol handlers being capable of fetching content specified by the data component and providing the fetched content to the shell; and*

*a plurality of content handlers, each content handler communicatively coupled to the shell to receive fetched content and process the fetched content to output the content to the screen display of the wireless communication apparatus.*

*36. The computer program product of claim 35, wherein: the plurality of protocol handlers include:*

*a telephone protocol handler that receives a URL from the shell and decodes the URL to activate a telephony function of the wireless communications device;*

*a file protocol handler that receives a URL form the shell and decodes the URL to access data stored in a memory of the wireless communications device;*

*a remote file protocol handler that receives a URL from the shell and fetches content addressed by the data component of the URL that is stored remotely from the wireless communication device; and*

*the plurality of content handlers include:*

*a markup language content handler that receives markup language content corresponding to a URL and displays the content on the screen display of the wireless communication device.*

*37. The computer program product of claim 36, wherein the plurality of protocol handlers include:*

*a message protocol handler that receives a URL from the shell and executes a command specified by the data to activate an alphanumeric message display or transmission function of the wireless communication device; and*

*a configuration protocol handler that receives a URL from the shell and establishes a configuration setting of the wireless communications device according to the data component of the URL.*

*38. The computer program product of claim 35, in combination with:*

*the wireless communication device wherein:*

*the screen display displays fetched content;*

*the memory coupled to the screen display, for storing the shell, the protocol handlers, and the content handlers; and*

*the processor coupled to the memory to execute the shell, the protocol handlers and content handlers.*

*39. The computer program product of claim 35, wherein the plurality of protocol handlers include a telephone protocol handler that receives a URL from the shell and decodes the URL to activate a telephone functionality of the wireless communications apparatus.*

*40. The computer program product of claim 35, wherein the plurality of protocol handlers include a message protocol handler that receives a URL from the shell and executes a* command specified by the data component to activate an alphanumeric function of the wireless communication apparatus.

41. The computer program product of claim 39 wherein the fetched content comprises phone status information content and wherein the phone status information content is markup language content.

42. The computer program product of claim 35, wherein the plurality of protocol handlers include a file protocol handler that receives a URL from the shell and decodes the URL to access data stored in a memory of the wireless communications device.

43. The computer program product of claim 35, wherein the plurality of protocol handlers include a remote file protocol handler that receives a URL from the shell and fetches content addressed by the data component of the URL that is stored remotely from the wireless communication device.

44. The computer program product of claim 35, wherein the plurality of content handlers include a markup language content handler that receives markup language content corresponding to a URL and displays the content on the screen display of the wireless communication device.

45. The computer program product of claim 35, wherein the plurality of protocol handlers includes a message protocol handler that receives a URL from the shell and decodes the URL to activate an alphanumeric message function of the wireless communication device.

46. The computer program product of claim 35, wherein the plurality of protocol handlers includes a configuration protocol handler that receives a URL from the shell and decodes the URL to control a configuration setting of the wireless communications device.

47. The computer program product of claim 35, wherein the fetched content comprises markup language content stored in the memory of the wireless communication device.

48. The computer program product of claim 35, wherein the shell chooses an appropriate protocol handler from said plurality of protocol handlers in accordance with the protocol component of the URL.

49. The computer program product of claim 35, wherein the shell provides the fetched content to a content handler by choosing an appropriate content handler in accordance with the type of content being fetched.

50. A computer program product for use on a wireless communication device, the wireless communication device including a memory, a screen display, a processor for executing the computer program product, and controls for operating the wireless communication device, the computer program product comprising:
    a shell for receiving a URL having a protocol component and a data component, the data component capable of specifying content to be fetched, the shell providing the data component to a protocol handler according to the protocol component, and the fetched content to a content handler for processing;
    a plurality of protocol handlers, respectively configured for different protocols, at least one of the protocol handlers communicatively coupled to the shell to receive a URL and fetch content specified by the data component and provide the fetched content to the shell; and
    a plurality of content handlers, each content handler communicatively coupled to the shell to receive fetched content and process the fetched content to output the content to the screen display of the wireless communication device.

51. The computer program product of claim 50, wherein the data component is capable of specifying a command to be executed.

52. The computer program product of claim 50, wherein at least one of the protocol handlers is communicatively coupled to the shell to receive the URL and execute the command specified by the data component.

53. The computer program product of claim 50, wherein:
    the plurality of protocol handlers include:
        a telephone protocol handler that receives a URL from the shell and decodes the URL to activate a telephony function of the wireless communications device;
        a file protocol handler that receives a URL from the shell and decodes the URL to access data stored in a memory of the wireless communications device;
        a remote file protocol handler that receives a URL from the shell and fetches content addressed by the data component of the URL that is stored remotely from the wireless communication device; and
    the plurality of content handlers include:
        a markup language content handler that receives markup language content corresponding to a URL and displays the content on the screen display of the wireless communication device.

54. The computer program product of claim 53, wherein the plurality of protocol handlers include:
    a message protocol handler that receives a URL from the shell and executes a command specified by the data to activate an alphanumeric message display or transmission function of the wireless communication device; and
    a configuration protocol handler that receives a URL from the shell and establishes a configuration setting of the wireless communications device according to the data component of the URL.

55. The computer program product of claim 50, in combination with:
    the wireless communication device wherein:
        the screen display displays fetched content;
        the memory coupled to the screen display, for storing the shell, the protocol handlers, and the content handlers; and
        the processor coupled to the memory to execute the shell, the protocol handlers and content handlers.

56. The computer program product of claim 50, wherein the plurality of protocol handlers include a telephone protocol handler that receives a URL from the shell and decodes the URL to activate a telephony, messaging and configuration functionality of the wireless communications apparatus.

57. The computer program product of claim 50, wherein the plurality of protocol handlers include a message protocol handler that receives a URL from the shell and executes a command specified by the data component to activate an alphanumeric function of the wireless communication apparatus.

58. The computer program product of claim 50, wherein the fetched content comprises phone status information content and wherein the phone status information content is markup language content.

59. The computer program product of claim 50, wherein the plurality of protocol handlers include a file protocol handler that receives a URL from the shell and decodes the URL to access data stored in a memory of the wireless communications device.

60. The computer program product of claim 50, wherein the plurality of protocol handlers include a remote file protocol handler that receives a URL from the shell and fetches

*content addressed by the data component of the URL that is stored remotely from the wireless communication device.*

*61. The computer program product of claim 50, wherein the plurality of content handlers include a markup language content handler that receives markup language content corresponding to a URL and displays the content on the screen display of the wireless communication device.*

*62. The computer program product of claim 50, wherein the plurality of protocol handlers includes a message protocol handler that receives a URL from the shell and decodes the URL to activate an alphanumeric message function of the wireless communication device.*

*63. The computer program product of claim 50, wherein the plurality of protocol handlers includes a configuration protocol handler that receives a URL from the shell and decodes the URL to control a configuration setting of the wireless communication device.*

*64. The computer program product of claim 50, wherein the fetched content comprises markup language content stored in the memory of the wireless communication device.*

*65. The computer program product of claim 50, wherein the shell chooses an appropriate protocol handler from said plurality of protocol handlers in accordance with the protocol component of the URL.*

*66. The computer program product of claim 50, wherein the shell provides the fetched content to a content handler by choosing an appropriate content handler in accordance with the type of content being fetched.*

\* \* \* \* \*